(12) United States Patent
Yamamoto et al.

(10) Patent No.: US 12,545,711 B2
(45) Date of Patent: Feb. 10, 2026

(54) HORSESHOE CRAB-DERIVED RECOMBINANT FACTOR G AND METHOD OF MEASURING β-GLUCAN USING SAME

(71) Applicant: FUJIFILM Corporation, Tokyo (JP)

(72) Inventors: Yotaro Yamamoto, Amagasaki (JP); Takeshi Kitagawa, Amagasaki (JP); Hiroki Fukuchi, Amagasaki (JP)

(73) Assignee: FUJIFILM Corporation, Tokyo (JP)

( * ) Notice: Subject to any disclaimer, the term of this patent is extended or adjusted under 35 U.S.C. 154(b) by 840 days.

(21) Appl. No.: 17/837,735

(22) Filed: Jun. 10, 2022

(65) Prior Publication Data

US 2022/0306705 A1    Sep. 29, 2022

Related U.S. Application Data

(63) Continuation of application No. PCT/JP2020/046178, filed on Dec. 10, 2020.

(30) Foreign Application Priority Data

Dec. 11, 2019  (JP) .................................. 2019-223604

(51) Int. Cl.
 C07K 14/435   (2006.01)
 C12N 9/64    (2006.01)
 C12Q 1/37    (2006.01)

(52) U.S. Cl.
 CPC ...... *C07K 14/43504* (2013.01); *C12N 9/6405* (2013.01); *C12Q 1/37* (2013.01)

(58) Field of Classification Search
 CPC ... C07K 14/43504; C12N 9/6405; C12Q 1/37
 USPC ...................................................... 435/350
 See application file for complete search history.

(56) References Cited

U.S. PATENT DOCUMENTS

| 8,822,163 B2 | 9/2014 | Yoneda |
| 2006/0228779 A1 | 10/2006 | Tamura |
| 2009/0208995 A1 | 8/2009 | Tamura et al. |
| 2012/0009594 A1 | 1/2012 | Yoneda |

FOREIGN PATENT DOCUMENTS

| JP | 2010-187634 A | 9/2010 |
| JP | 4832134 B2 | 12/2011 |
| WO | WO 2008/004674 A1 | 1/2008 |
| WO | WO 2010/107068 A1 | 9/2010 |

OTHER PUBLICATIONS

"Beta-agarase AgaB34-like [Limulus polyphemus]," Database Genpept [online], Database accession No. XP_013792401, Aug. 31, 2017, 3 pages total.
Extended European Search Report for European Application No. 20898057.3, dated Sep. 28, 2023.
Iwanaga, "Biochemical principle of Limulus test for detecting bacterial endotoxins," Proceedings of the Japan Academy, Series B, vol. 83, No. 4, 2007, pp. 110-119.
"RecName: Full=Clotting factor G beta subunit; Contains: RecName: Full=Clotting factor G beta subunit light chain; Contains: RecName: Full=Clotting factor G beta subunit heavy chain; Flags: Precursor," Database UniProtKB/Swiss-Prot [online], May 8, 2019, URL: <https://www.ncbi.nlm.nih.gov/protein/Q27083/>, 3 pages total.
Chinese Office Action and Search Report for Chinese Application No. 202080086019.6, dated Aug. 19, 2023, with an English translation.
"Definition: Subname: Full=Clotting factor G beta subunit, Accession No. Q27083," Database Uniprot [online], May 8, 2019, URL: https://www.uniprot.org/uniprot/Q27083.txt?version=84, 1 page total.
International Preliminary Report on Patentability, dated Jun. 23, 2022, and Written Opinion of the International Searching Authority, dated Jan. 19, 2021, for International Application No. PCT/JP2020/046178, with an English translation.
International Search Report for International Application No. PCT/JP2020/046178, dated Jan. 19, 2021, with an English translation.
Morita et al., "A New (1 → 3)-β-D-Glucan-Mediated Coagulation Pathway Found in *Limulus* Amebocytes," FEBS Letters, vol. 129, No. 2, 1981, pp. 318-321.
Seki et al., "Horseshoe Crab (1,3)-β-D-Glucan-sensitive Coagulation Factor G," The Journal of Biological Chemistry, vol. 269, No. 2, 1994, pp. 1370-1374.
Japanese Office Action for corresponding Japanese Application No. 2021-564048, dated May 30, 2023, with English translation.
"Clotting factor G alpha subunit precursor [Limulus polyphemus]," Database GenPept [online], Database Accession No. BAJ10550, Jul. 2, 2010, 2 pages total.
"Clotting factor G beta subunit precursor," Database GenPept [online], Database Accession No. Q27083, Nov. 28, 2006, 1 page total.
Korean Office Action for Korean Application No. 10-2022-7019561, dated Jun. 26, 2024, with an English translation.

*Primary Examiner* — Jennifer M. H. Tichy
(74) *Attorney, Agent, or Firm* — Birch, Stewart, Kolasch & Birch, LLP

(57) ABSTRACT

The present invention relates to "a heterodimer which combines a Factor G α-subunit containing an amino acid sequence that is the same as or substantially the same as an amino acid sequence represented by SEQ ID NO: 2 or SEQ ID NO: 4 with a Factor G β-subunit containing an amino acid sequence that is the same as or substantially the same as an amino acid sequence represented by any one of SEQ ID NO: 6, 8, 10, 12, 14, or 16, a method of measuring a β-glucan using the heterodimer, and a kit for measuring a β-glucan containing the heterodimer".

5 Claims, 3 Drawing Sheets

Specification includes a Sequence Listing.

1

HORSESHOE CRAB-DERIVED RECOMBINANT FACTOR G AND METHOD OF MEASURING β-GLUCAN USING SAME

CROSS-REFERENCE TO RELATED APPLICATIONS

This application is a Continuation of PCT International Application No. PCT/JP2020/046178 filed on Dec. 10, 2020, which claims priority under 35 U.S.C § 119(a) to Japanese Patent Application No. 2019-223604 filed on Dec. 11, 2019. Each of the above application(s) is hereby expressly incorporated by reference, in its entirety, into the present application.

BACKGROUND OF THE INVENTION

1. Field of the Invention

The present invention relates to a heterodimer consisting of a novel horseshoe crab-derived factor G α-subunit and a novel horseshoe crab-derived factor G β-subunit, a method of measuring a β-glucan (hereinafter, also referred to as "BG") using the same, and a kit containing the heterodimer.

2. Description of the Related Art

Deep-seated mycosis that occurs in the internal organs, the blood system, and the lymphatic system is a type of opportunistic infection that affects patients under a condition of weakened resistance, such as immunodeficiency, and patients are often severely ill. Typical examples of the causative fungi of deep-seated mycosis include *Candida* and *Aspergillus*, and BG is commonly present in all cell walls. Therefore, it is useful to detect and measure blood BG. In the field of clinical diagnosis, the concentration of BG in plasma or serum is used as an index for early diagnosis, therapeutic effect, and prognosis of deep-seated mycoses infections.

BG is a polysaccharide having a β (1→3)-linked glucose repeating structure as a main chain and is a substance having a high molecular weight of approximately several thousands to one million. BG may have a (1→6)-linked or (1→4)-linked branch. In the horseshoe crab blood cell extract (Amebocyte Lysate, hereinafter, also referred to as "lysate"), a Factor G, which is a heterodimer formed of a Factor G α-subunit and a Factor G β-subunit, is present. BG has a property of binding to a BG-binding domain portion of the Factor G α-subunit.

As a method of measuring BG, for example, the following synthetic substrate method of using a synthetic peptide substrate using a reaction path mediated by a Factor G in the above-described lysate is known.

In a case where BG binds to the BG-binding domain portion of the Factor G α-subunit, the Factor G is an active Factor G having protease activity. The active Factor G converts a Proclotting enzyme present in the lysate into a Clotting enzyme by the protease activity (T. Morita et al., FEBS Lett., 1981, vol. 129, pp. 318 to 321). The Clotting enzyme releases pNA by amide hydrolysis of the synthetic substrate of a synthetic peptide substrate (for example, Boc-DEL-pNA). Therefore, BG can be quantified by measuring the absorbance of the generated color-developing substance (pNA).

The Factor G α-subunit and the Factor G β-subunit derived from *Tachypleus* horseshoe crab (*Tachypleus triden-tatus*) have already been cloned (N. Seki et al., J. Biol. Chem., 1994, vol. 269, No. 2, pp. 1370 to 1374 and JP4832134B).

In the Pamphlet of WO2008/004674A, the protease activity is measured without adding BG by using the Factor G described in N. Seki et al., J. Biol. Chem., 1994, vol. 269, No. 2, pp. 1370 to 1374 and JP4832134B.

SUMMARY OF THE INVENTION

The techniques described in JP4832134B, WO2008/004674A, and the like are performed using the gene sequences determined in N. Seki et al., J. Biol. Chem., 1994, vol. 269, No. 2, pp. 1370 to 1374, but an insect cell culture medium is used. However, it is known that insect cell culture medium has BG contamination due to a yeast extract. Further, in JP4832134B, BG is not added and no test is performed to measure the protease activity. Therefore, it is unclear whether the Factor G derived from *Tachypleus* horseshoe crab prepared in JP4832134B was BG-specifically activated.

In fact, according to the verification conducted by the present inventors using a culture medium having a BG below the detection limit, as is apparent from the results of Example 1 described below, it is difficult to confirm whether a *Tachypleus* horseshoe crab-derived recombinant Factor G prepared by the methods described in WO2008/004674A and N. Seki et al., J. Biol. Chem., 1994, vol. 269, No. 2, pp. 1370 to 1374, has protease activity even in the presence of BG. That is, a Factor G (precursor) that is converted into an active Factor G having protease activity in the presence of BG is difficult to prepare using the DNA sequences described in these documents.

Further, Patent Document 3 describes that BG is measured with a detection sensitivity of several ng order. However, in clinical diagnosis, since measurement of plasma or serum BG is required to be performed in several pg order, sufficient performance for clinical diagnosis is not shown in the detection sensitivity of several ng order.

In consideration of the above-described circumstances, an object of the present invention is to provide a horseshoe crab-derived Factor G that is BG-dependently activated and a method of measuring BG with high sensitivity using the same.

The present invention has been made for the purpose of solving the above-described problems and has the following configurations.

[1] A heterodimer which combines a Factor G α-subunit containing an amino acid sequence that is the same as or substantially the same as an amino acid sequence represented by SEQ ID NO: 2 or SEQ ID NO: 4 with a Factor G β-subunit containing an amino acid sequence that is the same as or substantially the same as an amino acid sequence represented by any one of SEQ ID NO: 6, 8, 10, 12, 14, or 16.

[2] The heterodimer according to [1], which is selected from the following items:
(i) a heterodimer which combines the Factor G α-subunit containing the amino acid sequence represented by SEQ ID NO: 2 with the Factor G β-subunit containing the amino acid sequence represented by SEQ ID NO: 6;
(ii) a heterodimer which combines the Factor G α-subunit containing the amino acid sequence represented by SEQ ID NO: 2 with the Factor G β-subunit containing the amino acid sequence represented by SEQ ID NO: 8;
(iii) a heterodimer which combines the Factor G α-subunit containing the amino acid sequence represented by SEQ ID NO: 2 with the Factor G β-subunit containing the amino acid sequence represented by SEQ ID NO: 12;

(iv) a heterodimer which combines the Factor G α-subunit containing the amino acid sequence represented by SEQ ID NO: 2 with the Factor G β-subunit containing the amino acid sequence represented by SEQ ID NO: 14;

(v) a heterodimer which combines the Factor G α-subunit containing the amino acid sequence represented by SEQ ID NO: 4 with the Factor G β-subunit containing the amino acid sequence represented by SEQ ID NO: 10; and (vi) a heterodimer which combines the Factor G α-subunit containing the amino acid sequence represented by SEQ ID NO: 4 with the Factor G β-subunit containing the amino acid sequence represented by SEQ ID NO: 16.

[3] The heterodimer according to [2], which is selected from (i), (ii), and (v).

[4] A method of measuring a β-glucan using a sample, and a heterodimer which combines a Factor G α-subunit containing an amino acid sequence represented by SEQ ID NO: 2 or SEQ ID NO: 4 with a Factor G β-subunit containing an amino acid sequence that is the same as or substantially the same as an amino acid sequence represented by any one of SEQ ID NO: 6, 8, 10, 12, 14, or 16.

[5] A Factor G α-subunit which contains an amino acid sequence represented by SEQ ID NO: 2 or SEQ ID NO: 4.

[6] A Factor G β-subunit which contains an amino acid sequence that is the same as or substantially the same as an amino acid sequence represented by any one of SEQ ID NO: 6, 8, 10, 12, 14, or 16.

[7] A kit for measuring a β-glucan, comprising: a heterodimer which combines a Factor G α-subunit containing an amino acid sequence that is the same as or substantially the same as an amino acid sequence represented by SEQ ID NO: 2 or SEQ ID NO: 4 with a Factor G β-subunit containing an amino acid sequence that is the same as or substantially the same as an amino acid sequence represented by any one of SEQ ID NO: 6, 8, 10, 12, 14, or 16.

In addition, the present invention may have the following configurations.

[8] A vector which is incorporated with a nucleic acid molecule having a base sequence encoding an amino acid sequence that is the same as or substantially the same as an amino acid sequence represented by any one of SEQ ID NO: 2, 4, 6, 8, 10, 12, 14, or 16.

[9] A vector which is incorporated with both a nucleic acid molecule having a base sequence encoding an amino acid sequence that is the same as or substantially the same as an amino acid sequence represented by SEQ ID NO: 2 or SEQ ID NO: 4 and a nucleic acid molecule having a base sequence encoding an amino acid sequence that is the same as or substantially the same as an amino acid sequence represented by any one of SEQ ID NO: 6, 8, 10, 12, 14, or 16.

[10] A transformant which is incorporated with a nucleic acid molecule having a base sequence encoding an amino acid sequence that is the same as or substantially the same as an amino acid sequence represented by any one of SEQ ID NO: 2, 4, 6, 8, 10, 12, 14, or 16.

[11] A transformant which is incorporated with both a nucleic acid molecule having a base sequence encoding an amino acid sequence that is the same as or substantially the same as an amino acid sequence represented by SEQ ID NO: 2 or SEQ ID NO: 4 and a nucleic acid molecule having a base sequence encoding an amino acid sequence that is the same as or substantially the same as an amino acid sequence represented by any one of SEQ ID NO: 6, 8, 10, 12, 14, or 16.

[12] A method of removing BG from a sample, the method comprising: treating a sample containing BG by bringing the sample into contact with a Factor G α-subunit containing an amino acid sequence that is the same as or substantially the same as an amino acid sequence represented by SEQ ID NO: 2 or SEQ ID NO: 4.

[13] The method of removing BG according to [12], in which the Factor G α-subunit is carried by an insoluble carrier.

[14] A kit for removing a β-glucan, comprising a Factor G α-subunit containing an amino acid sequence that is the same as or substantially the same as an amino acid sequence represented by SEQ ID NO: 2 or SEQ ID NO: 4.

As a result of intensive research conducted by the present inventors in order to solve the above-described problems, it was found that in a case where a Factor G having protease activity is developed in the presence of BG, BG with high sensitivity can be measured using this Factor G, thereby completing the present invention.

The heterodimer of the present invention has a BG-dependent protease activity that exerts a protease activity in the presence of BG. Further, in a case where the BG concentration is measured using the heterodimer of the present invention, it is possible to measure BG with higher sensitivity as compared with a BG measuring method of the related art. Further, since the heterodimer of the present invention is a recombinant product, there is no lot difference, and thus an effect of producing the heterodimer in large quantities at low cost can be obtained.

DESCRIPTION OF THE PREFERRED EMBODIMENTS

1. BG According to Present Invention

Figure 1:
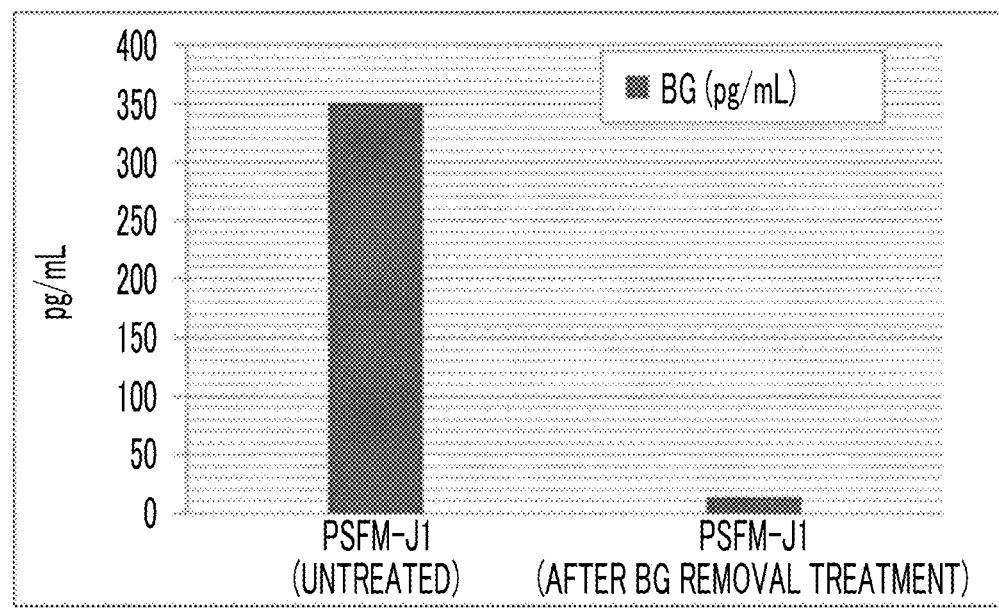
FIG. 1 shows results of measuring a PSM-J1 culture medium and/or the concentration of BG in the PSM-J1 culture medium treated using a Factor G α-subunit B of the present invention, obtained in Example 1.

Examples of the BG according to the present invention include polysaccharides containing BG as a constituent component and having a property of causing an enzymatic reaction of horseshoe crab blood cell extract. Specific examples thereof include various bacteria (such as *Alcaligenes* spp. and *Agrobacterium* spp.), yeasts (such as *Saccharomyces* spp., *Candida* spp., *Cryptococcus* spp., *Trichosporon* spp., and *Rhodotorula* spp.), molds (such as *Aspergillus* spp. and *Mucor* spp., *Penicillium* spp., *Trichophyton* spp., *Sporothrix* spp., and *Phialophora* spp.), actinomycetes (*Actinomyces* spp. and *Nocardia* spp.), and natural polysaccharides obtained from cell walls such as mushrooms (such as *Lentinula edodes, Schizophyllum commune*, and *Trametes versicolor*), specifically, curdlan, pachyman, sclerotane, lentinan, schizophyllan, coriolan, and storable polysaccharides of algae (such as brown algae, euglena, and diatoms), and specifically laminaran and paramylon.

2.2. Factor G α-Subunit of Present Invention

The Factor G α-subunit of the present invention is a protein containing an amino acid sequence that is the same as or substantially the same as the amino acid sequence represented by SEQ ID NO: 2 or SEQ ID NO: 4.

The Factor G α-subunit of the present invention has the property of binding to BG.

It is preferable that the Factor G α-subunit of the present invention is derived from *Limulus polyphemus*.

Examples of the amino acid sequence that is substantially the same as the amino acid sequence represented by SEQ ID NO: 2 or SEQ ID NO: 4 include an amino acid sequence of a protein that has a homology of approximately 80% or greater, preferably approximately 90% or greater, more preferably approximately 95% or greater, and still more preferably approximately 97% or greater with the amino acid sequence represented by SEQ ID NO: 2 or SEQ ID NO: 4 and has a property of binding to BG.

Further, examples of the amino acid sequence that is substantially the same as the amino acid sequence represented by SEQ ID NO: 2 or SEQ ID NO: 4 include an amino acid sequence in which one to five, preferably one to three, more preferably one or two, and still more preferably one amino acid in the amino acid sequence represented by SEQ ID NO: 2 or SEQ ID NO: 4 has been substituted, deleted, inserted, or added. The substitution, deletion, insertion, or addition may occur simultaneously at one or a plurality of sites in one amino acid sequence. The position and the number amino acids, in which the substitution, deletion, insertion, or addition occurs in the amino acid sequence represented by SEQ ID NO: 2 or SEQ ID NO: 4, are optional as long as the protein having the amino acid sequence has the properties of the Factor G α-subunit described above.

Specific preferred examples of the Factor G α-subunit of the present invention include a Factor G α-subunit protein containing the amino acid sequence represented by SEQ ID NO: 2 or SEQ ID NO: 4.

A Factor G α-subunit protein containing the amino acid sequence represented by SEQ ID NO: 2 is more preferable.

The Factor G α-subunit of the present invention may be formed such that a known tag peptide such as His tag, FLAG tag, Hat tag, or SUMO tag, or a so-called spacer is linked to the N-terminal or C-terminal thereof. Further, the N-terminal thereof may have fragments of signal peptides, such as one to several amino acids, for example, one to three amino acids, at the N-terminal thereof.

A protein containing an amino acid sequence that is the same as or substantially the same as the amino acid sequence represented by SEQ ID NO: 2 is also referred to as "Factor G α-subunit A" or simply "α-subunit A".

A protein containing an amino acid sequence that is the same as or substantially the same as the amino acid sequence represented by SEQ ID NO: 4 is also referred to as "Factor G α-subunit B" or simply "α-subunit B".

In a case where only "Factor G α-subunit" is mentioned, the Factor G α-subunit is used as a general term for the Factor G α-subunit of the present invention, including both "Factor G α-subunit A" and "Factor G α-subunit B".

Further, in a case where only "amino acid sequence of the Factor G α-subunit" is mentioned, the amino acid sequence of the Factor G α-subunit is used as a general term for "amino acid sequence that is the same as or substantially the same as the amino acid sequence represented by SEQ ID NO: 2 or SEQ ID NO: 4" described above.

3. Factor G β-Subunit of Present Invention

The Factor G β-subunit of the present invention is a protein containing an amino acid sequence that is the same as or substantially the same as the amino acid sequence represented by any one of SEQ ID NO: 6, 8, 10, 12, 14, or 16.

The Factor G β-subunit of the present invention has no enzymatic activity while having a domain of a serine protease, and exhibits protease activity in a case of forming a heterodimer with the above-described Factor G α-subunit of the present invention.

It is preferable that Factor G β-subunit of the present invention is derived from *Limulus polyphemus*.

Examples of the amino acid sequence that is substantially the same as the amino acid sequence represented by any one of SEQ ID NO: 6, 8, 10, 12, 14, or 16 include an amino acid sequence of a protein that has a homology of approximately 80% or greater, preferably approximately 90% or greater, more preferably approximately 95% or greater, and still more preferably approximately 97% or greater with the amino acid sequence represented by any one of SEQ ID NO: 6, 8, 10, 12, 14, or 16 and has the property of the Factor G β-subunit.

Further, examples of the amino acid sequence that is substantially the same as the amino acid sequence represented by any one of SEQ ID NO: 6, 8, 10, 12, 14, or 16 include an amino acid sequence in which one to five, preferably one to three, more preferably one or two, and still more preferably one amino acid in the amino acid sequence represented by any one of SEQ ID NO: 6, 8, 10, 12, 14, or 16 has been substituted, deleted, inserted, or added. The substitution, deletion, insertion, or addition may occur simultaneously at one or a plurality of sites in one amino acid sequence. The position and the number amino acids, in which the substitution, deletion, insertion, or addition occurs in the amino acid sequence represented by any one of SEQ ID NO: 6, 8, 10, 12, 14, or 16, are optional as long as the protein having the amino acid sequence has the properties of the Factor G β-subunit described above.

Specific preferred examples of the Factor G β-subunit of the present invention include a Factor G β-subunit protein containing the amino acid sequence represented by any one of SEQ ID NO: 6, 8, 10, 12, 14, or 16.

A Factor G β-subunit protein containing the amino acid sequence represented by any one of SEQ ID NO: 6, 8, or 10 is more preferable.

A Factor G β-subunit protein containing the amino acid sequence represented by SEQ ID NO: 6 or 8 is more preferable.

The Factor G β-subunit of the present invention may be formed such that a known tag peptide such as His tag, FLAG tag, Hat tag, or SUMO tag, or a so-called spacer is linked to the N-terminal or C-terminal thereof. Further, the N-terminal thereof may have fragments of signal peptides, such as one to several amino acids, for example, one to three amino acids, at the N-terminal thereof.

Proteins containing the amino acid sequence that is the same as or substantially the same as the amino acid sequence represented by any one of SEQ ID NO: 6, 8, 10, 12, 14, or 16 of the present invention will be respectively referred to as follows.

The Factor G β-subunit of the present invention, containing an amino acid sequence that is the same as or substantially the same as the amino acid sequence represented by SEQ ID NO: 6: Factor G β-subunit βi2, The Factor G β-subunit of the present invention, containing an amino acid sequence that is the same as or substantially the same as the amino acid sequence represented by SEQ ID NO: 8: Factor G β-subunit βi3, The Factor G β-subunit of the present invention, containing an amino acid sequence that is the same as or substantially the same as the amino acid sequence represented by SEQ ID NO: 10: Factor G β-subunit β2, The Factor G β-subunit of the present invention, containing an amino acid sequence that is the same as or substantially the same as the amino acid sequence represented by SEQ ID NO: 12: Factor G β-subunit β5, The Factor G β-subunit of the present invention, containing an amino acid sequence that is the same as or substantially the same as the amino acid sequence represented by SEQ ID NO: 14: Factor G β-subunit βC1, and The Factor G β-subunit of the present invention, containing an amino acid sequence that is the same as or substantially the same as the amino acid sequence represented by SEQ ID NO: 16: Factor G β-subunit βC2.

"Factor G β-subunit βi2" is also referred to as "β-subunit βi2", "Factor G β-subunit βi3" is also referred to as "β-subunit βi3", "Factor G β-subunit β2" is also referred to as "β-subunit β2", "Factor G β-subunit β5" is also referred to as "β-subunit β5", "Factor G β-subunit βC1" is also referred to as "β-subunit βC1", and "Factor G β-subunit βC2" is also referred to as "β-subunit βC2".

Further, in a case where only "amino acid sequence of the Factor G β-subunit" is mentioned, the amino acid sequence of the Factor G β-subunit is used as a general term for "amino acid sequence that is the same as or substantially the same as the amino acid sequence represented by any one of SEQ ID NO: 6, 8, 10, 12, 14, or 16 described above.

4. Heterodimer of Present Invention

A heterodimeric of the present invention is "a heterodimer which combines a Factor G α-subunit containing an amino acid sequence that is the same as or substantially the same as the amino acid sequence represented by SEQ ID NO: 2 or SEQ ID NO: 4 with a Factor G β-subunit containing an amino acid sequence that is the same as or substantially the same as an amino acid sequence represented by any one of SEQ ID NO: 6, 8, 10, 12, 14, or 16".

In other words, the heterodimeric of the present invention is "a heterodimer which combines a Factor G α-subunit containing an amino acid sequence that is the same as or substantially the same as the amino acid sequence represented by SEQ ID NO: 2 or SEQ ID NO: 4 with a Factor G β-subunit containing an amino acid sequence that is the same as or substantially the same as an amino acid sequence represented by any one of SEQ ID NO: 6, 8, 10, 12, 14, or 16".

Specific examples of "the Factor G α-subunit containing an amino acid sequence that is the same as or substantially the same as the amino acid sequence represented by SEQ ID NO: 2 or SEQ ID NO: 4" and "the Factor G β-subunit containing an amino acid sequence that is the same as or substantially the same as an amino acid sequence represented by any one of SEQ ID NO: 6, 8, 10, 12, 14, or 16" are respectively as described in the section of "2. Factor G α-subunit of present invention" and in the section of "3. Factor G β-subunit of present invention.

The heterodimer of the present invention has a protease activity in the presence of BG.

Specific examples of the combination of the Factor G α-subunit and the Factor G β-subunit constituting the heterodimer of the present invention are listed in Table 1.

TABLE 1

| Combination No. | Factor G α-subunit | SEQ ID NO of amino acid sequence | Factor G β-subunit | SEQ ID NO of amino acid sequence |
|---|---|---|---|---|
| 1 | A | SEQ ID NO: 2 | βi2 | SEQ ID NO: 6 |
| 2 | A | | βi3 | SEQ ID NO: 8 |
| 3 | A | | β2 | SEQ ID NO: 10 |
| 4 | A | | β5 | SEQ ID NO: 12 |
| 5 | A | | βC1 | SEQ ID NO: 14 |
| 6 | A | | βC2 | SEQ ID NO: 16 |
| 7 | B | SEQ ID NO: 4 | βi2 | SEQ ID NO: 6 |
| 8 | B | | βi3 | SEQ ID NO: 8 |
| 9 | B | | β2 | SEQ ID NO: 10 |
| 10 | B | | β5 | SEQ ID NO: 12 |
| 11 | B | | βC1 | SEQ ID NO: 14 |
| 12 | B | | βC2 | SEQ ID NO: 16 |

Preferred examples of the combinations of the Factor G α-subunit and the Factor G β-subunit of the heterodimer of the present invention include combinations of the combination numbers 1, 2, 3, 4, 5, 6, 8, 9, and 12 in Table 1.

A combination of the combination number 1, 2, 4, 5, 9 or 12 in Table 1 is more preferable.

A combination of the combination number 1, 2, or 9 in Table 1 is still more preferable.

A combination of the combination number 1 or 2 in Table 1 is particularly preferable.

The Factor G α-subunit and the Factor G β-subunit constituting the heterodimer of the present invention may be formed such that a known tag peptide such as His tag, FLAG tag, Hat tag, or SUMO tag, or a so-called spacer is linked to the N-terminal or C-terminal thereof. Further, the Factor G α-subunit and the Factor G β-subunit constituting the heterodimer may have fragments of signal peptides, such as one to several amino acids, for example, one to three amino acids, at the N-terminal thereof.

5. Nucleic Acid Molecule According to Present Invention (1) Nucleic Acid Molecule Encoding Factor G α-Subunit of Present Invention Examples of the nucleic acid molecule encoding the Factor G α-subunit of the present invention include a nucleic acid molecule containing a base sequence encoding an amino acid sequence that is the same as or substantially the same as the amino acid sequence represented by SEQ ID NO: 2 or SEQ ID NO: 4. Specific examples of "amino acid sequence that is the same as or substantially the same as the amino acid sequence represented by SEQ ID NO: 2 or SEQ ID NO: 4" are the same as described in the section of "2. Factor G α-subunit of present invention".

Specific examples of the nucleic acid molecule encoding the Factor G α-subunit of the present invention include the following items (i) and (ii).

(i) Nucleic acid molecule containing base sequence that is same or substantially same as base sequence represented by SEQ ID NO: 1 or SEQ ID NO: 3

A nucleic acid molecule containing a base sequence that is the same as or substantially the same as the base sequence represented by SEQ ID NO: 1 encodes an amino acid sequence that is the same as or substantially the same as the amino acid sequence represented by SEQ ID NO: 2.

A nucleic acid molecule containing a base sequence that is the same as or substantially the same as the base sequence represented by SEQ ID NO: 3 encodes an amino acid sequence that is the same as or substantially the same as the amino acid sequence represented by SEQ ID NO: 4.

Examples of the base sequence of "nucleic acid molecule containing a base sequence that is substantially the same as the base sequence represented by SEQ ID NO: 1 or SEQ ID NO: 3" include a base sequence having a homology of approximately 80% or greater, preferably approximately 90% or greater, more preferably approximately 95% or greater, and still more preferably approximately 97% or greater with the base sequence represented by SEQ ID NO: 1 or SEQ ID NO: 3.

Further, examples of the base sequence of "nucleic acid molecule containing a base sequence that is substantially the same as the base sequence represented by SEQ ID NO: 1 or SEQ ID NO: 3" include a base sequence in which one to five, preferably one to three, more preferably one or two, and still more preferably one base in the base sequence represented by SEQ ID NO: 1 or SEQ ID NO: 3 has been substituted, deleted, inserted, or added. The substitution, deletion, insertion, or addition may occur simultaneously at one or a plurality of sites in one base sequence.

Among the above-described nucleic acid molecules, the nucleic acid molecule containing the base sequence represented by SEQ ID NO: 1 or SEQ ID NO: 3 is preferable, and the nucleic acid molecule containing the base sequence represented by SEQ ID NO: 1 is more preferable.

A base sequence encoding a so-called signal peptide may be added to the nucleic acid molecule containing a base sequence that is the same as or substantially the same as the base sequence represented by SEQ ID NO: 1 or SEQ ID NO: 3. The signal peptide and the base sequence encoding the signal peptide described in the present specification below are not particularly limited.

Specific examples of the nucleic acid molecule encoding "Factor G α-subunit of the present invention to which a base sequence encoding a signal peptide has been added" include a nucleic acid molecule containing a base sequence that is the same as or substantially the same as the base sequence represented by SEQ ID NO: 17 or SEQ ID NO: 19.

Examples of the base sequence of "nucleic acid molecule containing a base sequence that is substantially the same as the base sequence represented by SEQ ID NO: 17 or SEQ ID NO: 19" include a base sequence having a homology of approximately 80% or greater, preferably approximately 90% or greater, more preferably approximately 95% or greater, and still more preferably approximately 97% or greater with the base sequence represented by SEQ ID NO: 17 or SEQ ID NO: 19.

Further, examples of the base sequence of "nucleic acid molecule containing a base sequence that is substantially the same as the base sequence represented by SEQ ID NO: 17 or SEQ ID NO: 19" include a base sequence in which one to five, preferably one to three, more preferably one or two, and still more preferably one base in the base sequence represented by SEQ ID NO: 17 or SEQ ID NO: 19 has been substituted, deleted, inserted, or added. The substitution, deletion, insertion, or addition may occur simultaneously at one or a plurality of sites in one base sequence.

Among the above-described nucleic acid molecules, the nucleic acid molecule containing the base sequence represented by SEQ ID NO: 17 or SEQ ID NO: 19 is preferable, and the nucleic acid molecule containing the base sequence represented by SEQ ID NO: 17 is more preferable.

(ii) A nucleic acid molecule which contains a base sequence encoding an amino acid sequence that is the same as or substantially the same as the amino acid sequence represented by SEQ ID NO: 2 or SEQ ID NO: 4 and contains a base sequence optimized for the kind of the host cell expressing the nucleic acid molecule in a case where a protein containing an amino acid sequence that is the same as or substantially the same as the amino acid sequence represented by SEQ ID NO: 2 or SEQ ID NO: 4 is expressed by a genetic engineering method.

Among the above-described nucleic acid molecules, a nucleic acid molecule which contains a base sequence encoding the amino acid sequence represented by SEQ ID NO: 2 or SEQ ID NO: 4 and contains a base sequence optimized for the kind of the host cell expressing the nucleic acid molecule in a case where a protein containing the amino acid sequence represented by SEQ ID NO: 2 or SEQ ID NO: 4 is expressed by a genetic engineering method is more preferable.

A nucleic acid molecule which contains a base sequence encoding the amino acid sequence represented by SEQ ID NO: 2 and contains a base sequence optimized for the kind of the host cell expressing the nucleic acid molecule in a case where a protein containing the amino acid sequence represented by SEQ ID NO: 2 is expressed by a genetic engineering method is more preferable.

Examples of the base sequence optimized to express a nucleic acid molecule containing a base sequence encoding an amino acid sequence that is the same as or substantially the same as the amino acid sequence represented by SEQ ID NO: 2 or SEQ ID NO: 4 using an insect cell as a host include a nucleic acid molecule containing a base sequence that is the same as or substantially the same as the base sequence represented by SEQ ID NO: 33 or SEQ ID NO: 34.

Examples of the base sequence of "nucleic acid molecule containing a base sequence that is substantially the same as the base sequence represented by SEQ ID NO: 33 or SEQ ID NO: 34" include a base sequence having a homology of approximately 80% or greater, preferably approximately 90% or greater, more preferably approximately 95% or greater, and still more preferably approximately 97% or greater with the base sequence represented by SEQ ID NO: 33 or SEQ ID NO: 34.

Further, examples of the base sequence of "nucleic acid molecule containing a base sequence that is substantially the same as the base sequence represented by SEQ ID NO: 33 or SEQ ID NO: 34" include a base sequence in which one to five, preferably one to three, more preferably one or two, and still more preferably one base in the base sequence represented by SEQ ID NO: 33 or SEQ ID NO: 34 has been substituted, deleted, inserted, or added. The substitution, deletion, insertion, or addition may occur simultaneously at one or a plurality of sites in one base sequence.

Among the above-described nucleic acid molecules, the nucleic acid molecule containing the base sequence represented by SEQ ID NO: 33 or SEQ ID NO: 34 is preferable, and the nucleic acid molecule containing the base sequence represented by SEQ ID NO: 34 is particularly preferable.

A base sequence encoding a so-called signal peptide may be added to the nucleic acid molecule containing a base sequence that is the same as or substantially the same as the base sequence represented by SEQ ID NO: 33 or SEQ ID NO: 34. Specific examples of such a nucleic acid molecule include a nucleic acid molecule containing a base sequence that is the same as or substantially the same as the base sequence represented by SEQ ID NO: 41 or SEQ ID NO: 42.

Examples of the base sequence of "nucleic acid molecule containing a base sequence that is substantially the same as the base sequence represented by SEQ ID NO: 41 or SEQ ID NO: 42" include a base sequence having a homology of approximately 80% or greater, preferably approximately 90% or greater, more preferably approximately 95% or greater, and still more preferably approximately 97% or greater with the base sequence represented by SEQ ID NO: 41 or SEQ ID NO: 42.

Further, examples of the base sequence of "nucleic acid molecule containing a base sequence that is substantially the same as the base sequence represented by SEQ ID NO: 41 or SEQ ID NO: 42" include a base sequence in which one to five, preferably one to three, more preferably one or two, and still more preferably one base in the base sequence represented by SEQ ID NO: 41 or SEQ ID NO: 42 has been substituted, deleted, inserted, or added. The substitution, deletion, insertion, or addition may occur simultaneously at one or a plurality of sites in one base sequence.

Among the above-described nucleic acid molecules, the nucleic acid molecule containing the base sequence represented by SEQ ID NO: 41 or SEQ ID NO: 42 is preferable. Further, the nucleic acid molecule containing the base sequence represented by SEQ ID NO: 41 is more preferable.

The nucleic acid molecule encoding the Factor G α-subunit of the present invention may be DNA such as cDNA or RNA.

Further, the nucleic acid molecule encoding the Factor G α-subunit of the present invention may be single-stranded or double-stranded. In a case where the nucleic acid is double-stranded, for example, the double strand consists of a base sequence represented by SEQ ID NO: 1, 3, 17, 18, 33, 34, 41, or 42 and a complementary strand thereof.

Further, the nucleic acid molecule encoding the Factor G α-subunit of the present invention may be formed such that a known tag peptide such as His tag, FLAG tag, Hat tag, or SUMO tag, or a so-called spacer is linked to the 5'-terminal or 3'-terminal thereof. Further, a base sequence encoding a signal peptide may be linked to the 5'-terminal.

Specific preferred examples of "nucleic acid molecule encoding the Factor G α-subunit of the present invention" according to the present invention include a nucleic acid molecule containing a base sequence represented by any one of SEQ ID NO: 1, 3, 17, 19, 33, 34, 41, or 42.

Among the above-described nucleic acid molecules, the nucleic acid molecule containing the base sequence represented by any one of SEQ ID NO: 1, 17, 33, or 41 is preferable.

The nucleic acid molecules encoding the Factor G α-subunit of the present invention described above may be collectively referred to as "nucleic acid molecule α" below.

(2) Nucleic Acid Molecule Encoding Factor G β-Subunit of Present Invention

Examples of the nucleic acid molecule encoding the Factor G β-subunit of the present invention include a nucleic acid molecule containing a base sequence encoding an amino acid sequence that is the same as or substantially the same as the amino acid sequence represented by any one of SEQ ID NO: 6, 8, 10, 12, 14, or 16. Specific examples of "amino acid sequence that is the same as or substantially the same as the amino acid sequence represented by any one of SEQ ID NO: 6, 8, 10, 12, 14, or 16" are the same as described in the section of "3. Factor G β-subunit of present invention".

Specific examples of the nucleic acid molecule encoding the Factor G β-subunit of the present invention include the following items (i) and (ii).

(i) Nucleic acid molecule containing amino acid sequence that is same as or substantially same as base sequence represented by any one of SEQ ID NO: 5, 7, 9, 11, 13, or 15.

A nucleic acid molecule containing a base sequence that is the same as or substantially the same as the base sequence represented by SEQ ID NO: 5 encodes an amino acid sequence that is the same as or substantially the same as the amino acid sequence represented by SEQ ID NO: 6. The nucleic acid molecule encodes the amino acid sequence of the Factor G β-subunit βi2.

A nucleic acid molecule containing a base sequence that is the same as or substantially the same as the base sequence represented by SEQ ID NO: 7 encodes an amino acid sequence that is the same as or substantially the same as the amino acid sequence represented by SEQ ID NO: 8. The nucleic acid molecule encodes the amino acid sequence of the Factor G β-subunit βi3.

A nucleic acid molecule containing a base sequence that is the same as or substantially the same as the base sequence represented by SEQ ID NO: 9 encodes an amino acid sequence that is the same as or substantially the same as the amino acid sequence represented by SEQ ID NO: 10. The nucleic acid molecule encodes the amino acid sequence of the Factor G β-subunit β2.

A nucleic acid molecule containing a base sequence that is the same as or substantially the same as the base sequence represented by SEQ ID NO: 11 encodes an amino acid sequence that is the same as or substantially the same as the amino acid sequence represented by SEQ ID NO: 12. The nucleic acid molecule encodes the amino acid sequence of the Factor G β-subunit β5.

A nucleic acid molecule containing a base sequence that is the same as or substantially the same as the base sequence represented by SEQ ID NO: 13 encodes an amino acid sequence that is the same as or substantially the same as the amino acid sequence represented by SEQ ID NO: 14. The nucleic acid molecule encodes the amino acid sequence of the Factor G β-subunit βC1.

A nucleic acid molecule containing a base sequence that is the same as or substantially the same as the base sequence represented by SEQ ID NO: 15 encodes an amino acid sequence that is the same as or substantially the same as the amino acid sequence represented by SEQ ID NO: 16. The nucleic acid molecule encodes the amino acid sequence of the Factor G β-subunit βC2.

Examples of the base sequence of "nucleic acid molecule containing a base sequence that is substantially the same as the base sequence represented by any one of SEQ ID NO: 5, 7, 9, 11, 13, or 15" include a base sequence having a homology of approximately 80% or greater, preferably approximately 90% or greater, more preferably approximately 95% or greater, and still more preferably approximately 97% or greater with the base sequence represented by any one of SEQ ID NO: 5, 7, 9, 11, 13, or 15.

Further, examples of the base sequence of "nucleic acid molecule containing a base sequence that is substantially the same as the base sequence represented by any one of SEQ ID NO: 5, 7, 9, 11, 13, or 15" include a base sequence in which one to five, preferably one to three, more preferably one or two, and still more preferably one base in the base sequence represented by any one of SEQ ID NO: 5, 7, 9, 11, 13, or 15 has been substituted, deleted, inserted, or added. The substitution, deletion, insertion, or addition may occur simultaneously at one or a plurality of sites in one base sequence.

Among the above-described nucleic acid molecules, the nucleic acid molecule containing a base sequence represented by any one of SEQ ID NO: 5, 7, 9, 11, 13, or 15 is preferable, the nucleic acid molecule containing a base sequence represented by any one of SEQ ID NO: 5, 7, or 9 is more preferable, and the nucleic acid molecule containing a base sequence represented by SEQ ID NO: 5 or 7 is still more preferable.

A base sequence encoding a so-called signal peptide may be added to the nucleic acid molecule containing a base sequence that is the same as or substantially the same as the base sequence represented by any one of SEQ ID NO: 5, 7, 9, 11, 13, or 15. Specific examples of the nucleic acid molecule encoding "Factor G β-subunit of the present invention to which a base sequence encoding a signal peptide has been added" include a nucleic acid molecule containing a base sequence that is the same as or substantially the same as the base sequence represented by any one of SEQ ID NO: 21, 23, 25, 27, 29, or 31.

Examples of the base sequence of "nucleic acid molecule containing a base sequence that is substantially the same as the base sequence represented by any one of SEQ ID NO: 21, 23, 25, 27, 29, or 31" include a base sequence having a homology of approximately 80% or greater, preferably approximately 90% or greater, more preferably approximately 95% or greater, and still more preferably approximately 97% or greater with the base sequence represented by any one of SEQ ID NO: 21, 23, 25, 27, 29, or 31.

Further, examples of the base sequence of "nucleic acid molecule containing a base sequence that is substantially the same as the base sequence represented by any one of SEQ ID NO: 21, 23, 25, 27, 29, or 31" include a base sequence in which one to five, preferably one to three, more preferably one or two, and still more preferably one base in the base sequence represented by any one of SEQ ID NO: 21, 23, 25, 27, 29, or 31 has been substituted, deleted, inserted, or added. The substitution, deletion, insertion, or addition may occur simultaneously at one or a plurality of sites in one base sequence.

Among the above-described nucleic acid molecules, the nucleic acid molecule containing a base sequence represented by any one of SEQ ID NO: 21, 23, 25, 27, 29, or 31 is preferable, the nucleic acid molecule containing a base sequence represented by any one of SEQ ID NO: 21, 23, or 25 is more preferable, and the nucleic acid molecule containing a base sequence represented by SEQ ID NO: 21 or 23 is still more preferable.

(ii) A nucleic acid molecule which contains a base sequence encoding an amino acid sequence that is the same as or substantially the same as the amino acid sequence represented by any one of SEQ ID NO: 6, 8, 10, 12, 14, or 16 and contains a base sequence optimized for the kind of the cell expressing the nucleic acid molecule in a case where a protein containing an amino acid sequence that is the same as or substantially the same as the amino acid sequence represented by any one of SEQ ID NO: 6, 8, 10, 12, 14, or 16 is expressed by a genetic engineering method.

Among the above-described nucleic acid molecules, a nucleic acid molecule which contains a base sequence encoding the amino acid sequence represented by any one of SEQ ID NO: 6, 8, 10, 12, 14, or 16 and contains a base sequence optimized for the kind of the cell expressing the nucleic acid molecule in a case where a protein containing the amino acid sequence represented by any one of SEQ ID NO: 6, 8, 10, 12, 14, or 16 is expressed by a genetic engineering method is more preferable.

A nucleic acid molecule which contains a base sequence encoding the amino acid sequence represented by any one of SEQ ID NO: 6, 8, or 10 and contains a base sequence optimized for the kind of the cell expressing the nucleic acid molecule in a case where a protein containing the amino acid sequence represented by any one of SEQ ID NO: 6, 8, or 10 is expressed by a genetic engineering method is more preferable.

A nucleic acid molecule which contains a base sequence encoding the amino acid sequence represented by SEQ ID NO: 6 or 8 and contains a base sequence optimized for the kind of the cell expressing the nucleic acid molecule in a case where a protein containing the amino acid sequence represented by SEQ ID NO: 6 or 8 is expressed by a genetic engineering method is still more preferable.

Examples of the base sequence optimized to express a nucleic acid molecule containing a base sequence encoding an amino acid sequence that is the same as or substantially the same as the amino acid sequence represented by any of SEQ ID NO: 6, 8, 10, 12, 14, or 16 using an insect cell as a host include a nucleic acid molecule containing a base sequence that is the same as or substantially the same as the base sequence represented by any one of SEQ ID NO: 35 to 40 or 69.

Examples of the base sequence of "nucleic acid molecule containing a base sequence that is substantially the same as the base sequence represented by any one of SEQ ID NO: 35 to 40 or 69" include a base sequence having a homology of approximately 80% or greater, preferably approximately 90% or greater, more preferably approximately 95% or greater, and still more preferably approximately 97% or greater with the base sequence represented by any one of SEQ ID NO: 35 to 40 or 69.

Further, examples of the base sequence of "nucleic acid molecule containing a base sequence that is substantially the same as the base sequence represented by any one of SEQ ID NO: 35 to 40 or 69" include a base sequence in which one to five, preferably one to three, more preferably one or two, and still more preferably one base in the base sequence represented by any one of SEQ ID NO: 35 to 40 or 69 has been substituted, deleted, inserted, or added. The substitution, deletion, insertion, or addition may occur simultaneously at one or a plurality of sites in one base sequence.

Among the above-described nucleic acid molecules, the nucleic acid molecule containing a base sequence represented by any one of SEQ ID NO: 35 to 40 or 69 is preferable, the nucleic acid molecule containing a base sequence represented by any one of SEQ ID NO: 35, 36, 37, or 69 is more preferable, and the nucleic acid molecule containing a base sequence represented by SEQ ID NO: 35, 36, or 69 is still more preferable.

A base sequence encoding a so-called signal peptide may be added to the nucleic acid molecule containing a base sequence that is the same as or substantially the same as the base sequence represented by any one of SEQ ID NOs: 35 to 40. Examples of such a nucleic acid molecule include a nucleic acid molecule containing a base sequence that is substantially the same as the base sequence represented by any one of SEQ ID NOs: 43 to 48. Other examples thereof include a nucleic acid molecule containing a base sequence that is substantially the same as the base sequence represented by SEQ ID NO: 68 having a signal peptide and a tag sequence described below.

Examples of the base sequence of "nucleic acid molecule containing a base sequence that is substantially the same as the base sequence represented by any one of SEQ ID NO: 43 to 48 or 68" include a base sequence having a homology of approximately 80% or greater, preferably approximately 90% or greater, more preferably approximately 95% or greater, and still more preferably approximately 97% or greater with the base sequence represented by any one of SEQ ID NO: 43 to 48 or 68.

Further, examples of the base sequence of "nucleic acid molecule containing a base sequence that is substantially the same as the base sequence represented by any one of SEQ ID NO: 43 to 48 or 68" include a base sequence in which one to five, preferably one to three, more preferably one or two, and still more preferably one base in the base sequence represented by any one of SEQ ID NO: 43 to 48 or 68 has been substituted, deleted, inserted, or added. The substitution, deletion, insertion, or addition may occur simultaneously at one or a plurality of sites in one base sequence.

Among the above-described nucleic acid molecules, the nucleic acid molecule containing a base sequence represented by any one of SEQ ID NO: 43 to 48 or 68 is preferable, the nucleic acid molecule containing a base sequence represented by any one of SEQ ID NO: 43, 44, 45, or 68 is more preferable, and the nucleic acid molecule containing a base sequence represented by SEQ ID NO: 43 or 44 is still more preferable.

The nucleic acid molecule encoding the Factor G β-subunit of the present invention may be DNA such as cDNA or RNA.

Further, the nucleic acid molecule encoding the Factor G β-subunit of the present invention may be single-stranded or double-stranded. In a case where the nucleic acid is double-stranded, for example, the double strand consists of a base sequence represented by SEQ ID NO: 5, 7, 9, 11, 13, 15, 21, 23, 25, 27, 29, 31, 35 to 40, 43 to 48, 68, or 69 and a complementary strand thereof.

Further, the nucleic acid molecule encoding the Factor G β-subunit of the present invention may be formed such that a known tag peptide such as His tag, FLAG tag, Hat tag, or SUMO tag or a so-called spacer is linked to the 5'-terminal or 3'-terminal thereof. Further, a base sequence encoding a signal peptide may be linked to the 5'-terminal.

Specific preferred examples of "nucleic acid molecule encoding the Factor G β-subunit of the present invention" according to the present invention include a nucleic acid molecule containing a base sequence represented by any one of SEQ ID NO: 5, 7, 9, 11, 13, 15, 21, 23, 25, 27, 29, 31, 35 to 40, 43 to 48, 68, or 69.

A nucleic acid molecule containing the base sequence represented by any one of SEQ ID NO: 5, 7, 9, 21, 23, 25, 35, 36, 37, 43, 44, 45, 68, or 69 is preferable.

A nucleic acid molecule containing a base sequence represented by any one of SEQ ID NO: 5, 7, 21, 23, 35, 36, 43, 44, 68, or 69 is more preferable.

The nucleic acid molecules encoding the Factor G β-subunit of the present invention described above may be collectively referred to as "nucleic acid molecule β" below.

(3) Nucleic Acid Molecule According to Present Invention

Further, the above-described "nucleic acid molecule α" and "nucleic acid molecule β" may be collectively referred to as "nucleic acid molecule according to the present invention".

Further, as described above, the nucleic acid molecule according to the present invention may be formed such that a known tag peptide such as His tag, FLAG tag, Hat tag, or SUMO tag, or a so-called spacer is linked to the 5'-terminal or 3'-terminal thereof.

Examples thereof include a nucleic acid molecule in which a base sequence obtained by linking a base sequence encoding a tag to the base sequence represented by any one of SEQ ID NO: 1, 3, 5, 7, 9, 11, 13, 15, 17, 19, 21, 23, 25, 27, 29, or 31 is optimized for the kind of a cell to be expressed.

Other examples thereof include a nucleic acid molecule having a base sequence that designs the amino acid sequence (SEQ ID NO: 67) in which the signal sequence, the Hat tag, the SUMO tag, and the Factor G β-subunit i2 (amino acid sequence: SEQ ID NO: 6) are arranged in this order from the 5'-terminal side, encodes this amino acid sequence, and is represented by SEQ ID NO: 68 optimized for an insect cell. In the base sequence represented by SEQ ID NO: 68, the base sequence encoding the Factor G β-subunit i2 is the base sequence represented by SEQ ID NO: 69.

The nucleic acid molecule according to the present invention may be DNA such as cDNA or RNA.

Examples of the combination of the nucleic acid molecule α and the nucleic acid molecule β that encodes the combination of the Factor G α-subunit and the Factor G β-subunit constituting the heterodimer of the present invention include combinations listed in Table 2.

TABLE 2

| Combination No. | Nucleic acid molecule α (SEQ ID NO) | Nucleic acid molecule β (SEQ ID NO) |
|---|---|---|
| 1 | 1 | 5 |
| 2 | 1 | 7 |
| 3 | 1 | 9 |
| 4 | 1 | 11 |
| 5 | 1 | 13 |
| 6 | 1 | 15 |
| 7 | 3 | 5 |
| 8 | 3 | 7 |
| 9 | 3 | 9 |
| 10 | 3 | 11 |
| 11 | 3 | 13 |
| 12 | 3 | 15 |
| 13 | 17 | 21 |
| 14 | 17 | 23 |
| 15 | 17 | 25 |
| 16 | 17 | 27 |
| 17 | 17 | 29 |
| 18 | 17 | 31 |
| 19 | 19 | 21 |
| 20 | 19 | 23 |
| 21 | 19 | 25 |
| 22 | 19 | 27 |
| 23 | 19 | 29 |
| 24 | 19 | 31 |
| 25 | 33 | 35 |
| 26 | 33 | 36 |
| 27 | 33 | 37 |
| 28 | 33 | 38 |
| 29 | 33 | 39 |
| 30 | 33 | 40 |
| 31 | 34 | 35 |
| 32 | 34 | 36 |
| 33 | 34 | 37 |
| 34 | 34 | 38 |
| 35 | 34 | 39 |
| 36 | 34 | 40 |
| 37 | 41 | 43 |
| 38 | 41 | 44 |
| 39 | 41 | 45 |
| 40 | 41 | 46 |

TABLE 2-continued

| Combination No. | Nucleic acid molecule α (SEQ ID NO) | Nucleic acid molecule β (SEQ ID NO) |
| --- | --- | --- |
| 41 | 41 | 47 |
| 42 | 41 | 48 |
| 43 | 42 | 43 |
| 44 | 42 | 44 |
| 45 | 42 | 45 |
| 46 | 42 | 46 |
| 47 | 42 | 47 |
| 48 | 42 | 48 |
| 49 | 41 | 68 |

Preferred examples of the combinations of SEQ ID NOs of (nucleic acid molecule α and nucleic acid molecule β) include the combination numbers 1, 2, 3, 4, 5, 6, 8, 9, 12, 13, 14, 15, 16, 17, 18, 20, 21, 24, 25, 26, 27, 28, 29, 30, 32, 33, 36, 37, 38, 39, 40, 41, 42, 44, 45, 48, and 49 in Table 2.

Among these, the combination numbers 1, 2, 4, 5, 9, 12, 13, 14, 16, 17, 21, 24, 25, 26, 28, 29, 33, 36, 37, 38, 40, 41, 45, 48, and 49 in Table 2 are more preferable.

The combination numbers 1, 2, 9, 13, 14, 21, 25, 26, 33, 37, 38, 45, and 49 in Table 2 are still more preferable.

The combination numbers 1, 2, 13, 14, 25, 26, 37, 38, and 49 in Table 2 are particularly preferable.

6. Method of Acquiring Heterodimer of Present Invention

Examples of the method of acquiring the heterodimer of the present invention include the following three methods.

(1) Method of acquiring heterodimer by coexpression
(2) Method of acquiring heterodimer by acquiring each of α-subunit and β-subunit and binding these.
(3) Method of acquiring heterodimer by chemical synthesis Among these, "(1) method of acquiring heterodimer by coexpression" is preferable in consideration of the yield and the like of the heterodimer.

(1) Method of Acquiring Heterodimer by Coexpression

The heterodimer of the present invention can be obtained by a known method using a genetic recombinant technology of "incorporating the nucleic acid molecules (the nucleic acid molecule α and the nucleic acid molecule β) according to the present invention into an expression vector such as an appropriate virus or plasmid, transforming (or transducing) an appropriate host cell by a known method using the recombinant expression vector, culturing the obtained transformant (transductant), coexpressing the Factor G α-subunit of the present invention and the Factor G β-subunit of the present invention, and secreting the heterodimer of the present invention extracellularly or intracellularly".

Examples of the method include a method using an expression system that uses eukaryotic cells such as general insect cells, mammalian cells, and yeasts or an expression system that uses a prokaryote such as *Escherichia coli*.

Hereinafter, the method for obtaining the heterodimer of the present invention by coexpression will be described based on a method of using an expression system of baculovirus-insect cells as an example.

1) Preparation of Recombinant According to Present Invention which is Incorporated with Nucleic Acid Molecule According to Present Invention The preparation of the recombinant according to the present invention using the expression system of baculovirus-insect cells is typically performed by temporarily incorporating the nucleic acid molecule (the nucleic acid molecule α or the nucleic acid molecule β) according to the present invention into a transfer vector and co-transfecting the vector together with baculovirus genome DNA into a host insect cell.

Specific examples of the nucleic acid molecule α and the nucleic acid molecule β used in the present method are as described in the section of "5. Nucleic acid molecule according to present invention".

Preferred examples of the nucleic acid molecule α used in the present method include a nucleic acid molecule containing a base sequence represented by any one of SEQ ID NO: 1, 3, 17, 19, 33, 34, 41, or 42. Among these, the nucleic acid molecule containing a base sequence represented by any one of SEQ ID NO: 33, 34, 41, or 42 is more preferable. The nucleic acid molecule containing a base sequence represented by SEQ ID NO: 41 or 42 is particularly preferable. As the kind of nucleic acid molecule, cDNA is more preferable.

Preferred examples of the nucleic acid molecule β used in the present method include a nucleic acid molecule containing a base sequence represented by any one of SEQ ID NO: 5, 7, 9, 11, 13, 15, 21, 23, 25, 27, 29, 31, 35 to 40, 43 to 48, 68, or 69. Among these, the nucleic acid molecule containing a base sequence represented by any one of SEQ ID NO: 35 to 40, 43 to 48, 68, or 69 is more preferable. The nucleic acid molecule containing a base sequence represented by any one of SEQ ID NO: 43 to 48 or 68 is particularly preferable. As the kind of nucleic acid molecule, cDNA is more preferable.

The method of obtaining the nucleic acid molecule (the nucleic acid molecule α or the nucleic acid molecule β) according to the present invention is not particularly limited, the target nucleic acid molecule according to the present invention can be obtained by a preparation method using a known chemical synthesis method or a method typically used for synthesis of DNA, in which an oligonucleotide is synthesized using a typical phosphoroamidite method using a DNA synthesizer and purification is performed using a known method according to an anion exchange column chromatography.

As the baculovirus used for the expression system using baculovirus-insect cells, Nuclear Polyhedrosis Virus (NPV) is preferable. Examples thereof include *Autographa californica* nuclear polyhedrosis virus (AcNPV), which is a virus that infects the Noctuidae.

Examples of the host insect cells include expresSF+™ (manufactured by Protein Science Corporation) derived from *S. frugiperda*, Sf9, Sf21, and the like derived from *Spodoptera Frugiperda*, and High 5, BTI-TN-5B1-4, and the like (manufactured by Invitrogen) derived from *Trichoplusia ni*.

Examples of the transfer vector include vectors for insect cells such as pIEx/Bac-1, pIEx/Bac-3 (manufactured by Novagen), pVL1392, pVL1393, pBlueBacIII (all manufactured by Invitrogen), and pBacPAK9.

The transfer vector incorporated with the nucleic acid molecule according to the present invention can be obtained by, for example, incorporating cDNA into the transfer vector as described above using cDNA as the nucleic acid molecule (the nucleic acid molecule α and/or the nucleic acid molecule β) according to the present invention. The transfer vector may be acquired by a known method.

The cDNA which is the nucleic acid molecule α or the nucleic acid molecule β to be incorporated into the transfer vector may be used after being digested with a restriction enzyme or after adding a linker for incorporating the cDNA into the transfer vector.

Further, in order to facilitate the detection and purification of the heterodimer of the present invention, the target heterodimeric of the present invention may be expressed as a fusion protein with a known marker such as another tag peptide or protein. Examples of the tag peptide to be fused include FLAG tag, 3×FLAG tag, His tag (His tag, for example, 6×His tag), Hat tag, and SUMO tag, and examples of the protein include β-galactosidase (β-Gal), green fluorescent protein (GFP), and maltose-binding protein (MBP).

In this case, for example, the heterodimer of the present invention may be expressed using cDNA having a sequence in which a base sequence of a His tag gene is linked to the 5'-terminal side or the 3'-terminal side of the base sequence of the nucleic acid molecule α and/or the nucleic acid molecule β. Specifically, for example, cDNA having such a sequence may be incorporated into the transfer vector. In this manner, the heterodimer of the present invention is expressed as a fusion protein with a His tag protein. Therefore, by confirming the expression of the His tag, the expression of the heterodimer of the present invention can be easily confirmed.

In the preparation of the recombinant according to the present invention, in a case where a transfer vector incorporated with a nucleic acid molecule and baculovirus genomic DNA are co-transfected into a host insect cell, the cotransfection may be typically performed using a transfection reagent such as ScreenFect™ A plus (manufactured by FUJIFILM Wako Pure Chemical Corporation). For example, the cotransfection may be performed by a known method such as a heat shock method, a calcium phosphate method (JP1990-227075A (JP-H02-227075A)), or a lipofection method (Proc. Natl. Acad. Sci., USA, 84, 7413, 1987).

The culture supernatant is collected 3 to 10 days after the cotransfection, and the recombinant baculovirus is selected and purified by a known method such as a limiting dilution method or a plaque method.

A recombinant baculovirus incorporated with the base sequence of the target nucleic acid molecule α or a recombinant baculovirus (recombinant according to the present invention) incorporated with the base sequence of the nucleic acid molecule β can be obtained by the above-described method.

2) Preparation of Transformant According to Present Invention by Transfection of Host Cells The recombinant baculovirus (recombinant according to the present invention) obtained above is transfected into a host insect cell by the following method.

That is, the recombinant baculovirus incorporated with the nucleic acid molecule α and the recombinant baculovirus incorporated with the nucleic acid molecule β are added to the culture medium of the host cell. It is preferable that the recombinant baculovirus incorporated with the nucleic acid molecule α is added at a volume of infection (hereinafter, abbreviated as VOI) of 1/400 to 1/200 and the recombinant baculovirus incorporated with the nucleic acid molecule β was added at a ratio of VOI of 1/200 to 1/100 so that the expression level of the Factor G α-subunit with respect to the expression level of the Factor G β-subunit is suppressed. In this case, the ratio of the Factor G α-subunit to the Factor G β-subunit is in a range of 0.4 to 0.8:0.9 to 1.8 in terms of multiplicity of infection (hereinafter, abbreviated as MOI).

A host cell which is a transformant according to the present invention, obtained by transfection with the recombinant baculovirus which is a recombinant according to the present invention, can be obtained by the above-described method.

Further, the transformant according to the present invention can also be obtained by the following method without using the baculovirus.

First, the nucleic acid molecule α or the nucleic acid molecule β according to the present invention is incorporated into vector DNA according to, for example, a known method. A so-called expression vector is useful.

The expression vector is not particularly limited as long as the expression vector can be replicated and maintained or self-proliferated in various host cells of prokaryotic cells and/or eukaryotic cells and has a function of expressing and producing the polynucleotide of the present invention. Examples of the expression vector include a plasmid vector and a phage vector.

Specific examples of such a vector include plasmids used in an insect cell expression system, such as pIZT/V5-His, pIB/V5-His (manufactured by Termo Fisher Scientific), and pIEx and pIEx Bac Series (such as pIEx-Bac-1, manufactured by Merck Millipore), plasmids derived from *Escherichia coli*, such as pUC119 (manufactured by Takara Shuzo Co., Ltd.), pQE-TRI plasmid (manufactured by Qiagen), pBluescript II KS+ (manufactured by Stratagene), pBR322 (manufactured by Takara Shuzo), pGEM, PGEX, pUC, pBS, pET, and pGEM-3ZpMAL, yeast-derived plasmids such as pB42AD, pESP, and pESC, and *Bacillus subtilis*-derived plasmids such as pHT926, pTB51, and pHY481. Examples of a mammalian cell-derived plasmid include pCAT3, pcDNA3.1, pCMV, and pCAG.

Examples of the phage include a bacteriophage, for example, λ phage such as λENBL3 (manufactured by Stratagene), λDASHII (manufactured by Funakoshi Co., Ltd.), λgt10, or λgt11 (all manufactured by Toyobo Co., Ltd.) and a cosmid vector such as Charomid DNA (manufactured by FUJIFILM Wako Pure Chemical Corporation) or Lorist6 (manufactured by FUJIFILM Wako Pure Chemical Corporation).

A recombinant expression vector incorporated with the nucleic acid molecule according to the present invention can be prepared by incorporating the nucleic acid molecule according to the present invention into the above-described vector or the like by a known method. Examples of such a vector include vectors incorporated with a nucleic acid molecule α, a nucleic acid molecule β, or a nucleic acid molecule α and a nucleic acid molecule β.

The transformant according to the present invention can be prepared by introducing the above-described recombinant expression vector or the like into a host cell. Examples of such a transformant include transformants incorporated with a nucleic acid molecule α, a nucleic acid molecule β, or a nucleic acid molecule α and a nucleic acid molecule β.

3) Culture of Host Cells

The heterodimer of the present invention can be produced by culturing the transfected host cells (transformant according to the present invention) obtained by the above-described method in an appropriate culture medium according to the host cells, coexpressing the Factor G α-subunit of the present invention and the Factor G β-subunit of the present invention in the culture, and separating and purifying the obtained heterodimer of the present invention from the culture.

The transfected host cells may be cultured by a method known in the field. The culture conditions, for example, the temperature, the pH of the culture medium, and the fermentation time may be appropriately set such that the maximum titer of the heterodimer of the present invention can be obtained.

In a case where the host is an insect cell, examples of the culture medium include PSFM-J1 culture medium (manufactured by FUJIFILM Wako Pure Chemical Corporation), TNM-FH culture medium, Grace's Insect Medium [Proc.

Natl. Acad. Sci. USA, (1985). 82, 8404], Sf-100 II SFM culture medium (manufactured by Life Technologies), and ExCell400 and ExCell405 (both manufactured by JRH Biosciences). The pH thereof is preferably in a range of 5 to 8.

In order to prevent BG contained in serum from being mixed, it is preferable to use a serum-free culture medium to which fetal calf serum (FCS) or the like is not added, as the culture medium.

Further, a culture medium from which mixed BG has been removed by the method of removing BG using the Factor G α-subunit of the present invention described below may be used.

The transfected host cells are cultured typically at 20° C. to 40° C. and preferably at 25° C. to 30° C. for approximately 12 hours to 10 days. As necessary, aeration, stirring, and rotation culture may be performed.

Here, for example, in a case where a His tag sequence is linked as a marker, it is possible to confirm whether the transformant incorporated with the target nucleic acid molecule α and the target nucleic acid molecule β is obtained, by ELISA or the like using an anti-His antibody.

4) Preparation of Heterodimer of Present Invention

The heterodimer of the present invention can be obtained from the cultured product obtained by the above-described culture as follows.

That is, in a case where the heterodimer of the present invention is secreted outside the cytoplasm of the transformant, cells are removed by a known method of filtering or centrifuging the cultured product of the transformant according to the present invention which is obtained in the section of "3) Culture of host cells", to obtain a culture filtrate or a culture supernatant. The heterodimer of the present invention is separated and purified from the culture filtrate or culture supernatant according to a commonly used method for separating and purifying natural or synthetic proteins.

Further, in a case where the heterodimer of the present invention is present in the periplasm or cytoplasm of the transformant, the cultured product of the transformant according to the present invention which is obtained in the section 3) above is suspended in an appropriate buffer solution after collecting bacterial cells or cells using a known method such as filtration or centrifugation, destroying the cell walls and/or cell membranes of the cells using a method such as a surfactant treatment, an ultrasonic treatment, a lysozyme treatment, or freezing-thawing, and performing a method such as centrifugation or filtration, thereby obtaining a crude extract containing the heterodimer of the present invention. Further, the heterodimer of the present invention is separated and purified from the crude extract using a known method that has been commonly used for separating and purifying natural or synthetic proteins.

Further, in a case where cDNA in which a sequence encoding a marker such as a His tag gene tag peptide as described above is linked to the nucleic acid molecule of the present invention is used, the expressed protein can be separated by a known method according to the marker thereof and purified by the above-described method.

Examples of the method of separating and purifying the heterodimer of the present invention include a known method using solubility such as salting-out or a solvent precipitation method, a method of using a difference in molecular weight such as dialysis, ultrafiltration, gel filtration chromatography, or sodium dodecyl sulfate-polyacrylamide gel electrophoresis, a method of using an electric charge such as ion exchange chromatography, a method of using a specific affinity such as affinity chromatography, a method of using a difference in hydrophobicity such as reversed phase high performance liquid chromatography, and a method of using a difference in isoelectric point such as isoelectric focusing.

(2) Method of Acquiring Heterodimer by Acquiring Each of α-Subunit and β-Subunit and Binding These.

As another method of acquiring the heterodimer of the present invention, a method of "obtaining each of the Factor G α-subunit of the present invention and the Factor G β-subunit of the present invention and binding the obtained Factor G α-subunit of the present invention and the Factor G β-subunit of the present invention to each other" is exemplified.

1) Acquisition of Factor G α-Subunit of Present Invention (Factor G α-Subunit A of Present Invention or Factor G α-Subunit B of Present Invention)

The Factor G α-subunit of the present invention can be acquired by, for example, the following method.

A recombinant baculovirus incorporated with the nucleic acid molecule α (which may contain a base sequence encoding a marker such as a signal peptide or His tag sequence) is obtained by the method described in the section "1) Preparation of recombinant according to present invention which is incorporated with nucleic acid molecule according to present invention" in the section of "6. (1) Method of acquiring heterodimer by coexpression" using the nucleic acid molecule α according to the present invention.

Next, the recombinant baculovirus is transfected into host insect cells. The transfected host cells are cultured, and the culture solution is subjected to a treatment such as centrifugation or the like to collect the supernatant. The details of the method of transfecting and culturing insect cells are as described in the sections "6.2) to 3)" above.

The protein is separated from the collected supernatant and purified by a known method, thereby obtaining the Factor G α-subunit of the present invention. For example, in a case where a base sequence encoding a marker such as a His tag sequence is linked to the base sequence of the nucleic acid molecule α according to the present invention, the expressed protein is linked to the His tag sequence. Therefore, the protein (Factor G α-subunit) can be purified from the culture supernatant by performing affinity purification using a known method of using an anti-His-Tag antibody.

Preferred examples of the nucleic acid molecule α used in the present method include a nucleic acid molecule containing a base sequence represented by any one of SEQ ID NO: 1, 3, 17, 19, 33, 34, 41, or 42. Among these, the nucleic acid molecule containing a base sequence represented by any one of SEQ ID NO: 33, 34, 41, or 42 is more preferable. The nucleic acid molecule containing a base sequence represented by SEQ ID NO: 41 or 42 is particularly preferable. As the kind of nucleic acid molecule, cDNA is more preferable.

2) Acquisition of Factor G β-Subunit (βi2, βi3, β2, β5, βC1, or βC2) of Present Invention.

The Factor G β-subunit of the present invention can be acquired by, for example, the following method.

A recombinant baculovirus incorporated with the nucleic acid molecule β (which may contain a base sequence encoding a marker such as a signal peptide or His tag sequence) is obtained by the method described in the section "1) Preparation of recombinant according to present invention which is incorporated with nucleic acid molecule according to present invention" in the section of "6. (1) Method of acquiring heterodimer by coexpression" using the nucleic acid molecule β according to the present invention.

Next, the recombinant baculovirus is transfected into host insect cells. The transfected host cells are cultured, and the culture solution is subjected to a treatment such as centrifugation or the like to collect the supernatant. The details of the method of transfecting and culturing insect cells are as described in the sections "6.2) to 3)" above.

The protein is separated from the collected supernatant and purified by a known method, thereby obtaining the Factor G β-subunit of the present invention. For example, in a case where a base sequence encoding a marker such as a His tag sequence is linked to the base sequence of the nucleic acid molecule β according to the present invention, the expressed protein is linked to the His tag sequence. Therefore, the protein (Factor G β-subunit) can be purified from the culture supernatant by performing affinity purification using a known method of using an anti-His-Tag antibody.

Preferred examples of the nucleic acid molecule β used in the present method include a nucleic acid molecule containing a base sequence represented by any one of SEQ ID NO: 5, 7, 9, 11, 13, 15, 21, 23, 25, 27, 29, 31, 35 to 40, 43 to 48, 68, or 69. Among these, the nucleic acid molecule containing a base sequence represented by any one of SEQ ID NO: 35 to 40, 43 to 48, 68, or 69 is more preferable. The nucleic acid molecule containing a base sequence represented by any one of SEQ ID NO: 43 to 48 or 68 is particularly preferable. As the kind of nucleic acid molecule, cDNA is more preferable.

3) Acquisition of Heterodimer

Next, the purified Factor G α-subunit A and Factor G βi2 subunit are respectively dissolved in a 10 mM BG-free MOPS buffer solution, mixed with each other in equimolar proportions, and allowed to react for several hours to 24 hours while being stirred, thereby, obtaining the heterodimer of the present invention.

Examples of the solvent for dissolving the Factor G α-subunit and the Factor G β-subunit used in the method include a phosphate buffer solution, a tris buffer solution, a good buffer solution, a glycine buffer solution, a borate buffer solution, and a MOPS buffer solution, which have a buffering action in water such as distilled water for injection with a pH of 5.0 to 10.0 and preferably a neutral pH of approximately 6.0 to 8.5. Further, the concentration of the buffer agent in these buffer solutions is usually appropriately selected from a range of 10 to 500 mM and preferably 10 to 300 mM.

(3) Method of Acquiring Heterodimer by Chemical Synthesis

Further, the heterodimer of the present invention can be produced by a typical chemical synthesis method according to the amino acid sequence thereof. The heterodimer of the present invention can be obtained by a typical chemical synthesis method such as a fluorenylmethyloxycarbonyl method (Fmoc method) or a t-butyloxycarbonyl method (tBoc method). Further, the heterodimer can be chemically synthesized using a commercially available peptide synthesizer.

7. Method of Measuring BG

Examples of a method of measuring BG using the heterodimer of the present invention include a so-called synthetic substrate method.

In the synthetic substrate method, first, a sample containing BG, the heterodimer of the present invention, and a synthetic peptide substrate are allowed to react with each other. BG activates the heterodimer of the present invention, and the activated heterodimer activates a proclotting enzyme into a clotting enzyme by the protease activity thereof. The clotting enzyme hydrolyzes the synthetic peptide substrate by the enzymatic activity thereof, and the chromophore is released from the synthetic peptide substrate to develop color. The amount of BG in the sample is calculated by colorimetrically quantifying the color development that has occurred.

The specific examples, the acquisition method, and the preferred examples of the heterodimer of the present invention used in the method of measuring BG according to the present invention are as described in the sections of "1." to "6.".

Examples of the synthetic peptide substrate used in the method of measuring BG according to the present invention include a synthetic peptide substrate obtained by binding a chromophore such as p-nitroaniline (pNA) to the C-terminal, which is cut by the enzyme action of clotting enzyme to develop color. The synthetic peptide substrate may be chemically synthesized, but various commercially available products may be used.

Specific examples of the commercially available products thereof include Boc-Leu-Gly-Arg-pNA, Boc-Glu-Gly-Arg-pNA, Ac-Ile-Glu-Gly-Arg-pNA, and Boc-Thr-Gly-Arg-pNA.

As a measuring device of the synthetic substrate method, for example, a microplate reader or a spectrophotometer is used.

Specific examples of the method of measuring BG according to the present invention are as follows.

That is, 10 to 50 μL of a sample containing BG (containing 0.1 pg to 1 μg of BG) is allowed to react with 20 to 100 μL of a solution containing the heterodimer of the present invention (containing 0.1 ng to 0.1 mg of the heterodimer of the present invention), a proclotting enzyme, and 1 μM to 10 mM of a synthetic peptide substrate such as Boc-Thr-Gly-Arg-pNA at 4° C. to 40° C. for 3 to 300 minutes. Thereafter, the absorbance of the reaction solution at, for example, 405 nm (measurement wavelength) and 492 nm (complementary wavelength) is measured. The amount of BG in the sample can be acquired by applying the obtained measured value to a calibration curve showing the relationship between the measured value and the amount of BG, obtained by performing the identical operation on a BG solution having a known concentration in advance using the same reagent as described above.

Examples of the sample used in the method of measuring BG according to the present invention include clinical specimens such as blood, serum, plasma, urine, lymph, cerebrospinal fluid, pleural effusion, and ascites, pharmaceuticals, medical devices, and foods, and the examples are not limited thereto.

Further, BG according to the present invention can be performed by a measurement system using a hand method or an automatic analyzer. The combination or the like of reagents in a case of measuring BG using a hand method or an automatic analyzer is not particularly restricted, the best combination of reagents or the like may be appropriately selected and used in consideration of the environment and the model of the automatic analyzer to be applied and other factors.

8. Kit for Measuring β-Glucan of Present Invention

Examples of a kit for measuring a β-glucan of the present invention includes a kit containing a heterodimer that combines the Factor G α-subunit containing an amino acid sequence that is the same as or substantially the same as the amino acid sequence represented by SEQ ID NO: 2 or SEQ ID NO: 4 with the Factor G β-subunit containing an amino acid sequence that is the same as or substantially the same as the amino acid sequence represented by any one of SEQ ID NO: 6, 8, 10, 12, 14, or 16.

The heterodimer of the present invention in the kit may be a solution dissolved in water or a buffer solution or a freeze-dried product. Examples of the solvent for dissolving the heterodimer of the present invention include a phosphate buffer solution, a tris buffer solution, a good buffer solution, a glycine buffer solution, a borate buffer solution, and a MOPS buffer solution, which have a buffering action in distilled water for injection with a pH of 5.0 to 10.0 and preferably a neutral pH of approximately 6.0 to 8.5. Further, the concentration of the buffer agent in these buffer solutions is usually appropriately selected from a range of 10 to 500 mM and preferably 10 to 300 mM.

In addition, the kit for measuring the β-glucan of the present invention may contain a proclotting enzyme and/or the above-described synthetic peptide substrate as a constituent reagent. The specific examples are as described above.

In addition, the constituent reagent of the kit for measuring the β-glucan of the present invention may further contain other appropriate reagents typically used in the field, such as buffer agents and alkaline earth metal salts, and these reagents may be appropriately selected from those used for so-called biochemical reactions and the like.

Further, the kit for measuring the β-glucan of the present invention may be a kit combined with standard BG for preparing a calibration curve. As the standard BG, a standard product of commercially available BG (manufactured by FUJIFILM Wako Pure Chemical Corporation or the like) may be used or a product produced by the method described in JP1996-075751A (JP-H08-075751A) may be used. Further, the reagents in these reagent kits may be freeze-dried products.

9. Method of Removing BG

BG can be removed from the sample by bringing the sample containing BG into contact with the Factor G α-subunit (the α-subunit A or the α-subunit B) of the present invention for treatment.

Specific examples of the Factor G α-subunit of the present invention used in the present method are as described in the section of "2. Factor G α-subunit of present invention".

The Factor G α-subunit B is more preferable.

Specific treatment methods include a method of mixing a sample containing BG and an insoluble carrier carrying the Factor G α-subunit of the present invention, and a method of passing a sample containing BG to a column packed with a filler carrying the Factor G α-subunit of the present invention. Further, examples of the column method include a method performed by a general liquid chromatography method.

In a case where a culture medium for cells, bacteria, or the like is used as the sample containing BG, "the method of mixing a sample containing BG and an insoluble carrier carrying the Factor G α-subunit of the present invention" is preferable.

The method is described in more detail below using "the method of mixing a sample containing BG and an insoluble carrier carrying the Factor G α-subunit of the present invention" as an example.

First, the sample is mixed with an insoluble carrier carrying the Factor G α-subunit of the present invention and preferably shaken. Alternatively, the sample is mixed with a solvent in which an insoluble carrier carrying the Factor G α-subunit of the present invention is suspended preferably while being stirred. Thereafter, BG can be removed from the sample by separating the sample from the insoluble carrier carrying the Factor G α-subunit of the present invention.

As the amount of the insoluble carrier carrying the Factor G α-subunit in a case where the above-described treatment is performed increases, the contaminants in the sample can be sufficiently removed. However, in a case where the amount thereof is extremely large, the insoluble carrier may be wasteful and uneconomical. Therefore, in consideration of the economical amount, for example, the ratio of the used amount of the insoluble carrier carrying the Factor G α-subunit to the used amount of the sample may be approximately in a range of 1:1000 to 1:3 and preferably in a range of 1:10 to 1:3. The ratio may be any of a weight ratio (W/W), a volume ratio (V/V), or a volume/weight ratio (V/W).

The time for bringing the sample and the insoluble carrier carrying the Factor G α-subunit into contact with each other may be a time sufficient for BG in the sample to be bound to the Factor G α-subunit, for example, 5 minutes to 1 day and preferably 1 to 8 hours.

In order to separate the sample from the insoluble carrier carrying the Factor G α-subunit, an appropriate method such as filtration or decanting may be used.

Examples of the insoluble carrier that fixes the Factor G α-subunit of the present invention used in the above-described method include a synthetic polymer compound such as sepharose, polystyrene, polypropylene, polyacrylic acid, polymethacrylic acid, polyacrylamide, polyglycidyl methacrylate, polyvinyl chloride, polyethylene, polychlorocarbonate, a silicone resin, or silicone rubber, and an inorganic substance such as porous glass, obscure glass, ceramics, alumina, silica gel, activated carbon, and a metal oxide. Among these, sepharose and the like are preferable.

Further, examples of the form of the insoluble carrier include beads, fine particles, and latex particles. Among these, bead-like carriers are preferable because these are ease to use. Further, the particle diameter thereof is not particularly limited.

Examples of commercially available sepharose beads include CNBr-activated Sepharose 4B (manufactured by GE Healthcare).

The method of fixing the Factor G α-subunit to the insoluble carrier may be performed by bringing the Factor G α-subunit and the insoluble carrier into contact with each other, and is not particularly limited.

Further, in a case where a commercially available insoluble carrier is used, the Factor G α-subunit may be fixed to the insoluble carrier by the fixing method recommended in the instruction manual.

Specifically, the method of allowing the Factor G α-subunit to be carried by an insoluble carrier by be performed by, for example, bringing a solution containing typically 0.1 μg/mL to 20 mg/mL and preferably 1 μg/mL to 5 mg/mL of the Factor G α-subunit of the present invention into contact with a solution containing 0.05 to 2 g of pretreated CNBr-activated Sepharose 4B (manufactured by GE Healthcare) and reacting the resulting solution at an appropriate temperature for a predetermined time, preferably while being mixed with inversion. In order to inactivate the unreacted active group, the unreacted active group may be subjected to a treatment of being further resuspended in a new solvent and being incubated.

Since a culture medium for insect cells typically contains yeast extracts, the culture medium is contaminated with BG. Further, a typical animal cell culture medium for recombinant protein expression, such as FreeStyle™293 Expression Medium or FreeStyle™ CHO Expression Medium, is also known to be contaminated with BG. According to the method of removing BG according to the present invention, BG can be removed from these culture media to remove contamination of BG.

Further, according to the method of removing BG according to the present invention, an inhibitory factor of BG measurement using a Factor G which coexists in the culture medium can be removed.

Further, the method of removing BG according to the present invention enables removal of contamination of BG from the culture medium and can be used for the following applications.

That is, for example, in an experiment carried out using cultured cells or the like, in a case where the cultured cells have a property of being easily affected by BG, the method can be used to eliminate contamination of BG from a reagent to be used.

Examples of the kit for removing BG of the present invention include a kit which contains the Factor G α-subunit containing an amino acid sequence that is the same as or substantially the same as the amino acid sequence represented by SEQ ID NO: 2 or SEQ ID NO: 4, and such a kit can be used for the above-described removal method.

Hereinafter, the present invention will be described in more detail with reference to examples, but the present invention is not limited to these examples.

EXAMPLES

Example 1. Acquisition-1 of Heterodimer of Present Invention

<1. Analysis of Horseshoe Crab-Derived Factor G RNA Using Next Generation Sequencer>

Hereinafter, "Next Generation Sequencer" is abbreviated as "NGS".

The NGS here denotes not only the next-generation sequencer device itself, but also the whole system including the sequencing method with an increased processing amount for sequence determination by performing millions of sequencing reactions in parallel from sample preparation using the next-generation sequencer and the subsequent sequence analysis performed on the PC.

1-1. Recovery of Total RNA

Total RNA was recovered from horseshoe crab blood cells of the genus *Limulus* by the following method using a reagent ISOGEN for extracting RNA (manufactured by FUJIFILM Wako Pure Chemical Corporation) according to the protocol attached to the product.

First, *Limulus polyphemus* (American) blood cells were frozen in liquid nitrogen in a mortar, ground, and crushed. ISOGEN (manufactured by FUJIFILM Wako Pure Chemical Corporation) was added thereto to suspend the crushed product and extract RNA.

The resulting extract was transferred to a tube, incubated at room temperature for 5 minutes, and chloroform was added thereto at a volume ratio of 40% (v/v). The solution was stirred for 15 seconds and further incubated at room temperature for 3 minutes. Next, the extract was centrifuged at 12000×g and 4° C. for 15 minutes, and the aqueous phase was transferred to a new tube. Next, 3.5 mL of isopropanol was added and stirred, and the solution was incubated at room temperature for 10 minutes. Next, the extract was centrifuged at 12000×g and 4° C. for 10 minutes to obtain a precipitate. The obtained precipitate was washed with 7 mL of 70% ethanol and dried, thereby obtaining an RNA precipitate. The obtained RNA precipitate was dissolved in 70 µL sterile water. The absorbance of the obtained RNA aqueous solution was measured, and the concentration of the obtained total RNA was measured. The concentration of the total RNA was 919.8 ng/µL, and 64 µg of total RNA was obtained from horseshoe crab blood cells of the genus *Limulus*.

1-2. Confirmation of DNA Sequence Encoding Factor G Subunit by NGS

A sequence library was prepared according to the instructions described in the kit using the total RNA derived from the blood cells of horseshoe crab of the *Limulus* genus obtained in the section 1-1 and using the TruSeq Stranded mRNA sample Prep kit (manufactured by Illumina, Inc.). The prepared sequence library was analyzed using the next-generation sequencer, HiSeq 2500.

After the adapter sequence and a base with a low quality value were subjected to a trim treatment from the sequence data obtained by analysis using HiSeq 2500, assembling was performed by a known method using Trinity software. Thereafter, ORF of the contig sequence obtained by the assembling treatment was predicted, and the amino acid sequence encoded by the sequence of the library was determined.

Next, the amino acid sequence obtained by the assembling and the amino acid sequence of the Factor G α-subunit of the *Tachypleus* genus (Accession No. BAA04044.1 (Protein ID), SEQ ID NO: 52, DNA sequence: SEQ ID NO: 51) or the amino acid sequence of the Factor G β-subunit of the *Tachypleus* genus (Accession No. BAA04045.1 (Protein ID)) were subjected to homology search (blastp).

As a result of the homology search with the amino acid sequence encoding the Factor G α-subunit of the *Tachypleus* genus, two kinds of amino acid sequences (id: TR44185 c2_g1_i1, id: TR44185 c2_g1_i2) having a homology with the amino acid sequence encoding the Factor G α-subunit of the *Tachypleus* genus and two kinds of DNA sequences (SEQ ID NO: 53, SEQ ID NO: 54) encoding the amino acid sequences were confirmed.

Since the acquired DNA sequences represented by SEQ ID NO: 53 and SEQ ID NO: 54 do not contain a stop codon, it was presumed that the sequences encode a partial sequence on the N-terminal side thereof without encoding the entire amino acid sequence of the Factor G α-subunit of the genus *Limulus*.

Further, as a result of homology search with the amino acid sequence encoding the Factor G β-subunit of the *Tachypleus* genus, two kinds of amino acid sequences having a homology with the amino acid sequence of the Factor G β-subunit of the *Tachypleus* genus and DNA sequences that is, id: TR39550_c0_g1_i2 (amino acid sequence: SEQ ID NO: 22, DNA sequence: SEQ ID NO: 21) and id:TR39550c0_g1_i3 (amino acid sequence: SEQ ID NO: 24, DNA sequence: SEQ ID NO: 23) were confirmed, and it was presumed that the two kinds were DNA sequences encoding the amino acid sequence of the Factor G β-subunit of the *Limulus* genus.

The presence of homologues of the known Factor G α-subunit of the *Tachypleus* genus and the Factor G β-subunit of the *Tachypleus* genus has not been reported. However, as shown in the above-described results, it was found that at least two kinds of homologues are present for each of the Factor G α-subunit of the *Tachypleus* genus and the Factor G β-subunit of the *Tachypleus* genus based on the analysis results of NGS.

<2. Acquisition of Full-Length Base Sequence of Factor G α-Subunit>

The entire DNA sequence of the Factor G α-subunit having two kinds of amino acid sequences and DNA sequences derived from the Factor G α-subunit of the *Limulus* genus confirmed in the section of <1.> was identified by the following method.

First, the following primer F1 was designed based on the sequence of the DNA sequence part (including the start codon sequence) encoding the N-terminal side of the DNA sequence (SEQ ID NO: 53 and SEQ ID NO: 54) encoding the two kinds of amino acid sequences obtained in the section of 1-2, and synthesized as a Forward primer.

```
Primer F1
                                        (SEQ ID NO: 55)
5'-GATTACGCCAAGCTTgccagaatgtcgattccatc-3'
Uppercase: Additional sequence used during
in-fusion reaction to vector
Lowercase: Sequences derived from SEQ ID NO: 53
and SEQ ID NO: 54
```

2-1. Acquisition of PCR Fragments by 3' RACE Method.

The total RNA derived from the blood cells of the *Limulus* genus horseshoe crab obtained in the section of 1-1 was reverse transcribed to 1st strand cDNA using SMARTer™ RACE 5'/3' Kit (manufactured by Takara Bio Inc.) to prepare a cDNA library.

PCR was performed using UPM short primer mix attached to the present kit, the primer F1 obtained above, and PrimeSTAR™ Max DNA Polymerase (manufactured by Takara Bio Inc.). The composition of the PCR solution is listed in Table 3, and the PCR conditions are listed in Table 4.

TABLE 3

| Reagent name | Addition amount |
| --- | --- |
| cDNA library | 2.5 µL |
| UPM short primer mix | 5 µL |
| Primer F1 (10 µM) | 1 µL |
| H₂O | 9.5 µL |
| PrimeSTAR Max Premix(2×) | 25 µL |
| Total amount | 50 µL |

TABLE 4

| | |
| --- | --- |
| ① 98 degrees | 60 seconds |
| ② 98 degrees | 10 seconds |
| ③ 60 degrees | 15 seconds |
| ④ 72 degrees | 60 seconds |
| ② to ④ were repeated 25 times | |
| ⑤ 72 degrees | 180 seconds |
| ⑥ 4 degrees | ∞ |

The PCR reaction solution obtained by the PCR described above was applied to a gel obtained by dissolving agarose S in a TAE buffer in an amount of 1.0 (w/v) % for solidification, and agarose electrophoresis was carried out in the TAE buffer at 100 V for 50 minutes. After completion of the electrophoresis, the resultant was stained with SAFELOOK™ Pre-Green Nucleic Acid Stain (manufactured by FUJIFILM Wako Pure Chemical Corporation) diluted to 5000 times for 30 minutes, and the position of the band was observed with the LED transilluminator gel Mieru.

A band having a size of approximately 2.2 kbp was cut out, and a PCR fragment was obtained and purified using NucleoSpin™ Gel and PCR Clean-up (manufactured by Takara Bio Inc.).

2-2. Preparation of Vector Containing 3' Side Fragment of Factor G α-Subunit.

The PCR fragment obtained in the section of 2-1, a Linearized pRACE vector (manufactured by Takara Bio Inc.), and 5×In-Fusion HD Enzyme Premix (manufactured by Takara Bio Inc.) were mixed and reacted at 50° C. for 15 minutes, thereby obtaining an in-fusion reaction solution. 2.5 µL of the obtained in-fusion reaction solution was added to 50 µL ECOS™ Competent *E. coli* DH5 α (manufactured by FUJIFILM Wako Pure Chemical Corporation) and incubated on ice for 5 minutes. After a heat shock treatment at 42° C. for 45 seconds, the solution was applied to an LB agar culture medium containing 100 µg/mL of ampicillin. Colonies were formed by incubation at 37° C. overnight.

The formed colonies were picked up in approximately 3 mL of an LB culture medium containing 100 µg/mL ampicillin, inoculated, and shake-cultured (200 rpm) at 37° C. overnight. After confirming that the culture solution was suspended, the culture solution was centrifuged at 10000×g for 1 minute, the supernatant was removed, and bacterial cells (equivalent to approximately 3 mL of the culture solution) were acquired. A plasmid was extracted from the obtained bacterial cells using the QIAprep Spin Miniprep Kit (manufactured by Qiagen) according to the instructions attached to the kit.

2-3. Sanger Sequence Analysis of 3' Side Fragment of Factor G α-Subunit

The plasmid obtained in the section of 2-2 was mixed with M13-20 and M13-P5 (universal primers, manufactured by Takara Bio Inc.) and subjected to Sanger sequence analysis.

```
M13-20 Forward primer:
                                        (SEQ ID NO: 56)
5'-gtaaaacgacggccagt-3'

M13-P5 Reverse Primer:
                                        (SEQ ID NO: 57)
5'-caggaaacagctatgac-3'
```

As a result of trimming the obtained sequence data, the base sequence represented by SEQ ID NO: 58 was confirmed. As a result of analyzing the base sequence represented by SEQ ID NO: 58, the sequence of a stop codon, a poly A signal, and a poly A site were confirmed. Accordingly, it was determined that the base sequence represented by SEQ ID NO: 58 is the sequence on the 3'-terminal side of the DNA sequence encoding one of the two kinds of amino acid sequences confirmed in the section of <1.>. Further, the base sequence represented by SEQ ID NO: 58 was subjected to contig with the base sequence represented by SEQ ID NO: 53 and the base sequence represented by SEQ ID NO: 54, which are the two kinds of DNA sequences confirmed in the section of <1.>. As a result, a site where the base sequence represented by SEQ ID NO: 58 overlaps 100% with the base sequence represented by SEQ ID NO: 54 was confirmed, and thus it was found that a full-length sequence can be constructed on the PC. Therefore, the trimming and contig of the base sequence represented by SEQ ID NO: 58 were performed by Vector NTI software (manufactured by Invitrogen).

In this manner, a full-length DNA sequence encoding the full-length amino acid sequence of one type of Factor G α-subunit between the two kinds of amino acid sequences confirmed in the section of <1.> was confirmed.

However, although the presence of two clones was assumed in the NGS analysis result in the section of <1.>, the base sequence was able to be acquired in only one clone.

Therefore, based on the base sequences represented by SEQ ID NO: 53 and SEQ ID NO: 54, which are the two kinds of DNA sequences confirmed in the section of <1.>, a primer F2 containing a start codon was designed, a primer R2 containing a stop codon was designed based on the base sequence represented by SEQ ID NO: 58 on the 3'-terminal side, and the primers were synthesized.

```
Primer F2
                                        (SEQ ID NO: 59)
5'-TATTTACAATCCATGGCAatgtttctgtgttatgttg-3'
Uppercase: Additional sequence used during
in-fusion reaction to vector
Lowercase: Sequences derived from SEQ ID NO: 53
and SEQ ID NO: 54

Primer R2
                                        (SEQ ID NO: 60)
5'-GGAGCTCCTGCGGCCGCctaaacctttgtaatcttaatc-3'
Uppercase: Additional sequence used during
in-fusion reaction to vector
Lowercase: Sequence derived from SEQ ID NO: 58
```

Next, a test of obtaining the total length of cDNA was performed again by the following method.

PCR was performed using the plasmid obtained in the section of 2-2 as a template, the primer F2 and the primer R2, and KOD DNA polymerase (manufactured by Toyobo Co., Ltd.). The composition of the PCR solution is listed in Table 5, and the PCR conditions are listed in Table 6.

TABLE 5

| Preparation of PCR solution | Preparation amount |
|---|---|
| Plasmid DNA | 5 μL |
| 10 × KOD buffer | 5 μL |
| 2 mM dNTPs | 10 μL |
| 25 mM MgSO$_4$ | 3 μL |
| Fw primer 10 Mm | 1.5 μL |
| Rv primer 10 Mm | 1.5 μL |
| KOD (DNA polymerase) KOD-Plus-Ver2 | 1 μL |
| H$_2$O | 23 μL |
| Total amount | 50 μL |

TABLE 6

| | | |
|---|---|---|
| ① 98 degrees | | 10 seconds |
| ② 98 degrees | | 10 seconds |
| ③ 50 degrees | | 30 seconds |
| ④ 68 degrees | | 180 seconds |
| | ② to ④ were repeated 30 times | |
| ⑤ 68 degrees | | 300 seconds |
| ⑥ 4 degrees | | ∞ |

After completion of the PCR reaction, the PCR reaction solution was subjected to agarose electrophoresis, and the position of the band was confirmed by a known method. A band having a size of approximately 2.2 kbp was cut out, and a PCR fragment was acquired and purified using Nucleo-Spin™ Gel and PCR Clean-up (manufactured by Takara Bio Inc.). The agarose electrophoresis, staining, and band observation were performed by the same method as described in the section of "2-1. Acquisition of PCR fragment by 3' RACE method".

The PCR fragment obtained above, the Linearized pIEx/Bac™-1 vector (manufactured by Novagen) treated with the restriction enzymes NcoI and NotI, and 5×In-Fusion HD Enzyme Premix (manufactured by Takara Bio Inc.) were mixed and reacted at 50° C. for 15 minutes, thereby obtaining an in-fusion reaction solution. 2.5 μL of the obtained in-fusion reaction solution was added to 50 μL ECOS™ Competent E. coli DH5 α (manufactured by FUJIFILM Wako Pure Chemical Corporation), incubated on ice for 5 minutes, subjected to a heat shock treatment at 42° C. for 45 seconds, and applied to an LB agar culture medium containing 100 μg/mL of ampicillin. Colonies were formed by incubation at 37° C. overnight.

The plasmid was obtained from the colony cells by the same method as described in the section of "2-2. Preparation of vector containing 3' side fragment of Factor G α-subunit".

The following Forward and Reverse primers on the pIEx/Bac-1 vector side were designed. The Forward primer and the Reverse primer were mixed with the plasmid obtained above, and the Sanger sequence analysis was performed.

```
Forward primer on pIEx/Bac-1 vector side:
                                        (SEQ ID NO: 61)
cgcgttggttttagagggca Reverse primer on pIEx/Bac-1 vector side:
                                        (SEQ ID NO: 62)
acgtcgccaactcccattgt
```

The obtained sequence data was trimmed and subjected to contig. The trimming and contig were performed by Vector NTI software (manufactured by Invitrogen). As a result, base sequences of the full-length DNA encoding the full-length amino acid sequence of the two kinds of the Factor G α-subunits of the Limulus genus confirmed in the section of <1.> were acquired. The acquired base sequences were the base sequence represented by SEQ ID NO: 17 and the base sequence represented by SEQ ID NO: 19.

<3. Confirmation of Sequence of Factor G β-Subunit>

The base sequences of the full-length cDNA of the Factor G β-subunit βi2 and the Factor G β-subunit βi3, that is, the base sequence represented by SEQ ID NO: 21 and the base sequence represented by SEQ ID NO: 23 were acquired in the step described in "1-2. Acquisition of amino acid sequence, base sequence, and the like of Factor G subunit of present invention". For confirmation, the following primers were designed based on the base sequence on the 5'-terminal side and the 3'-terminal side of the base sequence.

```
Primer F3
                                        (SEQ ID NO: 63)
5'-AACCAAGTGACCatgaaaaccactctatggactttt-3'

Primer R3
                                        (SEQ ID NO: 64)
5'-GATGGTGGTGCTCGAGTtaaaatactggcacaacttc-3'
```

3-1. Acquisition of Full-Length DNA Sequence of Factor G β-Subunit Sequence

A cDNA library was prepared by a known method using total RNA derived from the blood cells of horseshoe crab of the Limulus genus obtained in the section of 1-1 and SuperScript™ VILO™ Master Mix (manufactured by Invitrogen).

PCR was performed using the cDNA library as a template and using the Primer F3 and the Primer R3. The composition of the PCR solution is listed in Table 7, and the PCR conditions are listed in Table 8.

TABLE 7

| Preparation of PCR solution | Preparation amount |
|---|---|
| cDNA library | 1 μL |
| PrimeSTAR Max Premix (2×) | 12.5 μL |
| Primer F3 10 μM | 1 μL |
| Primer R3 10 μM | 1 μL |
| H$_2$O | 9.5 μL |
| Total amount | 25 μL |

TABLE 8

| ① 98 degrees | 60 seconds |
|---|---|
| ② 98 degrees | 10 seconds |
| ③ 60 degrees | 15 seconds |
| ④ 68 degrees | 60 seconds |
| ⑤ 68 degrees | 180 seconds |
| ② to ④ were repeated 30 times | |
| ⑥ 4 degrees | ∞ |

3-2. Preparation of Transfer Vector Containing Full-Length cDNA of Factor G β-Subunit The PCR fragment obtained in the section of 3-1, the Linearized pIEx™-4 vector (manufactured by Novagen) treated with the restriction enzymes NcoI and XhoI, and 5×In-Fusion HD Enzyme Premix (manufactured by Takara Bio Inc.) were mixed and reacted at 50° C. for 15 minutes, thereby obtaining an in-fusion reaction solution. 2.5 μL of the obtained in-fusion reaction solution was added to 50 μL ECOS™ Competent *E. coli* DH5 α (manufactured by FUJI-FILM Wako Pure Chemical Corporation), incubated on ice for 5 minutes, subjected to a heat shock treatment at 42° C. for 45 seconds, and applied to an LB agar culture medium containing 100 μg/mL of ampicillin. Colonies were formed by incubation at 37° C. overnight. The plasmid was obtained from the colony cells by the same method as described in the section of "2-2. Preparation of vector containing 3' side fragment of Factor G α-subunit".

3-3. Sanger Sequence Analysis of Full-Length cDNA Sequence of Factor G β-Subunit The sequence data obtained in the section of 3-2 was acquired by the same method as the method described in the section of "2-3. Sanger sequence analysis of 3' side fragment of Factor G α-subunit" using the Forward primer (SEQ ID NO: 61) on the pIEx/Bac-1 vector side and the Reverse primer (SEQ ID NO: 62) on the pIEx/Bac-1 vector side.

The obtained sequence data was trimmed using Vector NTI software (manufactured by Invitrogen) and subjected to contig.

As a result, 6 kinds of DNA sequences encoding the Factor G β-subunit of the *Limulus* genus, that is, the base sequences represented by SEQ ID NOs: 21, 23, 25, 27, 29, and 31 were acquired.

<4. Preparation of Recombinant Baculovirus Vector>

4-1. Construction of Transfer Vector

The base sequences represented by SEQ ID NOs: 17, 19, 21, 23, 25, 27, 29, and 31 which had been confirmed in the previous sections <2.> and <3.> were respectively translated into amino acid sequences.

As a result of analyzing the obtained amino acid sequences, the presence of a region of the signal peptide sequence on the N-terminal side of these amino acid sequences was confirmed.

An amino acid sequence in which a PA tag sequence (SEQ ID NO: 65: GVAMPGAEDDVV) and a 6×His tag sequence were linked to the C-terminal side and an amino acid sequence in which such tags were not linked were designed in the translated amino acid sequences of the Factor G α-subunit containing a signal peptide. The codons of the gene sequences were optimized to express the protein of the designed amino acid sequences in insect cells.

Further, an amino acid sequence in which the PA tag sequence and the 6×His tag sequence were linked to the C-terminal side was designed in the translated amino acid sequences of the Factor G β-subunit. The codons of the gene sequences were optimized to express the protein of the designed amino acid sequences in insect cells.

The following information obtained by the above-described operations is collectively listed in Table 9. However, each amino acid sequence and base sequence listed in Table 9 does not include a tag sequence.

Further, each item in Table 9 has the following meaning.
Name of subunit: name of Factor G subunit protein
Amino acid sequence No: sequence number amino acid sequence of Factor G subunit protein (excluding signal peptide sequence)
Base sequence No: sequence number of base sequence encoding amino acid sequence of Factor G subunit protein (excluding base sequence encoding signal peptide sequence)
Amino acid sequence No (including signal sequence): sequence number of amino acid sequence of Factor G subunit protein (including signal peptide sequence)
Base sequence No (including signal sequence): sequence number of base sequence encoding amino acid sequence of Factor G subunit protein (including base sequence encoding signal peptide sequence)
Optimized base sequence No: sequence number of base sequence optimized for expressing Factor G subunit protein in insect cells (excluding base sequence encoding signal peptide sequence)
Base sequence No (including signal sequence): sequence number of base sequence optimized for expressing Factor G subunit protein in insect cells (including base sequence encoding signal peptide sequence)

TABLE 9

| Subunit name | Amino acid sequence No. | Base sequence No. | Amino acid sequence No. (including signal sequence) | Base sequence No. (including signal sequence) | Optimized base sequence No. | Optimized base sequence No. (including signal sequence) |
|---|---|---|---|---|---|---|
| Factor G α-subunit A | 2 | 1 | 18 | 17 | 33 | 41 |
| Factor G β-subunit B | 4 | 3 | 20 | 19 | 34 | 42 |
| Factor G β-subunit βi2 | 6 | 5 | 22 | 21 | 35 | 43 |

TABLE 9-continued

| Subunit name | Amino acid sequence No. | Base sequence No. | Amino acid sequence No. (including signal sequence) | Base sequence No. (including signal sequence) | Optimized base sequence No. | Optimized base sequence No. (including signal sequence) |
|---|---|---|---|---|---|---|
| Factor G β-subunit βi3 | 8 | 7 | 24 | 23 | 36 | 44 |
| Factor G β-subunit β2 | 10 | 9 | 26 | 25 | 37 | 45 |
| Factor G β-subunit β5 | 12 | 11 | 28 | 27 | 38 | 46 |
| Factor G β-subunit βC1 | 14 | 13 | 30 | 29 | 39 | 47 |
| Factor G β-subunit βC2 | 16 | 15 | 32 | 31 | 40 | 48 |

A transfer vector was acquired by, entrusted to GENEWIZ, synthesizing cDNA having the base sequences represented by SEQ ID NO: 41, 42, 43, 44, 45, 46, 47, and 48 and inserting the cDNA into the NcoI-NotI site of the pIEx/Bac-1 vector (manufactured by Novagen).

4-2. Cotransfection

100 μL of a serum-free PSFM-J1 culture medium (manufactured by FUJIFILM Wako Pure Chemical Corporation) containing 2 μg of various transfer vectors obtained in the section of 4-1, 90 ng of Linear AcNPV DNA, and 3 μL of ScreenFect™ A plus (manufactured by FUJIFILM Wako Pure Chemical Corporation) was added to $1.0 \times 10^6$ Sf9 cells (manufactured by Invitrogen) seeded in a 25 cm² flask. After stationary culture at 28° C. for 7 days, the culture supernatant was collected and used as a recombinant baculovirus vector solution.

The obtained recombinant baculovirus vector carries cDNA encoding any one amino acid sequence from among the Factor G α-subunit A, the Factor G α-subunit B, the Factor G β-subunit βC1, the Factor G β-subunit βi2, the Factor G β-subunit βi3, the Factor G β-subunit β2, the Factor G β-subunit β5 and the Factor G β-subunit βC2.

The solution containing the obtained recombinant baculovirus vector was used as a "cotransfection solution".

<5. Preparation of BG-Removed Serum-Free PSFM-J1 Culture Medium>

Here, the culture medium for insect cells was treated by the following method using the beads carrying the Factor G α-subunit B of the present invention, to prepare a culture medium for cell culture from which BG was removed in a state where the culture medium performance was maintained.

5-1. Preparation of Factor G α-Subunit B

The following operation was performed using a recombinant baculovirus vector solution (cotransfection solution) having CDNA (SEQ ID NO: 66) encoding the Factor G α-subunit B in which the PA tag sequence (SEQ ID NO: 65: GVAMPGAEDDVV) and the 6×His tag sequence were linked to the C-terminal side, which was obtained by the methods described in the sections of 4-1 and 4-2.

Insect cells expresSF+™ (manufactured by Protein Science) was diluted with a serum-free culture medium PSFM-J1 (pH of 5.5 to 6.2, manufactured by FUJIFILM Wako Pure Chemical Corporation) in an amount of $1.5 \times 10^6$ cells/ml, and 800 ml thereof was prepared in a 2000 ml Erlenmeyer flask. 4 ml of the cotransfection solution obtained above was added thereto, and the cells were shaking-cultured at 130 rpm and 27° C. for 3 days. After culturing of the cells, the culture solution was centrifuged at 3,000×g and 4° C. for 60 minutes for fractionation into a supernatant and a precipitate. The culture supernatant was collected and used as a Factor G α-subunit B expression culture supernatant.

5-2. Purification of Factor G α-Subunit B

The protein expressed in the section of 5-1 has a 6×His tag sequence linked to the C-terminal side. Therefore, affinity purification was performed according to the method described in the attached manual using cOmplete™ His-Tag Purification Resin (manufactured by Sigma-Aldrich), and the Factor G α-subunit B protein was purified from the Factor G α-subunit B expression culture supernatant obtained in the section of 5-1.

5-3. Bead Fixation of Factor G α-Subunit B 1 g of CNBr-activated Sepharose 4B (GE) was suspended in 1 mM HCl and washed with 200 mL. 4 ml net of the washed CNBr-activated Sepharose 4B was dissolved in a coupling buffer (200 mM $NaHCO_3$, 500 mM NaCl, pH of 8.3), mixed with 16 mg of the Factor G α-subunit B obtained in the section of 5-2, and incubated at 4° C. overnight while being mixed with inversion. Beads were collected to inactivate unreacted active groups, resuspended in a Tris-HCl buffer with a pH of 8.0, and incubated at 4° C. for 2 hours. A suspension of the Factor G α-subunit B-fixed beads was obtained by the above-described method.

5-4. Removal of BG From Serum-Free PSFM-J1 Culture Medium 0.5 mL net of a suspension of the Factor G α-subunit B-fixed beads obtained in the section of 5-3 was added to 1000 mL of the serum-free PSFM-J1 culture medium and stirred at room temperature for 4 hours using a stirring shaker. Thereafter, removal of the beads and the sterilization treatment were performed by a 0.22 μM PES filter.

5-5. Confirmation of BG Removal

1) Confirmation of BG removal 1—Removal of BG

The reaction solutions having the compositions listed in Table 10 were prepared using the Factor G α-subunit B-fixed bead-treated culture medium obtained in the section of 5-4 or the untreated culture medium, and sequentially added to a reaction plate. Next, the reaction was carried out at 37° C. for 200 minutes, and 0.05 mL of 0.04% sodium nitrite (1.0 M hydrochloric acid solution), 0.05 mL of 0.3% ammonium sulfamate, and 0.05 mL of 0.07% N-1-naphthylethylenediamine dihydrochloride (14% N-1-methyl-2-pyrrolidone solution) were sequentially added thereto for diazo coupling, and the absorbance was measured at 540 nm (control wavelength: 630 nm) using a microplate reader (device name: Spark (manufactured by Tecan)).

Further, the horseshoe crab-derived natural Factor G-containing solution used here was obtained by a fraction fractionated from crude LAL according to the method described in JP2564632B.

TABLE 10

| Added solution | Concentration | Final concentration |
|---|---|---|
| 0.5M BES-NaOH pH7.7 | 10 μL | 0.05M BES-NaOH pH7.7 |
| 1M MgSO$_4$ | 5 μL | 50 mM MgSO$_4$ |
| Water for injection | 16 μL | |
| 10 mM Boc-Thr(T)-Gly(G)-Arg(R)-pNA | 4 μL | 0.4 mM Boc-Thr(T)-Gly(G)-Arg(R)-pNA |
| Horseshoe crab-derived natural Factor G-containing solution | 15 μL | |
| Treated culture medium or untreated culture medium | 150 μL | |
| Total amount of reaction solution | 200 μL | |

The results are shown in FIG. 1.

As is apparent in FIG. 1, the serum-free PSFN-J1 culture medium contained 350 pg/mL or greater of BG, but the concentration of BG was several pg/mL or less in a case of being treated with the Factor G α-subunit B, which is the value close to the detection limit.

Based on the above-described result, it was found that BG can be removed to the detection limit by treating the culture medium with the Factor G α-subunit B of the present invention.

2) Confirmation of BG Removal 2—Removal of Inhibitory Factor

Lentinan (LNT) was dissolved in water for injection at a concentration of 0, 5, 10, 30, or 60 pg/mL to prepare "a calibration curve solution". That is, the "calibration curve solution" does not contain a culture medium.

In addition, a solution in which LNT was added to the serum-free PSFM-J1 culture medium or the untreated serum-free PSFM-J1 culture medium subjected to the Factor G α-subunit B-fixed bead treatment by the method described in the section of 5-4 such that the concentration thereof reached 0, 10, or 30 pg/mL was prepared. Water for injection was used at a concentration of 0 pg/mL. The prepared solution was defined as "prepared culture medium to be measured". Further, the LNT was prepared by dissolving Lentinan intravenous 1 mg "ajinomoto" in 1 N NaOH and then used.

Next, reaction solutions having the compositions listed in Table 11 were prepared and sequentially added to a reaction plate. Next, the reaction was carried out at 37° C. for 200 minutes, and 0.05 mL of 0.04% sodium nitrite (1.0 M hydrochloric acid solution), 0.05 mL of 0.3% ammonium sulfamate, and 0.05 mL of 0.07% N-1-naphthylethylenediamine dihydrochloride (14% N-1-methyl-2-pyrrolidone solution) were sequentially added thereto for diazo coupling, and the absorbance was measured at 540 nm (control wavelength: 630 nm) using a microplate reader (device name: Spark (manufactured by Tecan)).

Further, the horseshoe crab-derived natural Factor G-containing solution used in Table 11 was obtained by using a fraction fractionated from crude LAL according to the method described in JP2564632B.

TABLE 11

| Added solution | Concentration | Final concentration |
|---|---|---|
| 0.5M BES-NaOH pH7.7 | 10 μL | 0.05M BES-NaOH pH7.7 |
| 1M MgSO$_4$ | 5 μL | 50 mM MgSO$_4$ |
| Water for injection | 16 μL | |
| 10 mM Boc-Thr(T)-Gly(G)-Arg(R)-pNA | 4 μL | 0.4 mM Boc-Thr(T)-Gly(G)-Arg(R)-pNA |
| Horseshoe crab-derived natural Factor G-containing solution | 15 μL | |
| Prepared culture medium to be measured | 150 μL | |
| Total amount of reaction solution | 200 μL | |

Figure 2:
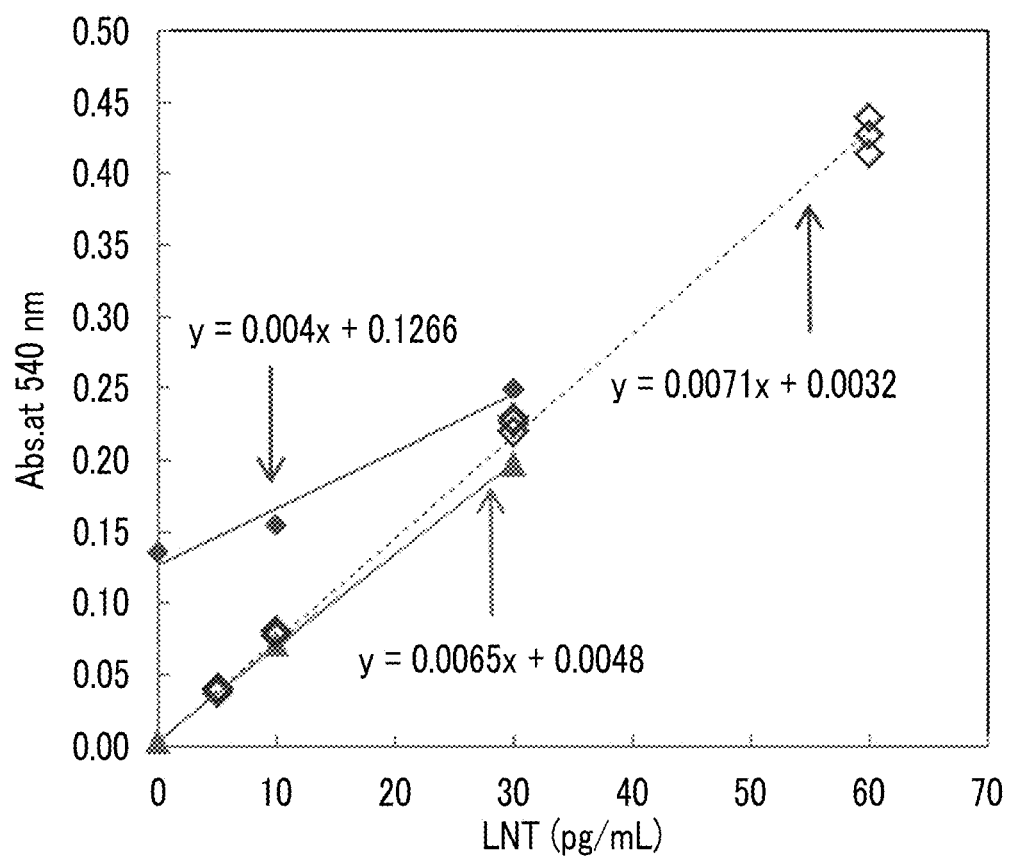
FIG. 2 is a calibration curve showing the relationship between the lentinan concentration in a sample and the absorbance, obtained in Example 1.

The results are collectively shown in FIG. 2.

In FIG. 2, —◇— shows the result obtained by using the calibration curve solution, —▲— shows the results obtained by using the PSM-J1 culture medium subjected to the BG removal treatment using the Factor G α-subunit B of the present invention, and —♦— shows the result obtained by using the untreated PSM-J1 culture medium.

In FIG. 2, the inclination (0.004) of the calibration curve (♦, y=0.004x+0.1266) obtained by using the untreated serum-free PSFM-J1 culture medium was lower than the inclination (0.007) of the calibration curve (◇, y=0.0071x+0.032) obtained by using the calibration curve solution. This result suggests that the inhibitory factor of the Factor G is present in the serum-free PSFM-J1 culture medium.

Meanwhile, the inclination of the calibration curve (▲, y=0.0065x+0.0048) obtained by using the serum-free PSFM-J1 culture medium subjected to the BG removal treatment using the Factor G α-subunit B beads of the present invention was 0.065, which was the value close to the inclination (0.007) of the calibration curve obtained by using the calibration curve solution. This result suggests that the inhibitory factor affecting the BG measurement using the Factor G was also removed by the BG removal treatment method.

Although not shown in data, an autoclave treatment (121° C., 20 minutes), a treatment of using a Posidyne filter (manufactured by Pall Corporation), and a treatment of using an adsorption depth filter Zeta Plus™, which are techniques of the related art that have been performed as a method of removing BG activity to remove BG from an insect cell culture medium, were performed, but BG was not able to be removed while the culture medium performance was maintained.

As described above, it was found that the method of removing BG in the culture medium using the Factor G α-subunit B of the present invention is an extremely excellent method that enables removal of BG by a simpler method than the related art while the culture medium performance is maintained.

<6. Test of Confirming Combination of Recombinant Factor G α-Subunit and β-Subunit>

6-1. Preparation of Recombinant Baculovirus Solution For Expression Test

Insect cells expresSF+™ (manufactured by Protein Science) was diluted with the BG-removed serum-free culture medium PSFM-J1 (pH of 5.5 to 6.2) in an amount of 1.5×10$^6$ cells/ml, and 50 ml of cells were prepared for a 125 ml Erlenmeyer flask.

0.250 ml of each cotransfection solution obtained in the section of 4-2 was added thereto, and the cells were shake-cultured at 130 rpm and 27° C. for 3 days. After culturing of the cells, the culture solution was centrifuged at 3,000×g and 4° C. for 30 minutes for fractionation into a supernatant and a precipitate. The culture supernatant was collected and used as "recombinant baculovirus solution for an expression test".

Further, "BG-removed serum-free culture medium PSFM-J1" used above was obtained by the method in the section of "5. Preparation of BG-removed serum-free PSFM-J1 culture medium".

6-2. Titer Measurement of Recombinant Baculovirus Solution For Expression Test

The titer of the recombinant baculovirus solution for an expression test which was prepared in the section of 6-1 was measured by the following method using the recombinant Factor G α-subunit A and the Factor G β-subunit βi2 as representative examples.

$2.0 \times 10^6$ cells of Sf9 cells (manufactured by Invitrogen) were seeded in a petri dish with a diameter of 60 mm and allowed to stand at 28° C. for 1 hour, and the cells were adhered to the bottom surface.

The solution of the recombinant baculovirus for an expression test with "cDNA encoding the Factor G α-subunit A (the PA tag sequence and the 6×His tag sequence were not linked to the C-terminal side)" obtained in the section of 6-1 and the solution of the recombinant baculovirus for an expression test with "cDNA encoding the Factor G β-subunit βi2" were respectively diluted to $10^5$, $10^6$, $10^7$, and $10^8$ times in the serum-free PSFM-J1 culture medium, and 1 ml of each solution was added to Sf9 cells and gently shaken at room temperature for 1 hour. Thereafter, the petri dish supernatant (virus solution) was removed, 4 ml of the serum-free PSFM-J1 culture medium containing 0.5% SeaKemGTG agarose (manufactured by BMA) was poured, and the cells were allowed to stand and cultured at 28° C. for 7 days. After 7 days, a 0.03% neutral red solution was added to the plate, and the plate was allowed to stand for 3 hours and stained. The titer value was calculated by counting the number of plaques (transparent sites).

The obtained results are as follows.

Recombinant baculovirus with cDNA encoding Factor G α-subunit A: $2.1 \times 10^8$ pfu/mL Recombinant baculovirus i2 with cDNA encoding Factor G β-subunit βi2: $1.4 \times 10^8$ pfu/mL 6-3. Coexpression of Recombinant Factor G α-Subunit and β-Subunit Insect cells expresSF+™ (manufactured by Protein Science) was diluted with the BG-removed serum-free culture medium PSFM-J1 (pH of 5.5 to 6.2) in an amount of $1.5 \times 10^6$ cells/ml, and 50 ml of cells were prepared for twelve 125 ml Erlenmeyer flasks.

One kind of baculovirus for expressing the Factor G α-subunit was added at a ratio of "VOI=1/400" and one kind of baculovirus for expressing the Factor G β-subunit was added at a ratio of "VOI=1/100" from the recombinant baculovirus solution for an expression test prepared in the section of 6-1, and the cells were shake-cultured 27° C. and at 130 rpm for 2 days. After culturing of the cells, the culture solution was centrifuged at 3,000×g and 4° C. for 30 minutes for fractionation into a supernatant and a precipitate. The supernatant was frozen and stored (VOI=volume of infection).

The "BG-removed serum-free culture medium PSFM-J1" used here was obtained by the method described in the section of "5. Preparation of BG-removed serum-free PSFM-J1 culture medium".

Further, the DNA contained in the baculovirus for expressing the Factor G α-subunit used here is formed such that the PA tag sequence and the 6×His tag sequence are not linked to the C-terminal side.

In a case of infection at the VOI described above, the ratio of the expression baculovirus containing cDNA encoding the Factor G α-subunit to the expression baculovirus containing cDNA encoding the Factor G β-subunit is approximately 0.4:0.9 in terms of multiplicity of infection (hereinafter referred to as MOI).

The expression baculovirus containing the cDNA encoding the Factor G α-subunit used herein contains the cDNA encoding the Factor G α-subunit A or B (SEQ ID NO: 41 or SEQ ID NO: 42).

Further, the expression baculovirus containing cDNA encoding the Factor G β-subunit contains cDNA encoding the Factor G β-subunit βi2, βi3, β2, β5, βC1, or βC2 (SEQ ID NO: 43, 44, 45, 46, 47, or 48).

<7. Confirmation of Expression of Recombinant Factor G α-Subunit and β-Subunit (Western Blotting)>

90 μL of the recombinant baculovirus solution for an expression test which was obtained in the section of 6-2 (the recombinant baculovirus solution for a Factor G α-subunit A expression test or the recombinant baculovirus solution for a Factor G β-subunit βi2 expression test) obtained in the section of 6-2 and 30 μL of a buffer solution of a sample (containing 3-mercapto-1,2-propanediol) (×4) (manufactured by FUJIFILM Wako Pure Chemical Corporation) were mixed and subjected to a heat treatment for 5 minutes. 15 μL of the sample subjected to the heat treatment was applied to SuperSep™ Ace, 10-20% gel (manufactured by FUJIFILM Wako Pure Chemical Corporation) set in Easy Sparator.

EasySeparator (manufactured by FUJIFILM Wako Pure Chemical Corporation) was filled with SDS-PAGE buffer with a pH of 8.5 (manufactured by FUJIFILM Wako Pure Chemical Corporation) and energized at 250 CV for 60 minutes. After electrophoresis, a gel subjected to SDS-PAGE was mounted on ClearTrans™ SP PVDF Membrane, Hydrophobic, 0.2 μm (manufactured by FUJIFILM Wako Pure Chemical Corporation) hydrophilized with methanol, and sandwiched between filter paper from above and blow which had been immersed in AquaBlot™ 1× High Efficiency Transfer Buffer. 1 mA/cm$^2$ CA, energized for 60 minutes.

After the energization, in a case where the recombinant baculovirus solution for the Factor G α-subunit A expression test is used, 3% skim milk (60 minutes) (manufactured by FUJIFILM Wako Pure Chemical Corporation), an anti-Factor G α-subunit antibody (60 minutes), and an anti-mouse IgG antibody (HRP binding) (60 minutes) (manufactured by FUJIFILM Wako Pure Chemical Corporation) were shaken in order. After the reaction, light emission was carried out by the ImmunoStar™ Zeta and detection was performed by AI-600QC.

Further, in a case where the recombinant baculovirus solution for the Factor G β-subunit βi2 expression test was used, 3% skim milk (60 minutes) (manufactured by FUJIFILM Wako Pure Chemical Corporation) and an anti-6×His tag antibody (HRP binding) (manufactured by FUJIFILM Wako Pure Chemical Corporation) were shaken in order after the energization. After the reaction, light emission was carried out by the ImmunoStar™ Zeta and detection was performed by AI-600QC.

As a result, the band of the rFactor G α-subunit was found at a position of approximately 75 kDa and the band of the rFactor G β-subunit was confirmed at a position of approximately 40 kDa.

As described above, it was confirmed that the Factor G α-subunit and the Factor G β-subunit of the present invention were expressed.

Example 2. Test of Confirming Glucan-Dependent Protease Activity of Heterodimer of the Present Invention The evaluation of the glucan-dependent protease activity of the obtained coexpressed product was performed by the following method using the supernatant containing the coexpressed product of the Factor G α-subunit and the Factor G β-subunit of the present invention, which was obtained in the section of 6-3 in Example 1, as a sample.

That is, each reaction solution having the composition listed in Table 12 was prepared and sequentially added to a reaction tube. Thereafter, the reaction was carried out at 37° C. for 200 minutes, and the absorbance at 405 nm (measurement wavelength) and the absorbance at 492 nm (complementary wavelength) were measured using ELx808 (manufactured by BioTek). Table 13 shows the difference in absorbance between the reaction solution to which LNT had been added and the reaction solution to which LNT had not been added (blank).

Further, a heterodimer of a Factor G α-subunit (AB547712) derived from *Limulus polyphemus* and the Factor G β-subunit of the present invention was obtained by coexpressing the Factor G α-subunit derived from *Limulus polyphemus* and the Factor G β-subunit of the present invention by the same method as in Example 1 except that cDNA having a base sequence (SEQ ID NO: 49) of Genbank Accession No. AB547712 encoding the amino acid sequence (BAJ10550.1 (protein_id), SEQ ID NO: 50) of the Factor G α-subunit derived from *Limulus polyphemus* was prepared and this cDNA was used for comparison. The test of confirming the glucan-dependent protease activity was performed in the same manner as described above except for using this heterodimer. The results are collectively listed in Table 13.

Further, a heterodimer was obtained by coexpressing the Factor G α-subunit derived from *Tachypleus polyphemus* and the Factor G β-subunit by the method described in WO2008/004674A. The test of confirming the glucan-dependent protease activity was performed in the same manner as described above except for using this heterodimer. The results are listed in Table 14.

TABLE 12

| Concentration of added solution | LNT+ | LNT− | Final concentration |
| --- | --- | --- | --- |
| 1M MOPS pH7.9 | 20 µL | 20 µL | 100 mM MOPS pH7.9 |
| 1M MgSO$_4$ | 10 µL | 10 µL | 50 mM MgSO$_4$ |
| 10 mM CaCl$_2$ | 10 µL | 10 µL | 0.5 mM CaCl$_2$ |
| 10% physiological saline | 20 µL | 20 µL | |
| Water for injection | 40 µL | 60 µL | |
| 5 mM Boc-Thr(T)-Gly(G)-Arg(R)-pNA | 20 µL | 20 µL | 0.5 mM Boc-Thr(T)-Gly(G)-Arg(R)-pNA |
| 35 pg/mL LNT solution | 20 µL | 0 µL | |
| 76 pg/mL proclotting enzyme solution | 10 µL | 10 µL | |
| Factor G coexpression culture supernatant | 50 µL | 50 µL | |
| total amount of reaction solution | 200 µL | 200 µL | |

Further, the LNT used here was prepared by dissolving Lentinan intravenous 1 mg "Ajinomoto" in 1 N NaOH and then used.

TABLE 13

| | Factor G α-subunit A | Factor G α-subunit B | AB547712 |
| --- | --- | --- | --- |
| Factor G βi2 | A | D | D |
| Factor G βi3 | A | C | D |
| Factor G βi2 | C | A | D |
| Factor G βi5 | B | D | D |
| Factor G βC1 | B | D | D |
| Factor G βC2 | C | B | D |

The difference d in absorbance between the case where LNT was added and the case where LNT was not added is defined as a "blank difference".

In Table 13,
A denotes a case where the blank difference is greater than 0.1,
B denotes a case where the blank difference is less than or equal to 0.1 and greater than 0.01,
C denotes a case where the blank difference is less than or equal to 0.01 and greater than 0, and
D denotes a case where the blank difference is equal to 0.

TABLE 14

| | Tachypleus Factor G α-subunit |
| --- | --- |
| Tachypleus Factor G β-subunit | D |

As is apparent in Table 13, it was confirmed that the heterodimer of the present invention has protease activity in the presence of BG.

Further, as is apparent in Table 13, the protease activity of the heterodimer of AB547712, which is a known sequence, and the Factor G β-subunit of the present invention was not able to be measured. As described above, it was confirmed that a Factor G having BG dependence is difficult to prepare in a case of AB547712 which is a known sequence.

Further, as is apparent in Table 14, as a result of the measurement performed in the same manner as described above using the Factor G α and the Factor G β derived from the *Tachypleus* genus in place of the heterodimer of the present invention, the protease activity was not able to be measured.

As described above, it was suggested that the heterodimer of the Factor G α-subunit of the present invention and the Factor G β-subunit of the present invention can be used for quantitative measurement of BG and diagnosis of mycosis.

Example 3. Measurement of BG Using Heterodimer of Present Invention

The known amount of BG was measured by the following method using the supernatant containing the coexpressed product of the Factor G α-subunit A and the Factor G β-subunit βi2 of the present invention or the supernatant containing the coexpressed product of the Factor G α-subunit B and the Factor G β-subunit β2 of the present invention, obtained in the section of 6-3 in Example 1, as a sample.

That is, each reaction solution having the composition listed in Table 15 was prepared and sequentially added to a reaction tube. In Table 15, Lentinan intravenous 1 mg "Ajinomoto" was dissolved in 1 N NaOH such that the LNT concentration was set to 0.35 pg/mL, 3.5 pg/mL, or 35 pg/mL and used as the LNT solution. In addition, distilled water for injection was used as a blank to which LNT was not added.

TABLE 15

| Concentration of added solution | LNT+ | LNT− | Final concentration |
|---|---|---|---|
| 1M MOPS pH7.9 | 20 μL | 20 μL | 100 mM MOPS pH7.9 |
| 1M MgSO₄ | 10 μL | 10 μL | 50 mM MgSO₄ |
| 10 mM CaCl₂ | 10 μL | 10 μL | 0.5 mM CaCl₂ |
| 10% physiological saline | 20 μL | 20 μL | 10% physiological saline |
| Water for injection | 40 μL | 60 μL | |
| 5 mM Boc-Thr(T)-Gly(G)-Arg(R)-pNA | 20 μL | 20 μL | 0.5 mM Boc-Thr(T)-Gly(G)-Arg(R)-pNA |
| LNT solution | 20 μL | 0 μL | |
| 76 pg/mL proclotting enzyme solution | 10 μL | 10 μL | 3.8 pg/mL PCE solution |
| Factor G coexpression culture medium supernatant | 50 μL | 50 μL | |
| total amount of reaction solution | 200 μL | 200 μL | |

Thereafter, the reaction was carried out at 37° C. for 200 minutes, and the absorbance at 405 nm (measurement wavelength) and the absorbance at 492 nm (complementary wavelength) were measured using ELx808 (manufactured by BioTek). The difference in absorbance between the case where LNT was added and the case where LNT was not added (blank) was defined as the absorbance at each LTN concentration.

Next, a calibration curve in which the absorbance with respect to the concentration of lentinan (converted value, pg/mL, x-axis) in the sample was plotted was created.

Figure 3:
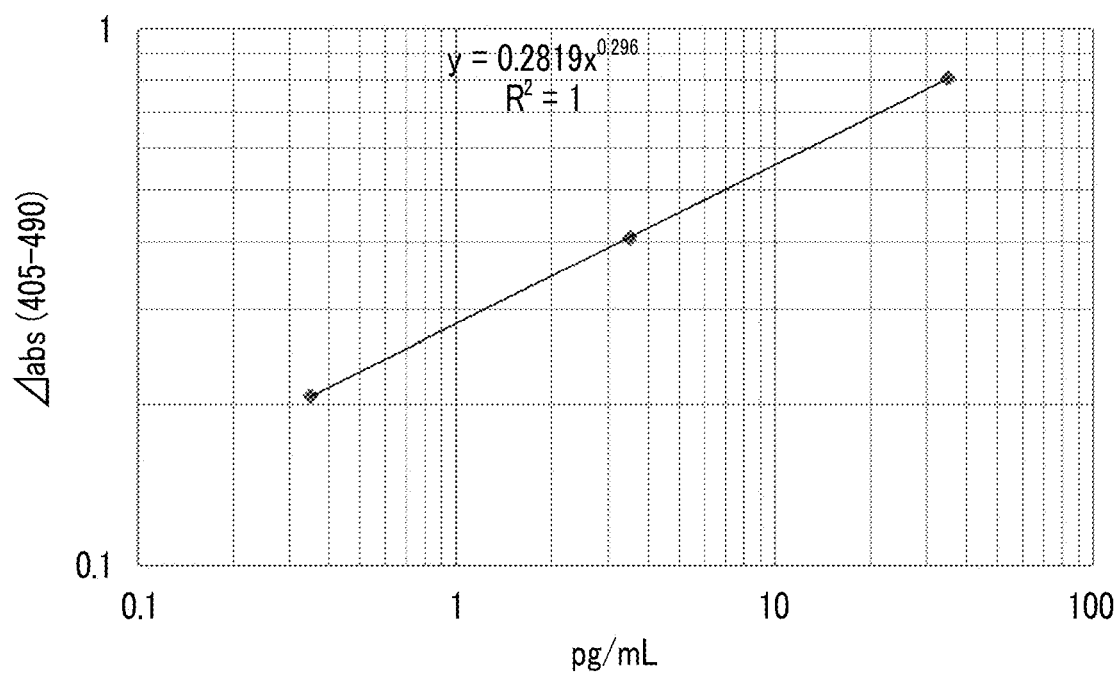
FIG. 3 is a calibration curve showing the relationship between the lentinan concentration and the absorbance in a sample obtained by using heterodimers of a Factor G α-subunit A of the present invention and a Factor G β-subunit βi2 in Example 3.

The calibration curve obtained by the measurement using the supernatant containing the coexpressed product of the Factor G α-subunit A and the Factor G β-subunit βi2 of the present invention is shown in FIG. 3.

The regression line equation and the correlation coefficient acquired from the measured values by the method of least squares are as follows.

$$y = 0.2819 x^{0.296}$$

$$R^2 = 1$$

Figure 4:
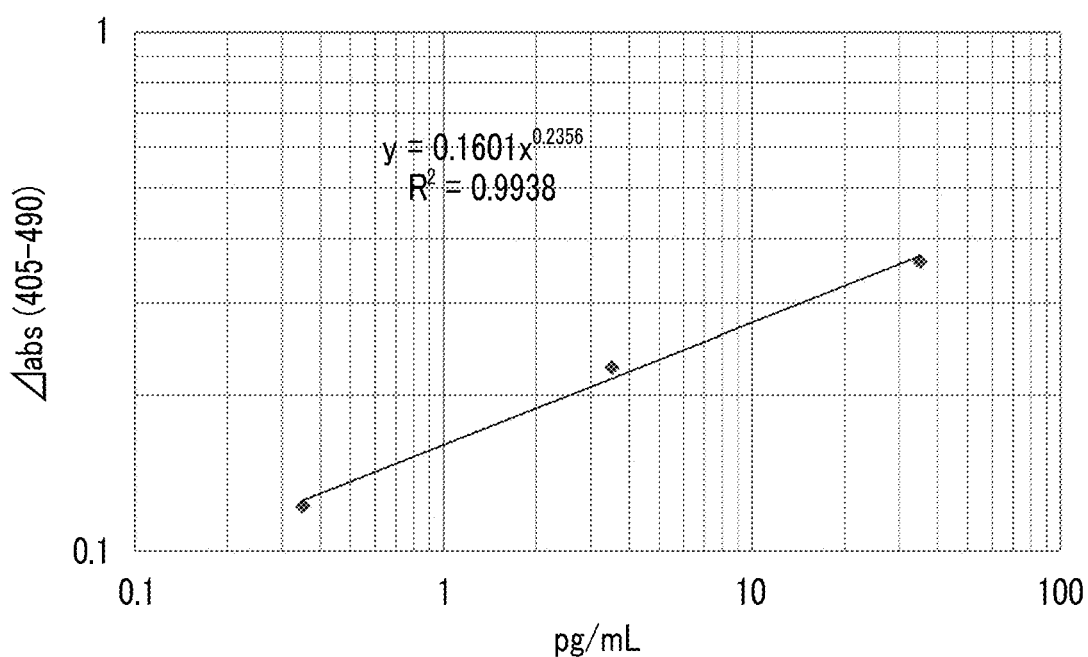
FIG. 4 is a calibration curve showing the relationship between the lentinan concentration and the absorbance in a sample obtained by using the heterodimers of a Factor G α-subunit B of the present invention and a Factor G β-subunit β2 in Example 3.

The calibration curve obtained by the measurement using the supernatant containing the coexpressed product of the Factor G α-subunit B and the Factor G β-subunit β2 of the present invention is shown in FIG. 4.

The regression line equation and the correlation coefficient acquired from the measured values by the method of least squares are as follows.

$$y = 0.1601 x^{0.2356}$$

$$R^2 = 0.9938$$

As is apparent in FIGS. 3 and 4, in a case where BG was measured using the heterodimer of the present invention, a satisfactory calibration curve proportional to the concentration of BG in the sample (0 to 350 pg/mL in terms of lentinan concentration) was obtained. As described above, it was found that the heterodimer of the present invention can be used for quantification of BG. In particular, it was confirmed that the lower limit of the lentinan concentration was significantly detectable up to 0.35 pg/mL. Further, the cutoff value of BG in a case where BG is measured in the field of clinical examination is 11 pg/mL or less.

Example 4. Acquisition-2 of Heterodimer of Present Invention (1) Construction of Expression Vector 1) Construction of Factor G α-Subunit A Expression Vector A Factor G α-subunit A expression vector (α (TYPE A)/pIEx-Bac-1) was constructed by inserting cDNA having the base sequence represented by SEQ ID NO: 41 (including the base sequence and the signal sequence optimized for insect cells listed in Table 9) into the NcoI-NotI site of a plasmid vector pIEx-Bac-1 vector (manufactured by Novagen).

2) Construction of Factor G β-Subunit i2 Expression Vector

An amino acid sequence (SEQ ID NO: 67) in which the signal sequence, the Hat tag, the SUMO tag, and the Factor G β-subunit βi2 (amino acid sequence: SEQ ID NO: 6) were arranged in this order was designed from the 5'-terminal side, this amino acid sequence was encoded, and a base sequence (SEQ ID NO: 68) optimized for insect cells was designed. The base sequence encoding the Factor G β-subunit βi2 of this base sequence is represented by SEQ ID NO: 69.

cDNA having this base sequence was synthesized by entrustment to GENEWIZ. This cDNA was inserted into the NcoI-NotI site of the plasmid vector pIEx-Bac-1 vector (manufactured by Novagen), and the Factor G β-subunit βi2 expression vector (βi2/pIEx-Bac-1) was constructed.

(2) Coexpression Using Expression Vector

Insect cells expresSF+ (registered trademark; manufactured by Protein Science) were seeded on a 6-well plate containing the BG-removed serum-free culture medium PSFM-J1 (pH of 5.5 to 6.2) such that the number of cells was set to 1.0×10⁶ cells.

1 μg of the expression vector α (TYPE A)/pIEx-Bac-1 and 1 μg of the expression vector βi2/pIEx-Bac-1 constructed above, and 2 μL of a transfection reagent ScreenFectA plus (manufactured by FUJIFILM Wako Pure Chemical Corporation) were mixed with 100 μL of a PSFM-J1 culture medium (manufactured by FUJIFILM Wako Pure Chemical Corporation) and incubated at room temperature for 20 minutes, and the solution was added to a 6-well plate seeded with expres SF+.

Thereafter, the cells were cultured at 27° C. for 3 days. After culturing of the cells, the culture solution was centrifuged at 12,000×g at 4° C. for 2 minutes and fractionated into a supernatant and a precipitate. The supernatant was frozen and stored.

(3) Test of Confirming Glucan-Dependent Protease Activity

The glucan-dependent protease activity of the obtained coexpressed product was evaluated by the same method as in Example 2 except that the obtained supernatant (containing the coexpressed product of the Factor G α-subunit A and the Factor G β-subunit βi2 of the present invention) was used as a sample. Further, 35 pg/mL of the LNT solution was added so that the concentration during the measurement was set to 35 pg/mL, 3.5 pg/mL, or 0.35 pg/mL.

Figure 5:
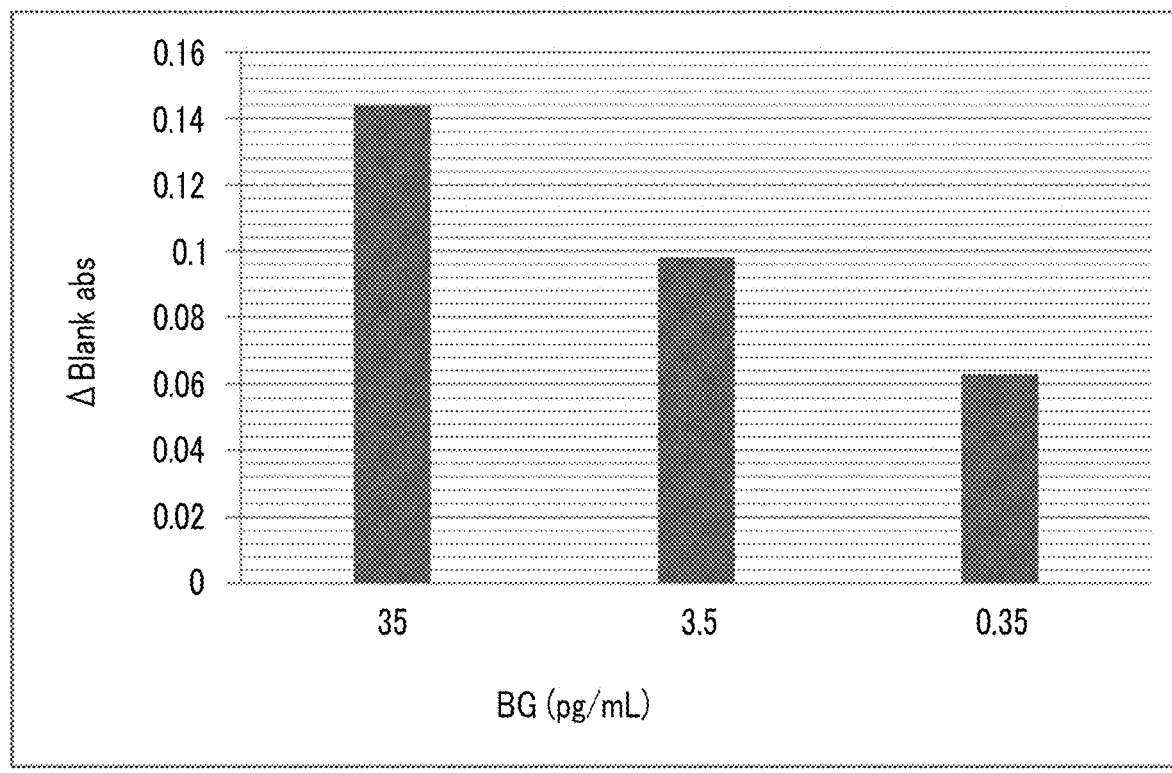
FIG. 5 shows results of measuring the BG concentration in a sample obtained by measuring the lentinan concentration using heterodimers of the Factor G α-subunit A of the present invention and the Factor G β-subunit βi2 obtained in Example 4.

The results are shown in FIG. 5.

As is apparent in FIG. 5, in a case where the BG was measured using the heterodimer of the present invention, it was confirmed that the concentration of BG in the sample was sufficiently detectable even at 0.35 pg/mL in terms of lentinan concentration.

[Sequence list] C:¥Users¥17715150¥Desktop¥2144PCT.txt

What is claimed is:

1. A heterodimer which combines a Factor G α-subunit containing an amino acid sequence represented by SEQ ID NO: 2 with a Factor G β-subunit containing an amino acid sequence represented by SEQ ID NO: 6.

2. A method of measuring a β-glucan in a sample, by contacting said sample with a heterodimer which combines a Factor G α-subunit containing an amino acid sequence represented by SEQ ID NO: 2 with a Factor G β-subunit containing an amino acid sequence represented by SEQ ID NO: 6.

3. A Factor G α-subunit which contains an amino acid sequence represented by SEQ ID NO: 2.

4. A Factor G β-subunit which contains an amino acid sequence represented by SEQ ID NO: 6.

5. A kit for measuring a β-glucan, comprising:
a heterodimer which combines a Factor G α-subunit containing an amino acid sequence represented by SEQ ID NO: 2 with a Factor G β-subunit containing an amino acid sequence represented by SEQ ID NO: 6.

* * * * *

SEQUENCE LISTING

<160> NUMBER OF SEQ ID NOS: 69

<210> SEQ ID NO 1
<211> LENGTH: 1944
<212> TYPE: DNA
<213> ORGANISM: Limulus polyphemus

<400> SEQUENCE: 1

```
gaaccaaaat ggaagctcgt ctggtcggat gaatttacca atggaatcag ttcagattgg      60
gaattcgaaa cgggcaatgg ccccaacggt tggggcaata acgaactgca atattatcgt     120
cgtgaaaata cccgagttga gggcgggaaa ttaataatta cagctaaaga agaagattat     180
gagggtttca ggtacacttc tgccaagctg aaaacccagt tcaataaacc ttggaaagat     240
ggtaaaattg aagccagaat gtcgattcca tcatttcggg gggtctgggt ggcgttctgg     300
atgttaggag acatcaccga tactgatagc tggccctctt ccggtgaaat tgactttgag     360
gaacacataa ataccaacaa tgaagttaga ggaactattc actggtctac ttctgatgac     420
gctgatacac ttcatggcag aggaaccaat actgactatc acatttattc tgtagagtgg     480
aattcttccg ttattagatg gtttgttgat ggaaatcagt actttgaggt gaatattcag     540
agaggagcaa ctggaacaaa cgcatttcat aataacgttt tcgttatttt aaacatggct     600
attggtggaa actggccagg attcaatgtt gctgatgagg ctttccctgc taacatgtat     660
gtagattatg tccgtgtata tcaggatgcc aatacacctt ctcctgttga cgttactcat     720
ttatctggtt actattttct tcaaaatagg cacagtgaac tgtatcttga tgtcagtggt     780
tccagtaacg aagatggagc atttctacaa caatggcctt atagcggtaa tgctaaccaa     840
cagtttgatt ttgtacatct cggaaataag gtttataaaa ttatcaataa aaatagtgga     900
aaatctctgg atgtttacga gttagggact gataatggtg tcagaatcca acagtggtcg     960
tatggagggg gctacaatca gcagtttatt gtacaagatg ttggagatgg ttattataag    1020
atatttgcac gcagcactgg aaagttagtg gaagtagcag atttgaataa agacccagga    1080
ggaaagatac aacaatggtc tgatgatggc caattatccg gacagtggaa acttattcga    1140
aataaagcta attctaaatt gattcaggca gaaagttatt ttgctagttc aaaagtacaa    1200
ttggaagata cctcggatgt aggaggcggg aagaatgtca agtgtgataa tgaaggagcc    1260
tggatggctt acaaggatat caatttccca agttcaggta cttatcaagt agagtacaga    1320
gtggcaagtg aacgtgcagg aggaatgttg tctctggatt tgaatgcagg ttctatagtg    1380
cttggcatgc tgaatgttcc ttcaactgga ggattgcaga agtggaccac catttcccac    1440
acagtgaatg taagttcagg tacgtacaac ttggggatca gtgttcaacg acccgggtgg    1500
aatatcaact ggattaatat tacaaaagta tccagtcagt tgaaatctat tccaagtact    1560
aattctagag taattcaggc agaaagttat ttcgatagtt caaaagtaca attggaagac    1620
acctcggatt ttggaggcgg gaagaatgtt aagtgtgata ctaaaggagc ctggatggcc    1680
tacaaggata tcaattttcc cagttcaggt agttatcaaa tagagtacag agtggcaagt    1740
gaacgtgcag gaggaaagtt gtctctcgat ttgaatgcag gttctatagt gcttggaatg    1800
ctggatgttc cttcaactgg gggatggcag aagtggacca ccatttccca tacagtaaag    1860
gtggattcag gtacttataa cttggggatc tacgttcaac aacccgggtg gaatatcaac    1920
tggattaaga ttacaaaggt ttag                                            1944
```

<210> SEQ ID NO 2
<211> LENGTH: 647
<212> TYPE: PRT
<213> ORGANISM: Limulus polyphemus

<400> SEQUENCE: 2

Glu Pro Lys Trp Lys Leu Val Trp Ser Asp Glu Phe Thr Asn Gly Ile
1               5                   10                  15

Ser Ser Asp Trp Glu Phe Glu Thr Gly Asn Gly Pro Asn Gly Trp Gly
            20                  25                  30

Asn Asn Glu Leu Gln Tyr Tyr Arg Arg Glu Asn Thr Arg Val Glu Gly
        35                  40                  45

Gly Lys Leu Ile Ile Thr Ala Lys Glu Glu Asp Tyr Glu Gly Phe Arg
    50                  55                  60

Tyr Thr Ser Ala Lys Leu Lys Thr Gln Phe Asn Lys Pro Trp Lys Asp
65                  70                  75                  80

Gly Lys Ile Glu Ala Arg Met Ser Ile Pro Ser Phe Arg Gly Val Trp
                85                  90                  95

Val Ala Phe Trp Met Leu Gly Asp Ile Thr Asp Thr Asp Ser Trp Pro
            100                 105                 110

Ser Ser Gly Glu Ile Asp Phe Glu Glu His Ile Asn Thr Asn Asn Glu
        115                 120                 125

Val Arg Gly Thr Ile His Trp Ser Thr Ser Asp Ala Asp Thr Leu
    130                 135                 140

His Gly Arg Gly Thr Asn Thr Asp Tyr His Ile Tyr Ser Val Glu Trp
145                 150                 155                 160

Asn Ser Ser Val Ile Arg Trp Phe Val Asp Gly Asn Gln Tyr Phe Glu
                165                 170                 175

Val Asn Ile Gln Arg Gly Ala Thr Gly Thr Asn Ala Phe His Asn Asn
            180                 185                 190

Val Phe Val Ile Leu Asn Met Ala Ile Gly Gly Asn Trp Pro Gly Phe
        195                 200                 205

Asn Val Ala Asp Glu Ala Phe Pro Ala Asn Met Tyr Val Asp Tyr Val
    210                 215                 220

Arg Val Tyr Gln Asp Ala Asn Thr Pro Ser Pro Val Asp Val Thr His
225                 230                 235                 240

Leu Ser Gly Tyr Tyr Phe Leu Gln Asn Arg His Ser Glu Leu Tyr Leu
                245                 250                 255

Asp Val Ser Gly Ser Ser Asn Glu Asp Gly Ala Phe Leu Gln Gln Trp
            260                 265                 270

Pro Tyr Ser Gly Asn Ala Asn Gln Gln Phe Asp Phe His Leu Gly
        275                 280                 285

Asn Lys Val Tyr Lys Ile Ile Asn Lys Asn Ser Gly Lys Ser Leu Asp
    290                 295                 300

Val Tyr Glu Leu Gly Thr Asp Asn Gly Val Arg Ile Gln Gln Trp Ser
305                 310                 315                 320

Tyr Gly Gly Gly Tyr Asn Gln Gln Phe Ile Val Gln Asp Val Gly Asp
                325                 330                 335

Gly Tyr Tyr Lys Ile Phe Ala Arg Ser Thr Gly Lys Leu Val Glu Val
            340                 345                 350

Ala Asp Leu Asn Lys Asp Pro Gly Gly Lys Ile Gln Gln Trp Ser Asp
        355                 360                 365

Asp Gly Gln Leu Ser Gly Gln Trp Lys Leu Ile Arg Asn Lys Ala Asn
    370                 375                 380

```
Ser Lys Leu Ile Gln Ala Glu Ser Tyr Phe Ala Ser Lys Val Gln
385                 390                 395                 400

Leu Glu Asp Thr Ser Asp Val Gly Gly Gly Lys Asn Val Lys Cys Asp
            405                 410                 415

Asn Glu Gly Ala Trp Met Ala Tyr Lys Asp Ile Asn Phe Pro Ser Ser
        420                 425                 430

Gly Thr Tyr Gln Val Glu Tyr Arg Val Ala Ser Glu Arg Ala Gly Gly
    435                 440                 445

Met Leu Ser Leu Asp Leu Asn Ala Gly Ser Ile Val Leu Gly Met Leu
450                 455                 460

Asn Val Pro Ser Thr Gly Gly Leu Gln Lys Trp Thr Thr Ile Ser His
465                 470                 475                 480

Thr Val Asn Val Ser Ser Gly Thr Tyr Asn Leu Gly Ile Ser Val Gln
                485                 490                 495

Arg Pro Gly Trp Asn Ile Asn Trp Ile Asn Ile Thr Lys Val Ser Ser
            500                 505                 510

Gln Leu Lys Ser Ile Pro Ser Thr Asn Ser Arg Val Ile Gln Ala Glu
        515                 520                 525

Ser Tyr Phe Asp Ser Ser Lys Val Gln Leu Glu Asp Thr Ser Asp Val
530                 535                 540

Gly Gly Gly Lys Asn Val Lys Cys Asp Thr Lys Gly Ala Trp Met Ala
545                 550                 555                 560

Tyr Lys Asp Ile Asn Phe Pro Ser Ser Gly Ser Tyr Gln Ile Glu Tyr
                565                 570                 575

Arg Val Ala Ser Glu Arg Ala Gly Gly Lys Leu Ser Leu Asp Leu Asn
            580                 585                 590

Ala Gly Ser Ile Val Leu Gly Met Leu Asp Val Pro Ser Thr Gly Gly
        595                 600                 605

Trp Gln Lys Trp Thr Thr Ile Ser His Thr Val Lys Val Asp Ser Gly
610                 615                 620

Thr Tyr Asn Leu Gly Ile Tyr Val Gln Gln Pro Gly Trp Asn Ile Asn
625                 630                 635                 640

Trp Ile Lys Ile Thr Lys Val
                645

<210> SEQ ID NO 3
<211> LENGTH: 1953
<212> TYPE: DNA
<213> ORGANISM: Limulus polyphemus

<400> SEQUENCE: 3
acaaattgga agctcgtctg gtcggatgaa tttaccaatg gaatcagttc agattgggaa      60
ttcgaaacag gcaatggccc caacggttgg ggcaataatg aactgcaata ttatcgtcga     120
gaaaatgccc gagttgaggg cgggaaatta ataattacag ctaaaaaga agattatgag      180 ggtttcaggt acacttctgc caagctgaaa acccagttca ataaacctg aaagatggt      240 aaaattgaag ccagaatgtc gattccatca tttcgggggg tctgggtggc gttctggatg     300
ttaggagaca tcaccgatac tgatagctgg ccctcttccg gtgaaattga ctttaaggaa     360
catataaata ccaacaatga agttagagga actattcact ggtctacttc tgatggtgct     420
catacgcatc atggcagagg aaccaatact gactatcaca tttattctgt agagtggaat     480
tcttccgtta ttgatggtt tgttgatgga aatcagtact tgaggtgaa tattcagaga      540 ggagcaactg gaacaaacgc atttcataac aaagttttcg ttatttttaaa catggctatt     600
```

```
ggtggaaact ggccaggatt caatgttgct gatgaggctt tccctgctaa catgtatgta    660
gattatgtcc gtgtatatca ggatgccaat acaccttctc ctgttgacgt tgacgttact    720
gatttatctg gttactattt tcttcaaaat aggcacagtg aactgtatct tgatgtcagt    780
ttctccagta acaagatgg agcatttcta caacaatggc cttataacgg taatgctaac     840
caacagtttg attttgtaca tctcggaaat aatatatata aaattaccaa taaaaatagt    900
ggaaaatctc tggatgtcta caatgtaggg actgaaaatg gtgtcagaat caacagatg     960
ccgtatagag ggagctacaa tcagcagttt attgtacaag atgttggaga tggttattat   1020
aagatatttg cacgcaacag cagaaagtta gtggaagtag cagatttcaa taaagaccca   1080
ggaggaaaga tacaacaatg gtctgatgat ggccaaatat ccggacagtg gaaacttatt   1140
cgaaataaag ttaattctaa agtaattcag gcagaaagtt attttgctag tttaggagta   1200
caattggaag acacctcgga tgtaggaggc gggaagaatg ttaagtgtga tactgaagga   1260
gcctggatgg cttacaagga tatcaatttc cccagttcag gtagttatca agtagagtac   1320
agagtggcaa gcgaacgtgc aggaggaaag ttgtctctgg atttgaatgc aggttctata   1380
gtgcttggaa tgctgaatgt tccttcaaca ggaggatggc agaagtggac caccatttcc   1440
catacagtaa aggtggattc aggtacttat aacttgggga tctacgttca acgacccagg   1500
tggaatatca actggattaa gattacagaa gcacccggac agtcaaaacc tattcaaaga   1560
agtgataccg attctaaagt aattcaggca gaaagttatt ttgctagttc aaaagtacaa   1620
ttggaagata cctcggatgt tggaggcggg aagaatgtta agtgtgataa tgaaggagcc   1680
tggatggcct acaaggatat taattttccc agttcaggta gttatcaaat agagtacaga   1740
gtggcaagtg aacgtgcagg aggaaagttg tctctcgatt tgaatgcagg ttctatagtg   1800
cttggaatgc tggatgttcc ttcaactggg ggatggcaga agtggaccac catttcccac   1860
acagtgaatg tgagttcggg tacatataac ttggggatct acgttcaacg agctgcgtgg   1920
aatatcaact ggattaagat tacaaaggtt tag                                1953

<210> SEQ ID NO 4
<211> LENGTH: 650
<212> TYPE: PRT
<213> ORGANISM: Limulus polyphemus

<400> SEQUENCE: 4

Thr Asn Trp Lys Leu Val Trp Ser Asp Glu Phe Thr Asn Gly Ile Ser
1               5                   10                  15

Ser Asp Trp Glu Phe Glu Thr Gly Asn Gly Pro Asn Gly Trp Gly Asn
            20                  25                  30

Asn Glu Leu Gln Tyr Tyr Arg Arg Glu Asn Ala Arg Val Glu Gly Gly
        35                  40                  45

Lys Leu Ile Ile Thr Ala Lys Lys Glu Asp Tyr Glu Gly Phe Arg Tyr
    50                  55                  60

Thr Ser Ala Lys Leu Lys Thr Gln Phe Asn Lys Pro Trp Lys Asp Gly
65                  70                  75                  80

Lys Ile Glu Ala Arg Met Ser Ile Pro Ser Phe Arg Gly Val Trp Val
                85                  90                  95

Ala Phe Trp Met Leu Gly Asp Ile Thr Asp Thr Ser Trp Pro Ser
                100                 105                 110

Ser Gly Glu Ile Asp Phe Lys Glu His Ile Asn Thr Asn Asn Glu Val
            115                 120                 125

Arg Gly Thr Ile His Trp Ser Thr Ser Asp Gly Ala His Thr His His
```

-continued

```
                130                 135                 140
Gly Arg Gly Thr Asn Thr Asp Tyr His Ile Tyr Ser Val Glu Trp Asn
145                 150                 155                 160

Ser Ser Val Ile Arg Trp Phe Val Asp Gly Asn Gln Tyr Phe Glu Val
                165                 170                 175

Asn Ile Gln Arg Gly Ala Thr Gly Thr Asn Ala Phe His Asn Lys Val
                180                 185                 190

Phe Val Ile Leu Asn Met Ala Ile Gly Gly Asn Trp Pro Gly Phe Asn
                195                 200                 205

Val Ala Asp Glu Ala Phe Pro Ala Asn Met Tyr Val Asp Tyr Val Arg
210                 215                 220

Val Tyr Gln Asp Ala Asn Thr Pro Ser Pro Val Asp Val Asp Val Thr
225                 230                 235                 240

Asp Leu Ser Gly Tyr Tyr Phe Leu Gln Asn Arg His Ser Glu Leu Tyr
                245                 250                 255

Leu Asp Val Ser Phe Ser Ser Asn Lys Asp Gly Ala Phe Leu Gln Gln
                260                 265                 270

Trp Pro Tyr Asn Gly Asn Ala Asn Gln Gln Phe Asp Phe Val His Leu
                275                 280                 285

Gly Asn Asn Ile Tyr Lys Ile Thr Asn Lys Asn Ser Gly Lys Ser Leu
                290                 295                 300

Asp Val Tyr Asn Val Gly Thr Glu Asn Gly Val Arg Ile Gln Gln Met
305                 310                 315                 320

Pro Tyr Arg Gly Ser Tyr Asn Gln Gln Phe Ile Val Gln Asp Val Gly
                325                 330                 335

Asp Gly Tyr Tyr Lys Ile Phe Ala Arg Asn Ser Arg Lys Leu Val Glu
                340                 345                 350

Val Ala Asp Phe Asn Lys Asp Pro Gly Gly Lys Ile Gln Gln Trp Ser
                355                 360                 365

Asp Asp Gly Gln Ile Ser Gly Gln Trp Lys Leu Ile Arg Asn Lys Val
370                 375                 380

Asn Ser Lys Val Ile Gln Ala Glu Ser Tyr Phe Ala Ser Leu Gly Val
385                 390                 395                 400

Gln Leu Glu Asp Thr Ser Asp Val Gly Gly Lys Asn Val Lys Cys
                405                 410                 415

Asp Thr Glu Gly Ala Trp Met Ala Tyr Lys Asp Ile Asn Phe Pro Ser
                420                 425                 430

Ser Gly Ser Tyr Gln Val Glu Tyr Arg Val Ala Ser Glu Arg Ala Gly
                435                 440                 445

Gly Lys Leu Ser Leu Asp Leu Asn Ala Gly Ser Ile Val Leu Gly Met
                450                 455                 460

Leu Asn Val Pro Ser Thr Gly Gly Trp Gln Trp Thr Thr Ile Ser
465                 470                 475                 480

His Thr Val Lys Val Asp Ser Gly Thr Tyr Asn Leu Gly Ile Tyr Val
                485                 490                 495

Gln Arg Pro Arg Trp Asn Ile Asn Trp Ile Lys Ile Thr Glu Ala Pro
                500                 505                 510

Gly Gln Ser Lys Pro Ile Gln Arg Ser Asp Thr Asp Ser Lys Val Ile
                515                 520                 525

Gln Ala Glu Ser Tyr Phe Ala Ser Ser Lys Val Gln Leu Glu Asp Thr
                530                 535                 540

Ser Asp Val Gly Gly Gly Lys Asn Val Lys Cys Asp Asn Glu Gly Ala
545                 550                 555                 560
```

Trp Met Ala Tyr Lys Asp Ile Asn Phe Pro Ser Ser Gly Ser Tyr Gln
            565                 570                 575

Ile Glu Tyr Arg Val Ala Ser Glu Arg Ala Gly Gly Lys Leu Ser Leu
        580                 585                 590

Asp Leu Asn Ala Gly Ser Ile Val Leu Gly Met Leu Asp Val Pro Ser
    595                 600                 605

Thr Gly Gly Trp Gln Lys Trp Thr Thr Ile Ser His Thr Val Asn Val
610                 615                 620

Ser Ser Gly Thr Tyr Asn Leu Gly Ile Tyr Val Gln Arg Ala Ala Trp
625                 630                 635                 640

Asn Ile Asn Trp Ile Lys Ile Thr Lys Val
            645                 650

<210> SEQ ID NO 5
<211> LENGTH: 855
<212> TYPE: DNA
<213> ORGANISM: Limulus polyphemus

<400> SEQUENCE: 5

```
atgtctgtaa catcaagggt tcgacgtgaa atcaatgaag aacattgcgg gatcagacca        60
acagctccaa ggattattaa gggacgaata tcaatacctc attcttggcc gtggatggtc       120 ggaattttc aagtagatcc tctccttttc atttgtggtg aactattat taataaagtc        180 tccgttgtca ctgccgccca ttgtcttgtg acacagtctg gaaacagaca gaattcttcc       240
attgtcgtaa gagttggagc tcatgacata gacaattcgg gcatcgacta tcatgtagat       300
aagattattg ttcaccagga ctacaaatac cgttcacaat actacgatat tggtttgatt       360
ttactctcga aacgaatcga atataactac aaagtacggc ctgtctgtat tcctgagttg       420
aacaagttga acgtgaactt aaacaataag gaggtcgttg ttattggttg gggtgttact       480
gaaagaggta gtgagaaaca taatgttcta cgtgaactgg agttgcccgt agttacaaac       540
gaactgtgca acaagtctta tcaaaccata tcattctccg gcctcaaccg aggaatcact       600
gatgatatga tttgtgctgg ataccaggaa ggaggaagag attcttgtga gggcgactct       660
ggtggtcctc tgatgtatca tgatccaaca acaggaagag tcgaattagt gggagttgta       720
tcatttgggt tcggatgtgc tcgtcccaac ttcccgggag tttacacgcg cctctcgagc       780
tacggtaact ggttccagaa agtcaccttt ggatatttac tcgctacttt attcgaagtt       840
gtgccagtat tttaa                                                         855
```

<210> SEQ ID NO 6
<211> LENGTH: 284
<212> TYPE: PRT
<213> ORGANISM: Limulus polyphemus

<400> SEQUENCE: 6

Met Ser Val Thr Ser Arg Val Arg Arg Glu Ile Asn Glu Glu His Cys
1               5                   10                  15

Gly Ile Arg Pro Thr Ala Pro Arg Ile Ile Lys Gly Arg Ile Ser Ile
            20                  25                  30

Pro His Ser Trp Pro Trp Met Val Gly Ile Phe Gln Val Asp Pro Leu
        35                  40                  45

Leu Phe Ile Cys Gly Gly Thr Ile Ile Asn Lys Val Ser Val Val Thr
    50                  55                  60

Ala Ala His Cys Leu Val Thr Gln Ser Gly Asn Arg Gln Asn Ser Ser
65                  70                  75                  80

```
Ile Val Val Arg Val Gly Ala His Asp Ile Asp Asn Ser Gly Ile Asp
                85                  90                  95
Tyr His Val Asp Lys Ile Ile Val His Gln Asp Tyr Lys Tyr Arg Ser
            100                 105                 110
Gln Tyr Tyr Asp Ile Gly Leu Ile Leu Leu Ser Lys Arg Ile Glu Tyr
            115                 120                 125
Asn Tyr Lys Val Arg Pro Val Cys Ile Pro Glu Leu Asn Lys Leu Asn
130                 135                 140
Val Asn Leu Asn Asn Lys Glu Val Val Ile Gly Trp Gly Val Thr
145                 150                 155                 160
Glu Arg Gly Ser Glu Lys His Asn Val Leu Arg Glu Leu Glu Leu Pro
                165                 170                 175
Val Val Thr Asn Glu Leu Cys Asn Lys Ser Tyr Gln Thr Ile Ser Phe
            180                 185                 190
Ser Gly Leu Asn Arg Gly Ile Thr Asp Asp Met Ile Cys Ala Gly Tyr
            195                 200                 205
Gln Glu Gly Gly Arg Asp Ser Cys Glu Gly Asp Ser Gly Gly Pro Leu
            210                 215                 220
Met Tyr His Asp Pro Thr Thr Gly Arg Val Glu Leu Val Gly Val Val
225                 230                 235                 240
Ser Phe Gly Phe Gly Cys Ala Arg Pro Asn Phe Pro Gly Val Tyr Thr
            245                 250                 255
Arg Leu Ser Ser Tyr Gly Asn Trp Phe Gln Lys Val Thr Phe Gly Tyr
            260                 265                 270
Leu Leu Ala Thr Leu Phe Glu Val Val Pro Val Phe
            275                 280

<210> SEQ ID NO 7
<211> LENGTH: 855
<212> TYPE: DNA
<213> ORGANISM: Limulus polyphemus

<400> SEQUENCE: 7
atgtctgtaa catcaagggt tcgacgtgaa atcaatgaag aacattgcgg gatcagacca      60
acagctccaa ggattattaa gggacgaata tcaatacctc attcttggcc gtggatggtc     120 ggaattttc aagtagatcc tctccttttc atttgtggtg aactattat taataaagtc      180 tccgttgtca ctgccgccca ttgtcttgtg acacagtctg gaaacagaca gaattcttcc     240
attgtcgtaa gagttggagc tcatgacata gacaattcgg gcatcgacta tcatgtagat     300
aagattattg ttcaccagga ctacaaatac cgttcacaat actacgatat tggtttgatt     360
ttactctcga aaccaatcga atacaactac aaagtacggc ctgtctgtat tcctgagttg     420
aacaagttga acgtgaactt aaacaataag gaggtcgttg ttattggttg gggtgttact     480
gaaagaggta gtgagaaata taatgttcta cgtgaactgg agttgcccgt agttacaaac     540
gaactgtgca acaagtctta tcaaaccata tcattctccg gcctcaaccg aggaatcact     600
gatgatatga tttgtgctgg ataccaggaa ggaggaagag attcttgtga gggcgactct     660
ggtggtcctc tgatgtatca tgatccaaca acaggaagag tcgaattagt gggagttgta     720
tcatttgggt tcggatgtgc tcgtcccaac ttcccgggag tttacacgcg cctctcgagc     780
tacggtaact ggttccagaa agtcaccttt ggatatttac tcgctacttt attcgaagtt     840
gtgccagtat tttaa                                                      855
```

<210> SEQ ID NO 8
<211> LENGTH: 284
<212> TYPE: PRT
<213> ORGANISM: Limulus polyphemus

<400> SEQUENCE: 8

Met Ser Val Thr Ser Arg Val Arg Arg Glu Ile Asn Glu Glu His Cys
1               5                   10                  15

Gly Ile Arg Pro Thr Ala Pro Arg Ile Ile Lys Gly Arg Ile Ser Ile
            20                  25                  30

Pro His Ser Trp Pro Trp Met Val Gly Ile Phe Gln Val Asp Pro Leu
        35                  40                  45

Leu Phe Ile Cys Gly Gly Thr Ile Ile Asn Lys Val Ser Val Val Thr
    50                  55                  60

Ala Ala His Cys Leu Val Thr Gln Ser Gly Asn Arg Gln Asn Ser Ser
65                  70                  75                  80

Ile Val Val Arg Val Gly Ala His Asp Ile Asp Asn Ser Gly Ile Asp
                85                  90                  95

Tyr His Val Asp Lys Ile Ile Val His Gln Asp Tyr Lys Tyr Arg Ser
            100                 105                 110

Gln Tyr Tyr Asp Ile Gly Leu Ile Leu Leu Ser Lys Pro Ile Glu Tyr
        115                 120                 125

Asn Tyr Lys Val Arg Pro Val Cys Ile Pro Glu Leu Asn Lys Leu Asn
    130                 135                 140

Val Asn Leu Asn Asn Lys Glu Val Val Ile Gly Trp Gly Val Thr
145                 150                 155                 160

Glu Arg Gly Ser Glu Lys Tyr Asn Val Leu Arg Glu Leu Glu Leu Pro
                165                 170                 175

Val Val Thr Asn Glu Leu Cys Asn Lys Ser Tyr Gln Thr Ile Ser Phe
            180                 185                 190

Ser Gly Leu Asn Arg Gly Ile Thr Asp Asp Met Ile Cys Ala Gly Tyr
        195                 200                 205

Gln Glu Gly Gly Arg Asp Ser Cys Glu Gly Asp Ser Gly Gly Pro Leu
    210                 215                 220

Met Tyr His Asp Pro Thr Thr Gly Arg Val Glu Leu Val Gly Val Val
225                 230                 235                 240

Ser Phe Gly Phe Gly Cys Ala Arg Pro Asn Phe Pro Gly Val Tyr Thr
                245                 250                 255

Arg Leu Ser Ser Tyr Gly Asn Trp Phe Gln Lys Val Thr Phe Gly Tyr
            260                 265                 270

Leu Leu Ala Thr Leu Phe Glu Val Val Pro Val Phe
        275                 280

<210> SEQ ID NO 9
<211> LENGTH: 855
<212> TYPE: DNA
<213> ORGANISM: Limulus polyphemus

<400> SEQUENCE: 9
atgtctgtaa catcaagggt tcgacgtgaa atcaatgaag aacattgcgg gatcagacca      60
acagctccaa ggattattaa gggacgaata tcaatacctc attcttggcc gtggatggtc     120 ggaattttc aagtagatcc tctcctttc atttgtggtg aactattat taataaagtc        180 tccgttgtca ctgccgccca tgtcttgtg acacagtctg gaaacagaca gaattattcc      240
attgtcgtaa gagttggagc tcatgacata gacaattcgg gtatcgacta tcatgtagat     300

```
aagattattg ttcaccagga ctacaaatac cgttcacaat actacgatat tggtttgatt      360
ttactctcga aaccaatcga atacaactac aaagtacggc ctgtctgtat tcctgagttg      420
aacaagttga acgtgaactt aaacaataag gaggtcgttg ttattggttg gggtgttact      480
gaaagaggta gtgagaaaca taatgttcta cgtgaactgg agttgcccgt agttacaaac      540
gaactgtgca acaagtctta tcaaaccata tcattctccg gcctcaaccg aggaatcact      600
gatgatatga tttgtgctgg ataccaggaa ggaggaagag attcttgtga gggcgactct      660
ggtggtcctc tgatgtatca tgatccaaca acaggaggag tcgaattagt gggagttgta      720
tcatttgggt tcggatgtgc tcgtcccaac ttcccgggag tttacacgcg cctctcgagc      780
tacggtaact ggttccagaa agtcaccttt ggatatttac tcgctacttt attcgaagtt      840
gtgccagtat tttaa                                                      855
```

<210> SEQ ID NO 10
<211> LENGTH: 284
<212> TYPE: PRT
<213> ORGANISM: Limulus polyphemus

<400> SEQUENCE: 10

```
Met Ser Val Thr Ser Arg Val Arg Arg Glu Ile Asn Glu Glu His Cys
1               5                   10                  15

Gly Ile Arg Pro Thr Ala Pro Arg Ile Ile Lys Gly Arg Ile Ser Ile
            20                  25                  30

Pro His Ser Trp Pro Trp Met Val Gly Ile Phe Gln Val Asp Pro Leu
        35                  40                  45

Leu Phe Ile Cys Gly Gly Thr Ile Ile Asn Lys Val Ser Val Val Thr
    50                  55                  60

Ala Ala His Cys Leu Val Thr Gln Ser Gly Asn Arg Gln Asn Tyr Ser
65                  70                  75                  80

Ile Val Val Arg Val Gly Ala His Asp Ile Asp Asn Ser Gly Ile Asp
                85                  90                  95

Tyr His Val Asp Lys Ile Ile Val His Gln Asp Tyr Lys Tyr Arg Ser
            100                 105                 110

Gln Tyr Tyr Asp Ile Gly Leu Ile Leu Leu Ser Lys Pro Ile Glu Tyr
        115                 120                 125

Asn Tyr Lys Val Arg Pro Val Cys Ile Pro Glu Leu Asn Lys Leu Asn
    130                 135                 140

Val Asn Leu Asn Asn Lys Glu Val Val Ile Gly Trp Gly Val Thr
145                 150                 155                 160

Glu Arg Gly Ser Glu Lys His Asn Val Leu Arg Glu Leu Glu Leu Pro
                165                 170                 175

Val Val Thr Asn Glu Leu Cys Asn Lys Ser Tyr Gln Thr Ile Ser Phe
            180                 185                 190

Ser Gly Leu Asn Arg Gly Ile Thr Asp Asp Met Ile Cys Ala Gly Tyr
        195                 200                 205

Gln Glu Gly Gly Arg Asp Ser Cys Glu Gly Asp Ser Gly Gly Pro Leu
    210                 215                 220

Met Tyr His Asp Pro Thr Thr Gly Gly Val Glu Leu Val Gly Val Val
225                 230                 235                 240

Ser Phe Gly Phe Gly Cys Ala Arg Pro Asn Phe Pro Gly Val Tyr Thr
                245                 250                 255

Arg Leu Ser Ser Tyr Gly Asn Trp Phe Gln Lys Val Thr Phe Gly Tyr
            260                 265                 270
```

Leu Leu Ala Thr Leu Phe Glu Val Val Pro Val Phe
              275                 280

<210> SEQ ID NO 11
<211> LENGTH: 855
<212> TYPE: DNA
<213> ORGANISM: Limulus polyphemus

<400> SEQUENCE: 11

```
atgtctgtaa catcaagggt tcgacgtgaa atcaatgaag acattgtgg gatcagacca        60 acagctccaa ggattattaa gggacgaata tcaataccttc attcttggcc gtggatggtc    120
ggaatttttc aagtagatcc tctccttttc atttgtggtg aactattat taataaagtc      180 tccgttgtca ctgccgccca ttgtcttgtg acacagtctg aaacagaca gaattattcc      240 attgtcgtaa gagttggagc tcatgacata gacaattcgg gtatcgacta tcatgtagat    300
aagattattg ttcaccagga ctacaaatac cgttcacaat actacgatat tggtttgatt    360
ttactctcga aaccaatcga atacaactac aaagtacggc ctgtctgtat tcctgagttg    420
aacaagttga acgtgaactt aaacaataag gaggtcgttg ttattggttg gggtgttact    480
gaaagaggta gtgagaaata taatgttcta cgtgaactgg agttgcccgt agttacaaac    540
gaactgtgca acaagtctta tcaaaccata tcattctccg gcctcaaccg aggaatcact    600
gatgatatga tttgtgctgg ataccaggaa ggaggaagag attcttgtga gggcgactct    660
ggtggtcctc tgatgtatca tgatccaaca acaggaagag tcgaattagt gggagttgta    720
tcatttgggt tcggatgtgc tcgtcccaac ttcccgggag tttacacgcg cctctcgagc    780
tacggtaact ggttccagaa agtcaccttt ggatatttac tcgctacttt attcgaagtt    840
gtgccagtat tttaa                                                       855
```

<210> SEQ ID NO 12
<211> LENGTH: 284
<212> TYPE: PRT
<213> ORGANISM: Limulus polyphemus

<400> SEQUENCE: 12

Met Ser Val Thr Ser Arg Val Arg Arg Glu Ile Asn Glu Glu His Cys
1               5                   10                  15

Gly Ile Arg Pro Thr Ala Pro Arg Ile Ile Lys Gly Arg Ile Ser Ile
            20                  25                  30

Pro His Ser Trp Pro Trp Met Val Gly Ile Phe Gln Val Asp Pro Leu
        35                  40                  45

Leu Phe Ile Cys Gly Gly Thr Ile Ile Asn Lys Val Ser Val Val Thr
    50                  55                  60

Ala Ala His Cys Leu Val Thr Gln Ser Gly Asn Arg Gln Asn Tyr Ser
65                  70                  75                  80

Ile Val Val Arg Val Gly Ala His Asp Ile Asp Asn Ser Gly Ile Asp
                85                  90                  95

Tyr His Val Asp Lys Ile Ile Val His Gln Asp Tyr Lys Tyr Arg Ser
            100                 105                 110

Gln Tyr Tyr Asp Ile Gly Leu Ile Leu Leu Ser Lys Pro Ile Glu Tyr
        115                 120                 125

Asn Tyr Lys Val Arg Pro Val Cys Ile Pro Glu Leu Asn Lys Leu Asn
    130                 135                 140

Val Asn Leu Asn Asn Lys Glu Val Val Val Ile Gly Trp Gly Val Thr
145                 150                 155                 160

```
Glu Arg Gly Ser Glu Lys Tyr Asn Val Leu Arg Glu Leu Glu Leu Pro
            165                 170                 175

Val Val Thr Asn Glu Leu Cys Asn Lys Ser Tyr Gln Thr Ile Ser Phe
        180                 185                 190

Ser Gly Leu Asn Arg Gly Ile Thr Asp Asp Met Ile Cys Ala Gly Tyr
        195                 200                 205

Gln Glu Gly Gly Arg Asp Ser Cys Glu Gly Asp Ser Gly Gly Pro Leu
    210                 215                 220

Met Tyr His Asp Pro Thr Thr Gly Arg Val Glu Leu Val Gly Val Val
225                 230                 235                 240

Ser Phe Gly Phe Gly Cys Ala Arg Pro Asn Phe Pro Gly Val Tyr Thr
            245                 250                 255

Arg Leu Ser Ser Tyr Gly Asn Trp Phe Gln Lys Val Thr Phe Gly Tyr
        260                 265                 270

Leu Leu Ala Thr Leu Phe Glu Val Val Pro Val Phe
        275                 280

<210> SEQ ID NO 13
<211> LENGTH: 855
<212> TYPE: DNA
<213> ORGANISM: Limulus polyphemus

<400> SEQUENCE: 13
atgtctgtaa catcaagggt tcgacgtgaa atcaatgaag aacattgtgg gatcagacca        60
acagctccaa ggattattaa gggacgaata tcaataccct attcttggcc gtggatggtc       120
ggaattttct aagtagatcc tctccttttc atttgtggtg aactattat taataaagtc        180 tccgttgtca ctgccgccca ttgtcttgtg acacagtctg aaacagaca gaattcttcc        240 attgtcgtaa gagttggagc tcatgacata gacaattcgg gcatcgacta tcatgtagat       300
aagattattg ttcaccagga ctacaaatac cgttcacaat actacgatat tggtttgatt       360
ttactctcga aacgaatcga atataactac aaagtacggc ctgtctgtat tcctgagttg       420
aacaagttga acgtgaactt aaacaataag gaggtcgttg ttattggttg ggtgttact        480 gaaagaggta gtgagaaata taatgttcta cgtgaactgg agttgcccgt agttacaaac       540
gaactgtgca acaagtctta tcaaaccata tcattctccg gcctcaaccg aggaatcact       600
gatgatatga tttgtgctgg ataccaggaa ggaggaagag attcttgtga gggcgactct       660
ggtggtcctc tgatgtatca tgatccaaca acaggaagag tcgaattagt gggagttgta       720
tcatttgggt tcggatgtgc tcgtcccaac ttcccgggag tttacacgcg cctctcgagc       780
tacggtaact ggttccagaa agtcaccttt ggatatttac tcgctacttt attcgaagtt       840
gtgccagtat tttaa                                                       855

<210> SEQ ID NO 14
<211> LENGTH: 284
<212> TYPE: PRT
<213> ORGANISM: Limulus polyphemus

<400> SEQUENCE: 14

Met Ser Val Thr Ser Arg Val Arg Arg Glu Ile Asn Glu Glu His Cys
1               5                   10                  15

Gly Ile Arg Pro Thr Ala Pro Arg Ile Ile Lys Gly Arg Ile Ser Ile
            20                  25                  30

Pro His Ser Trp Pro Trp Met Val Gly Ile Phe Gln Val Asp Pro Leu
        35                  40                  45
```

```
Leu Phe Ile Cys Gly Gly Thr Ile Ile Asn Lys Val Ser Val Val Thr
 50                  55                  60

Ala Ala His Cys Leu Val Thr Gln Ser Gly Asn Arg Gln Asn Ser Ser
 65                  70                  75                  80

Ile Val Val Arg Val Gly Ala His Asp Ile Asp Asn Ser Gly Ile Asp
                 85                  90                  95

Tyr His Val Asp Lys Ile Ile Val His Gln Asp Tyr Lys Tyr Arg Ser
                100                 105                 110

Gln Tyr Tyr Asp Ile Gly Leu Ile Leu Leu Ser Lys Arg Ile Glu Tyr
            115                 120                 125

Asn Tyr Lys Val Arg Pro Val Cys Ile Pro Glu Leu Asn Lys Leu Asn
130                 135                 140

Val Asn Leu Asn Asn Lys Glu Val Val Ile Gly Trp Gly Val Thr
145                 150                 155                 160

Glu Arg Gly Ser Glu Lys Tyr Asn Val Leu Arg Glu Leu Glu Leu Pro
                165                 170                 175

Val Val Thr Asn Glu Leu Cys Asn Lys Ser Tyr Gln Thr Ile Ser Phe
            180                 185                 190

Ser Gly Leu Asn Arg Gly Ile Thr Asp Asp Met Ile Cys Ala Gly Tyr
            195                 200                 205

Gln Glu Gly Gly Arg Asp Ser Cys Glu Gly Asp Ser Gly Gly Pro Leu
210                 215                 220

Met Tyr His Asp Pro Thr Thr Gly Arg Val Glu Leu Val Gly Val Val
225                 230                 235                 240

Ser Phe Gly Phe Gly Cys Ala Arg Pro Asn Phe Pro Gly Val Tyr Thr
                245                 250                 255

Arg Leu Ser Ser Tyr Gly Asn Trp Phe Gln Lys Val Thr Phe Gly Tyr
            260                 265                 270

Leu Leu Ala Thr Leu Phe Glu Val Val Pro Val Phe
            275                 280

<210> SEQ ID NO 15
<211> LENGTH: 855
<212> TYPE: DNA
<213> ORGANISM: Limulus polyphemus

<400> SEQUENCE: 15
atgtctgtaa catcaagggt tcgacgtgaa atcaatgaag aacattgtgg gatcagacca      60
acagctccaa ggattattaa gggacgaata tcaatacctc attcttggcc gtggatggtc     120 ggaattttc aagtagatcc tctccttttc atttgtggtg aactattat taataaagtc      180 tccgttgtca ctgccgccca ttgtcttgtg acacagtctg aaacagaca gaattattcc     240 attgtcgtaa gagttggagc tcatgacata gacaattcgg gtatcgacta tcatgtagat     300
aagattattg ttcaccagga ctacaaatac cgttcacaat actacgatat tggtttgatt     360
ttactctcga aaccaatcga atacaactac aaagtacggc ctgtctgtat tcctgagttg     420
aacaagttga acgtgaactt aaacaataag gaggtcgttg ttattggttg ggtgttact     480 gaaagaggta gtgagaaaca taatgttcta cgtgaactgg agttgcccgt agttacaaac     540
gaactgtgca caagtcttta caaaccata tcattctccg gctcaaccg aggaatcact     600 gatgatatga tttgtgctgg ataccaggaa ggaggaagag attcttgtga gggcgactct     660
ggtggtcctc tgatgtatca tgatccaaca acaggaagag tcgaattagt gggagttgta     720
tcatttgggt tcggatgtgc tcgtcccaac ttcccgggag tttacacgcg cctctcgagc     780
```

```
tacggtaact ggttccagaa agtcaccttt ggatatttac tcgctacttt attcgaagtt      840
gtgccagtat tttaa                                                       855
```

<210> SEQ ID NO 16
<211> LENGTH: 284
<212> TYPE: PRT
<213> ORGANISM: Limulus polyphemus

<400> SEQUENCE: 16

```
Met Ser Val Thr Ser Arg Val Arg Arg Glu Ile Asn Glu Glu His Cys
1               5                   10                  15

Gly Ile Arg Pro Thr Ala Pro Arg Ile Ile Lys Gly Arg Ile Ser Ile
            20                  25                  30

Pro His Ser Trp Pro Trp Met Val Gly Ile Phe Gln Val Asp Pro Leu
        35                  40                  45

Leu Phe Ile Cys Gly Gly Thr Ile Ile Asn Lys Val Ser Val Val Thr
    50                  55                  60

Ala Ala His Cys Leu Val Thr Gln Ser Gly Asn Arg Gln Asn Tyr Ser
65                  70                  75                  80

Ile Val Val Arg Val Gly Ala His Asp Ile Asp Asn Ser Gly Ile Asp
                85                  90                  95

Tyr His Val Asp Lys Ile Ile Val His Gln Asp Tyr Lys Tyr Arg Ser
            100                 105                 110

Gln Tyr Tyr Asp Ile Gly Leu Ile Leu Leu Ser Lys Pro Ile Glu Tyr
        115                 120                 125

Asn Tyr Lys Val Arg Pro Val Cys Ile Pro Glu Leu Asn Lys Leu Asn
    130                 135                 140

Val Asn Leu Asn Asn Lys Glu Val Val Ile Gly Trp Gly Val Thr
145                 150                 155                 160

Glu Arg Gly Ser Glu Lys His Asn Val Leu Arg Glu Leu Glu Leu Pro
                165                 170                 175

Val Val Thr Asn Glu Leu Cys Asn Lys Ser Tyr Gln Thr Ile Ser Phe
            180                 185                 190

Ser Gly Leu Asn Arg Gly Ile Thr Asp Asp Met Ile Cys Ala Gly Tyr
        195                 200                 205

Gln Glu Gly Gly Arg Asp Ser Cys Glu Gly Asp Ser Gly Gly Pro Leu
    210                 215                 220

Met Tyr His Asp Pro Thr Thr Gly Arg Val Glu Leu Val Gly Val Val
225                 230                 235                 240

Ser Phe Gly Phe Gly Cys Ala Arg Pro Asn Phe Pro Gly Val Tyr Thr
                245                 250                 255

Arg Leu Ser Ser Tyr Gly Asn Trp Phe Gln Lys Val Thr Phe Gly Tyr
            260                 265                 270

Leu Leu Ala Thr Leu Phe Glu Val Val Pro Val Phe
        275                 280
```

<210> SEQ ID NO 17
<211> LENGTH: 2001
<212> TYPE: DNA
<213> ORGANISM: Limulus polyphemus
<220> FEATURE:
<221> NAME/KEY: sig_peptide
<222> LOCATION: (1)..(57)

<400> SEQUENCE: 17

```
atgtttctgt gttatgttgt tttgtatgtt ggtgtcgcag gaatctactg tagccaggaa      60
```

```
ccaaaatgga agctcgtctg gtcggatgaa tttaccaatg gaatcagttc agattgggaa      120
ttcgaaacgg gcaatggccc caacggttgg ggcaataacg aactgcaata ttatcgtcgt      180
gaaaataccc gagttgaggg cggaaaatta ataattacag ctaaagaaga agattatgag      240
ggtttcaggt acacttctgc caagctgaaa acccagttca ataaaccttg aaagatggt       300
aaaattgaag ccagaatgtc gattccatca tttcgggggg tctgggtggc gttctggatg      360
ttaggagaca tcaccgatac tgatagctgg ccctcttccg gtgaaattga ctttgaggaa      420
cacataaata ccaacaatga agttagagga actattcact ggtctacttc tgatgacgct      480
gatacacttc atggcagagg aaccaatact gactatcaca tttattctgt agagtggaat      540
tcttccgtta ttagatggtt tgttgatgga aatcagtact ttgaggtgaa tattcagaga      600
ggagcaactg gaacaaacgc atttcataat aacgttttcg ttattttaaa catggctatt      660
ggtggaaact ggccaggatt caatgttgct gatgaggctt ccctgctaa catgtatgta       720
gattatgtcc gtgtatatca ggatgccaat acaccttctc ctgttgacgt tactcattta      780
tctggttact attttcttca aaataggcac agtgaactgt atcttgatgt cagtggttcc      840
agtaacgaag atggagcatt tctacaacaa tggccttata gcggtaatgc taaccaacag      900
tttgattttg tacatctcgg aaataaggtt tataaaatta tcaataaaaa tagtggaaaa      960
tctctggatg tttacgagtt agggactgat aatggtgtca gaatccaaca gtggtcgtat     1020
ggaggggggct acaatcagca gtttattgta caagatgttg gagatggtta ttataagata     1080
tttgcacgca gcactggaaa gttagtggaa gtagcagatt gaataaaga cccaggagga      1140
aagatacaac aatggtctga tgatggccaa ttatccggac agtggaaact tattcgaaat     1200
aaagctaatt ctaaattgat tcaggcagaa agttattttg ctagttcaaa agtacaattg     1260
gaagatacct cggatgtagg aggcgggaag aatgtcaagt gtgataatga aggagcctgg     1320
atggcttaca aggatatcaa tttcccaagt tcaggtactt atcaagtaga gtacagagtg     1380
gcaagtgaac gtgcaggagg aatgttgtct ctggatttga atgcaggttc tatagtgctt     1440
ggcatgctga atgttccttc aactggagga ttgcagaagt ggaccaccat ttcccacaca     1500
gtgaatgtaa gttcaggtac gtacaacttg gggatcagtg ttcaacgacc cgggtggaat     1560
atcaactgga ttaatattac aaaagtatcc agtcagttga atctattcc aagtactaat       1620
tctagagtaa ttcaggcaga aagttatttc gatagttcaa aagtacaatt ggaagacacc     1680
tcggatgttg gaggcgggaa gaatgttaag tgtgatacta aaggagcctg gatggcctac     1740
aaggatatca attttcccag ttcaggtagt tatcaaatag agtacagagt ggcaagtgaa      1800
cgtgcaggag gaaagttgtc tctcgatttg aatgcaggtt ctatagtgct tggaatgctg     1860
gatgttcctt caactggggg atggcagaag tggaccacca tttcccatac agtaaaggtg     1920
gattcaggta cttataactt ggggatctac gttcaacaac ccgggtggaa tatcaactgg     1980
attaagatta caaaggttta g                                              2001
```

<210> SEQ ID NO 18
<211> LENGTH: 666
<212> TYPE: PRT
<213> ORGANISM: Limulus polyphemus
<220> FEATURE:
<221> NAME/KEY: SIGNAL
<222> LOCATION: (1)..(19)

<400> SEQUENCE: 18

Met Phe Leu Cys Tyr Val Val Leu Tyr Val Gly Val Ala Gly Ile Tyr
1               5                   10                  15

-continued

```
Cys Ser Gln Glu Pro Lys Trp Lys Leu Val Trp Ser Asp Glu Phe Thr
         20                  25                  30
Asn Gly Ile Ser Ser Asp Trp Glu Phe Glu Thr Gly Asn Gly Pro Asn
         35                  40                  45
Gly Trp Gly Asn Glu Leu Gln Tyr Tyr Arg Arg Glu Asn Thr Arg
 50                  55                  60
Val Glu Gly Gly Lys Leu Ile Ile Thr Ala Lys Glu Glu Asp Tyr Glu
 65                  70                  75                  80
Gly Phe Arg Tyr Thr Ser Ala Lys Leu Lys Thr Gln Phe Asn Lys Pro
                 85                  90                  95
Trp Lys Asp Gly Lys Ile Glu Ala Arg Met Ser Ile Pro Ser Phe Arg
                 100                 105                 110
Gly Val Trp Val Ala Phe Trp Met Leu Gly Asp Ile Thr Asp Thr Asp
             115                 120                 125
Ser Trp Pro Ser Ser Gly Glu Ile Asp Phe Glu Glu His Ile Asn Thr
 130                 135                 140
Asn Asn Glu Val Arg Gly Thr Ile His Trp Ser Thr Ser Asp Asp Ala
145                 150                 155                 160
Asp Thr Leu His Gly Arg Gly Thr Asn Thr Asp Tyr His Ile Tyr Ser
                 165                 170                 175
Val Glu Trp Asn Ser Ser Val Ile Arg Trp Phe Val Asp Gly Asn Gln
             180                 185                 190
Tyr Phe Glu Val Asn Ile Gln Arg Gly Ala Thr Gly Thr Asn Ala Phe
             195                 200                 205
His Asn Asn Val Phe Val Ile Leu Asn Met Ala Ile Gly Gly Asn Trp
    210                 215                 220
Pro Gly Phe Asn Val Ala Asp Glu Ala Phe Pro Ala Asn Met Tyr Val
225                 230                 235                 240
Asp Tyr Val Arg Val Tyr Gln Asp Ala Asn Thr Pro Ser Pro Val Asp
                 245                 250                 255
Val Thr His Leu Ser Gly Tyr Tyr Phe Leu Gln Asn Arg His Ser Glu
             260                 265                 270
Leu Tyr Leu Asp Val Ser Gly Ser Asn Glu Asp Gly Ala Phe Leu
    275                 280                 285
Gln Gln Trp Pro Tyr Ser Gly Asn Ala Asn Gln Phe Asp Phe Val
290                 295                 300
His Leu Gly Asn Lys Val Tyr Lys Ile Ile Asn Lys Asn Ser Gly Lys
305                 310                 315                 320
Ser Leu Asp Val Tyr Glu Leu Gly Thr Asp Asn Gly Val Arg Ile Gln
                 325                 330                 335
Gln Trp Ser Tyr Gly Gly Tyr Asn Gln Gln Phe Ile Val Gln Asp
             340                 345                 350
Val Gly Asp Gly Tyr Tyr Lys Ile Phe Ala Arg Ser Thr Gly Lys Leu
             355                 360                 365
Val Glu Val Ala Asp Leu Asn Lys Asp Pro Gly Gly Lys Ile Gln Gln
             370                 375                 380
Trp Ser Asp Asp Gly Gln Leu Ser Gly Gln Trp Lys Leu Ile Arg Asn
385                 390                 395                 400
Lys Ala Asn Ser Lys Leu Ile Gln Ala Glu Ser Tyr Phe Ala Ser Ser
                 405                 410                 415
Lys Val Gln Leu Glu Asp Thr Ser Asp Val Gly Gly Lys Asn Val
             420                 425                 430
```

Lys Cys Asp Asn Glu Gly Ala Trp Met Ala Tyr Lys Asp Ile Asn Phe
            435                 440                 445

Pro Ser Ser Gly Thr Tyr Gln Val Glu Tyr Arg Val Ala Ser Glu Arg
        450                 455                 460

Ala Gly Gly Met Leu Ser Leu Asp Leu Asn Ala Gly Ser Ile Val Leu
465                 470                 475                 480

Gly Met Leu Asn Val Pro Ser Thr Gly Gly Leu Gln Lys Trp Thr Thr
                485                 490                 495

Ile Ser His Thr Val Asn Val Ser Ser Gly Thr Tyr Asn Leu Gly Ile
            500                 505                 510

Ser Val Gln Arg Pro Gly Trp Asn Ile Asn Trp Ile Asn Ile Thr Lys
        515                 520                 525

Val Ser Ser Gln Leu Lys Ser Ile Pro Ser Thr Asn Ser Arg Val Ile
530                 535                 540

Gln Ala Glu Ser Tyr Phe Asp Ser Ser Lys Val Gln Leu Glu Asp Thr
545                 550                 555                 560

Ser Asp Val Gly Gly Lys Asn Val Lys Cys Asp Thr Lys Gly Ala
                565                 570                 575

Trp Met Ala Tyr Lys Asp Ile Asn Phe Pro Ser Ser Gly Ser Tyr Gln
        580                 585                 590

Ile Glu Tyr Arg Val Ala Ser Glu Arg Ala Gly Gly Lys Leu Ser Leu
            595                 600                 605

Asp Leu Asn Ala Gly Ser Ile Val Leu Gly Met Leu Asp Val Pro Ser
        610                 615                 620

Thr Gly Gly Trp Gln Lys Trp Thr Thr Ile Ser His Thr Val Lys Val
625                 630                 635                 640

Asp Ser Gly Thr Tyr Asn Leu Gly Ile Tyr Val Gln Gln Pro Gly Trp
                645                 650                 655

Asn Ile Asn Trp Ile Lys Ile Thr Lys Val
        660                 665

<210> SEQ ID NO 19
<211> LENGTH: 2013
<212> TYPE: DNA
<213> ORGANISM: Limulus polyphemus
<220> FEATURE:
<221> NAME/KEY: sig_peptide
<222> LOCATION: (1)..(60)

<400> SEQUENCE: 19
atgtttctgt gttatgttgt tttggttgtt ggtgtcacag gaatctgctg tagccaggaa    60
acaaattgga agctcgtctg gtcggatgaa tttaccaatg gaatcagttc agattgggaa   120
ttcgaaacag gcaatggccc caacggttgg ggcaataatg aactgcaata ttatcgtcga   180
gaaaatgccc gagttgaggg cgggaaatta ataattacag ctaaaaaaga agattatgag   240
ggtttcaggt acacttctgc caagctgaaa acccagttca ataaaccttg aaagatggt   300 aaaattgaag ccagaatgtc gattccatca tttcggggg tctgggtggc gttctggatg   360
ttaggagaca tcaccgatac tgatagctgg ccctcttccg gtgaaattga ctttaaggaa   420
catataaata ccaacaatga agttagagga actattcact ggtctacttc tgatggtgct   480
catacgcatc atggcagagg aaccaatact gactatcaca tttattctgt agagtggaat   540
tcttccgtta ttagatggtt tgttgatgga aatcagtact ttgaggtgaa tattcagaga   600
ggagcaactg gaacaaacgc atttcataac aaagttttcg ttattttaaa catggctatt   660
ggtggaaact ggccaggatt caatgttgct gatgaggctt ccctgctaa catgtatgta   720

```
gattatgtcc gtgtatatca ggatgccaat acaccttctc ctgttgacgt tgacgttact    780
gatttatctg gttactattt tcttcaaaat aggcacagtg aactgtatct tgatgtcagt    840
ttctccagta acaaagatgg agcatttcta caacaatggc cttataacgg taatgctaac    900
caacagtttg attttgtaca tctcggaaat aatatatata aaattaccaa taaaaatagt    960
ggaaaatctc tggatgtcta caatgtaggg actgaaaatg gtgtcagaat caacagatg    1020
ccgtatagag ggagctacaa tcagcagttt attgtacaag atgttggaga tggttattat   1080
aagatatttg cacgcaacag cagaaagtta gtggaagtag cagatttcaa taaagaccca   1140
ggaggaaaga tacaacaatg gtctgatgat ggccaaatat ccggacagtg aaacttatt    1200
cgaaataaag ttaattctaa agtaattcag gcagaaagtt attttgctag tttaggagta   1260
caattggaag acacctcgga tgtaggaggc gggaagaatg ttaagtgtga tactgaagga   1320
gcctggatgg cttacaagga tatcaatttc cccagttcag gtagttatca agtagagtac   1380
agagtggcaa gcgaacgtgc aggaggaaag ttgtctctgg atttgaatgc aggttctata   1440
gtgcttggaa tgctgaatgt tccttcaaca ggaggatggc agaagtggac caccatttcc   1500
catacagtaa aggtggattc aggtacttat aacttgggga tctacgttca acgacccagg   1560
tggaatatca actggattaa gattacagaa gcacccggac agtcaaaacc tattcaaaga   1620
agtgataccg attctaaagt aattcaggca gaaagttatt ttgctagttc aaaagtacaa   1680
ttggaagata cctcggatgt tggaggcggg aagaatgtta agtgtgataa tgaaggagcc   1740
tggatggcct acaaggatat taattttccc agttcaggta gttatcaaat agagtacaga   1800
gtggcaagtg aacgtgcagg aggaaagttg tctctcgatt tgaatgcagg ttctatagtg   1860
cttggaatgc tggatgttcc ttcaactggg ggatggcaga agtggaccac catttcccac   1920
acagtgaatg tgagttcggg tacatataac ttggggatct acgttcaacg agctgcgtgg   1980
aatatcaact ggattaagat tacaaaggtt tag                                2013

<210> SEQ ID NO 20
<211> LENGTH: 670
<212> TYPE: PRT
<213> ORGANISM: Limulus polyphemus
<220> FEATURE:
<221> NAME/KEY: SIGNAL
<222> LOCATION: (1)..(20)

<400> SEQUENCE: 20

Met Phe Leu Cys Tyr Val Val Leu Val Val Gly Val Thr Gly Ile Cys
1               5                   10                  15

Cys Ser Gln Glu Thr Asn Trp Lys Leu Val Trp Ser Asp Glu Phe Thr
                20                  25                  30

Asn Gly Ile Ser Ser Asp Trp Glu Phe Glu Thr Gly Asn Gly Pro Asn
            35                  40                  45

Gly Trp Gly Asn Asn Glu Leu Gln Tyr Tyr Arg Arg Glu Asn Ala Arg
        50                  55                  60

Val Glu Gly Gly Lys Leu Ile Ile Thr Ala Lys Lys Glu Asp Tyr Glu
65                  70                  75                  80

Gly Phe Arg Tyr Thr Ser Ala Lys Leu Lys Thr Gln Phe Asn Lys Pro
                85                  90                  95

Trp Lys Asp Gly Lys Ile Glu Ala Arg Met Ser Ile Pro Ser Phe Arg
                100                 105                 110

Gly Val Trp Val Ala Phe Trp Met Leu Gly Asp Ile Thr Asp Thr Asp
            115                 120                 125
```

-continued

Ser Trp Pro Ser Ser Gly Glu Ile Asp Phe Lys Glu His Ile Asn Thr
130                 135                 140

Asn Asn Glu Val Arg Gly Thr Ile His Trp Ser Thr Ser Asp Gly Ala
145                 150                 155                 160

His Thr His His Gly Arg Gly Thr Asn Thr Asp Tyr His Ile Tyr Ser
                    165                 170                 175

Val Glu Trp Asn Ser Ser Val Ile Arg Trp Phe Val Asp Gly Asn Gln
                180                 185                 190

Tyr Phe Glu Val Asn Ile Gln Arg Gly Ala Thr Gly Thr Asn Ala Phe
        195                 200                 205

His Asn Lys Val Phe Val Ile Leu Asn Met Ala Ile Gly Gly Asn Trp
210                 215                 220

Pro Gly Phe Asn Val Ala Asp Glu Ala Phe Pro Ala Asn Met Tyr Val
225                 230                 235                 240

Asp Tyr Val Arg Val Tyr Gln Asp Ala Asn Thr Pro Ser Pro Val Asp
            245                 250                 255

Val Asp Val Thr Asp Leu Ser Gly Tyr Tyr Phe Leu Gln Asn Arg His
                260                 265                 270

Ser Glu Leu Tyr Leu Asp Val Ser Phe Ser Ser Asn Lys Asp Gly Ala
            275                 280                 285

Phe Leu Gln Gln Trp Pro Tyr Asn Gly Asn Ala Asn Gln Gln Phe Asp
290                 295                 300

Phe Val His Leu Gly Asn Asn Ile Tyr Lys Ile Thr Asn Lys Asn Ser
305                 310                 315                 320

Gly Lys Ser Leu Asp Val Tyr Asn Val Gly Thr Glu Asn Gly Val Arg
                325                 330                 335

Ile Gln Gln Met Pro Tyr Arg Gly Ser Tyr Asn Gln Gln Phe Ile Val
            340                 345                 350

Gln Asp Val Gly Asp Gly Tyr Tyr Lys Ile Phe Ala Arg Asn Ser Arg
                355                 360                 365

Lys Leu Val Glu Val Ala Asp Phe Asn Lys Asp Pro Gly Gly Lys Ile
370                 375                 380

Gln Gln Trp Ser Asp Asp Gly Gln Ile Ser Gly Gln Trp Lys Leu Ile
385                 390                 395                 400

Arg Asn Lys Val Asn Ser Lys Val Ile Gln Ala Glu Ser Tyr Phe Ala
            405                 410                 415

Ser Leu Gly Val Gln Leu Glu Asp Thr Ser Asp Val Gly Gly Gly Lys
            420                 425                 430

Asn Val Lys Cys Asp Thr Glu Gly Ala Trp Met Ala Tyr Lys Asp Ile
        435                 440                 445

Asn Phe Pro Ser Ser Gly Ser Tyr Gln Val Glu Tyr Arg Val Ala Ser
450                 455                 460

Glu Arg Ala Gly Gly Lys Leu Ser Leu Asp Leu Asn Ala Gly Ser Ile
465                 470                 475                 480

Val Leu Gly Met Leu Asn Val Pro Ser Thr Gly Gly Trp Gln Lys Trp
                485                 490                 495

Thr Thr Ile Ser His Thr Val Lys Val Asp Ser Gly Thr Tyr Asn Leu
                500                 505                 510

Gly Ile Tyr Val Gln Arg Pro Arg Trp Asn Ile Asn Trp Ile Lys Ile
        515                 520                 525

Thr Glu Ala Pro Gly Gln Ser Lys Pro Ile Gln Arg Ser Asp Thr Asp
530                 535                 540

Ser Lys Val Ile Gln Ala Glu Ser Tyr Phe Ala Ser Ser Lys Val Gln
545                 550                 555                 560

Leu Glu Asp Thr Ser Asp Val Gly Gly Gly Lys Asn Val Lys Cys Asp
                565                 570                 575

Asn Glu Gly Ala Trp Met Ala Tyr Lys Asp Ile Asn Phe Pro Ser Ser
            580                 585                 590

Gly Ser Tyr Gln Ile Glu Tyr Arg Val Ala Ser Glu Arg Ala Gly Gly
        595                 600                 605

Lys Leu Ser Leu Asp Leu Asn Ala Gly Ser Ile Val Leu Gly Met Leu
    610                 615                 620

Asp Val Pro Ser Thr Gly Gly Trp Gln Lys Trp Thr Thr Ile Ser His
625                 630                 635                 640

Thr Val Asn Val Ser Ser Gly Thr Tyr Asn Leu Gly Ile Tyr Val Gln
                645                 650                 655

Arg Ala Ala Trp Asn Ile Asn Trp Ile Lys Ile Thr Lys Val
            660                 665                 670

<210> SEQ ID NO 21
<211> LENGTH: 927
<212> TYPE: DNA
<213> ORGANISM: Limulus polyphemus
<220> FEATURE:
<221> NAME/KEY: sig_peptide
<222> LOCATION: (1)..(72)

<400> SEQUENCE: 21
atgaaaacca ctctatggac ttttttcgca ctggctatgg ctctcttttc tataaatgtg        60
acagcttcag aaatgtctgt aacatcaagg gttcgacgtg aaatcaatga agaacattgc       120
gggatcagac caacagctcc aaggattatt aagggacgaa tatcaatacc tcattcttgg       180
ccgtggatgg tcggaatttt tcaagtagat cctctccttt tcatttgtgg tggaactatt       240
attaataaag tctccgttgt cactgccgcc cattgtcttg tgacacagtc tggaaacaga       300
cagaattctt ccattgtcgt aagagttgga gctcatgaca tagacaattc gggcatcgac       360
tatcatgtag ataagattat tgttcaccag gactacaaat accgttcaca atactacgat       420
attggtttga ttttactctc gaaacgaatc gaatataact acaaagtacg gcctgtctgt       480
attcctgagt tgaacaagtt gaacgtgaac ttaaacaata aggaggtcgt tgttattggt       540
tggggtgtta ctgaaagagg tagtgagaaa cataatgttc tacgtgaact ggagttgccc       600
gtagttacaa cgaactgtg caacaagtct tatcaaacca tatcattctc cggcctcaac       660
cgaggaatca ctgatgatat gatttgtgct ggataccagg aaggaggaag agattcttgt       720
gagggcgact ctggtggtcc tctgatgtat catgatccaa caacaggaag agtcgaatta       780
gtgggagttg tatcatttgg gttcggatgt gctcgtccca acttcccggg agtttacacg       840
cgcctctcga gctacggtaa ctggttccag aaagtcacct ttggatattt actcgctact       900
ttattcgaag ttgtgccagt attttaa                                          927

<210> SEQ ID NO 22
<211> LENGTH: 308
<212> TYPE: PRT
<213> ORGANISM: Limulus polyphemus
<220> FEATURE:
<221> NAME/KEY: SIGNAL
<222> LOCATION: (1)..(24)

<400> SEQUENCE: 22

Met Lys Thr Thr Leu Trp Thr Phe Phe Ala Leu Ala Met Ala Leu Phe

```
  1               5                   10                  15
Ser Ile Asn Val Thr Ala Ser Glu Met Ser Val Thr Ser Arg Val Arg
                 20                  25                  30
Arg Glu Ile Asn Glu Glu His Cys Gly Ile Arg Pro Thr Ala Pro Arg
                 35                  40                  45
Ile Ile Lys Gly Arg Ile Ser Ile Pro His Ser Trp Pro Trp Met Val
             50                  55                  60
Gly Ile Phe Gln Val Asp Pro Leu Leu Phe Ile Cys Gly Gly Thr Ile
 65                  70                  75                  80
Ile Asn Lys Val Ser Val Val Thr Ala Ala His Cys Leu Val Thr Gln
                 85                  90                  95
Ser Gly Asn Arg Gln Asn Ser Ser Ile Val Val Arg Val Gly Ala His
                100                 105                 110
Asp Ile Asp Asn Ser Gly Ile Asp Tyr His Val Asp Lys Ile Ile Val
                115                 120                 125
His Gln Asp Tyr Lys Tyr Arg Ser Gln Tyr Tyr Asp Ile Gly Leu Ile
                130                 135                 140
Leu Ser Lys Arg Ile Glu Tyr Asn Tyr Lys Val Arg Pro Val Cys
145                 150                 155                 160
Ile Pro Glu Leu Asn Lys Leu Asn Val Asn Leu Asn Asn Lys Glu Val
                165                 170                 175
Val Val Ile Gly Trp Gly Val Thr Glu Arg Gly Ser Glu Lys His Asn
                180                 185                 190
Val Leu Arg Glu Leu Glu Leu Pro Val Val Thr Asn Glu Leu Cys Asn
                195                 200                 205
Lys Ser Tyr Gln Thr Ile Ser Phe Ser Gly Leu Asn Arg Gly Ile Thr
                210                 215                 220
Asp Asp Met Ile Cys Ala Gly Tyr Gln Glu Gly Arg Asp Ser Cys
225                 230                 235                 240
Glu Gly Asp Ser Gly Gly Pro Leu Met Tyr His Asp Pro Thr Thr Gly
                245                 250                 255
Arg Val Glu Leu Val Gly Val Val Ser Phe Gly Phe Gly Cys Ala Arg
                260                 265                 270
Pro Asn Phe Pro Gly Val Tyr Thr Arg Leu Ser Ser Tyr Gly Asn Trp
                275                 280                 285
Phe Gln Lys Val Thr Phe Gly Tyr Leu Leu Ala Thr Leu Phe Glu Val
                290                 295                 300
Val Pro Val Phe
305

<210> SEQ ID NO 23
<211> LENGTH: 927
<212> TYPE: DNA
<213> ORGANISM: Limulus polyphemus
<220> FEATURE:
<221> NAME/KEY: sig_peptide
<222> LOCATION: (1)..(72)

<400> SEQUENCE: 23
atgaaaacca ctctatggac ttttttcgca ctggctatgg ctctcttttc tataaatgtg      60
acagcttcag aaatgtctgt aacatcaagg gttcgacgtg aaatcaatga agaacattgc     120
gggatcagac caacagctcc aaggattatt aagggacgaa tatcaatacc tcattcttgg     180
ccgtggatgg tcggaatttt tcaagtagat cctctccttt tcatttgtgg tggaactatt     240
attaataaag tctccgttgt cactgccgcc cattgtcttg tgacacagtc tggaaacaga     300
```

-continued

```
cagaattctt ccattgtcgt aagagttgga gctcatgaca tagacaattc gggcatcgac    360
tatcatgtag ataagattat tgttcaccag gactacaaat accgttcaca atactacgat    420
attggtttga ttttactctc gaaaccaatc gaatacaact acaaagtacg gcctgtctgt    480
attcctgagt tgaacaagtt gaacgtgaac ttaaacaata aggaggtcgt tgttattggt    540
tggggtgtta ctgaaagagg tagtgagaaa tataatgttc tacgtgaact ggagttgccc    600
gtagttacaa acgaactgtg caacaagtct tatcaaacca tatcattctc cggcctcaac    660
cgaggaatca ctgatgatat gatttgtgct ggataccagg aaggaggaag agattcttgt    720
gagggcgact ctggtggtcc tctgatgtat catgatccaa caacaggaag agtcgaatta    780
gtgggagttg tatcatttgg gttcggatgt gctcgtccca acttcccggg agtttacacg    840
cgcctctcga gctacggtaa ctggttccag aaagtcacct ttggatattt actcgctact    900
ttattcgaag ttgtgccagt attttaa                                        927
```

<210> SEQ ID NO 24
<211> LENGTH: 308
<212> TYPE: PRT
<213> ORGANISM: Limulus polyphemus
<220> FEATURE:
<221> NAME/KEY: SIGNAL
<222> LOCATION: (1)..(24)

<400> SEQUENCE: 24

```
Met Lys Thr Thr Leu Trp Thr Phe Phe Ala Leu Ala Met Ala Leu Phe
1               5                   10                  15

Ser Ile Asn Val Thr Ala Ser Glu Met Ser Val Thr Ser Arg Val Arg
            20                  25                  30

Arg Glu Ile Asn Glu Glu His Cys Gly Ile Arg Pro Thr Ala Pro Arg
        35                  40                  45

Ile Ile Lys Gly Arg Ile Ser Ile Pro His Ser Trp Pro Trp Met Val
50                  55                  60

Gly Ile Phe Gln Val Asp Pro Leu Leu Phe Ile Cys Gly Gly Thr Ile
65                  70                  75                  80

Ile Asn Lys Val Ser Val Val Thr Ala Ala His Cys Leu Val Thr Gln
                85                  90                  95

Ser Gly Asn Arg Gln Asn Ser Ser Ile Val Val Arg Val Gly Ala His
            100                 105                 110

Asp Ile Asp Asn Ser Gly Ile Asp Tyr His Val Asp Lys Ile Ile Val
        115                 120                 125

His Gln Asp Tyr Lys Tyr Arg Ser Gln Tyr Tyr Asp Ile Gly Leu Ile
    130                 135                 140

Leu Leu Ser Lys Pro Ile Glu Tyr Asn Tyr Lys Val Arg Pro Val Cys
145                 150                 155                 160

Ile Pro Glu Leu Asn Lys Leu Asn Val Asn Leu Asn Asn Lys Glu Val
                165                 170                 175

Val Val Ile Gly Trp Gly Val Thr Glu Arg Gly Ser Glu Lys Tyr Asn
            180                 185                 190

Val Leu Arg Glu Leu Glu Leu Pro Val Val Thr Asn Glu Leu Cys Asn
        195                 200                 205

Lys Ser Tyr Gln Thr Ile Ser Phe Ser Gly Leu Asn Arg Gly Ile Thr
    210                 215                 220

Asp Asp Met Ile Cys Ala Gly Tyr Gln Glu Gly Gly Arg Asp Ser Cys
225                 230                 235                 240
```

Glu Gly Asp Ser Gly Gly Pro Leu Met Tyr His Asp Pro Thr Thr Gly
                245                 250                 255

Arg Val Glu Leu Val Gly Val Val Ser Phe Gly Phe Gly Cys Ala Arg
        260                 265                 270

Pro Asn Phe Pro Gly Val Tyr Thr Arg Leu Ser Ser Tyr Gly Asn Trp
            275                 280                 285

Phe Gln Lys Val Thr Phe Gly Tyr Leu Leu Ala Thr Leu Phe Glu Val
        290                 295                 300

Val Pro Val Phe
305

<210> SEQ ID NO 25
<211> LENGTH: 927
<212> TYPE: DNA
<213> ORGANISM: Limulus polyphemus
<220> FEATURE:
<221> NAME/KEY: sig_peptide
<222> LOCATION: (1)..(72)

<400> SEQUENCE: 25
atgaaaacca ctctatggac ttttttcgca ctggctatgg ctctcttttc tataaatgtg    60
acagcttcag aaatgtctgt aacatcaagg gttcgacgtg aaatcaatga agaacattgc   120
gggatcagac caacagctcc aaggattatt aagggacgaa tatcaatacc tcattcttgg   180
ccgtggatgg tcggaatttt tcaagtagat cctctccttt tcatttgtgg tggaactatt   240
attaataaag tctccgttgt cactgccgcc cattgtcttg tgacacagtc tggaaacaga   300
cagaattatt ccattgtcgt aagagttgga gctcatgaca tagacaattc gggtatcgac   360
tatcatgtag ataagattat tgttcaccag gactacaaat accgttcaca atactacgat   420
attggtttga ttttactctc gaaaccaatc gaatacaact acaaagtacg gcctgtctgt   480
attcctgagt tgaacaagtt gaacgtgaac ttaaacaata aggaggtcgt tgttattggt   540
tggggtgtta ctgaaagagg tagtgagaaa cataatgttc tacgtgaact ggagttgccc   600
gtagttacaa acgaactgtg caacaagtct tatcaaacca tatcattctc cggcctcaac   660
cgaggaatca ctgatgatat gatttgtgct ggataccagg aaggaggaag agattcttgt   720
gagggcgact ctggtggtcc tctgatgtat catgatccaa caacaggagg agtcgaatta   780
gtgggagttg tatcatttgg gttcggatgt gctcgtccca acttcccggg agtttacacg   840
cgcctctcga gctacggtaa ctggttccag aaagtcacct ttggatattt actcgctact   900
ttattcgaag ttgtgccagt attttaa                                       927

<210> SEQ ID NO 26
<211> LENGTH: 308
<212> TYPE: PRT
<213> ORGANISM: Limulus polyphemus
<220> FEATURE:
<221> NAME/KEY: SIGNAL
<222> LOCATION: (1)..(24)

<400> SEQUENCE: 26

Met Lys Thr Thr Leu Trp Thr Phe Phe Ala Leu Ala Met Ala Leu Phe
1               5                   10                  15

Ser Ile Asn Val Thr Ala Ser Glu Met Ser Val Thr Ser Arg Val Arg
                20                  25                  30

Arg Glu Ile Asn Glu Glu His Cys Gly Ile Arg Pro Thr Ala Pro Arg
            35                  40                  45

Ile Ile Lys Gly Arg Ile Ser Ile Pro His Ser Trp Pro Trp Met Val

```
            50                  55                  60
Gly Ile Phe Gln Val Asp Pro Leu Phe Ile Cys Gly Thr Ile
 65                  70                  75                  80

Ile Asn Lys Val Ser Val Thr Ala Ala His Cys Leu Val Thr Gln
                 85                  90                  95

Ser Gly Asn Arg Gln Asn Tyr Ser Ile Val Val Arg Val Gly Ala His
                100                 105                 110

Asp Ile Asp Asn Ser Gly Ile Asp Tyr His Val Asp Lys Ile Ile Val
                115                 120                 125

His Gln Asp Tyr Lys Tyr Arg Ser Gln Tyr Tyr Asp Ile Gly Leu Ile
            130                 135                 140

Leu Leu Ser Lys Pro Ile Glu Tyr Asn Tyr Lys Val Arg Pro Val Cys
145                 150                 155                 160

Ile Pro Glu Leu Asn Lys Leu Asn Val Asn Leu Asn Asn Lys Glu Val
                165                 170                 175

Val Val Ile Gly Trp Gly Val Thr Glu Arg Gly Ser Glu Lys His Asn
                180                 185                 190

Val Leu Arg Glu Leu Glu Leu Pro Val Val Thr Asn Glu Leu Cys Asn
            195                 200                 205

Lys Ser Tyr Gln Thr Ile Ser Phe Ser Gly Leu Asn Arg Gly Ile Thr
            210                 215                 220

Asp Asp Met Ile Cys Ala Gly Tyr Gln Glu Gly Gly Arg Asp Ser Cys
225                 230                 235                 240

Glu Gly Asp Ser Gly Gly Pro Leu Met Tyr His Asp Pro Thr Thr Gly
                    245                 250                 255

Gly Val Glu Leu Val Gly Val Val Ser Phe Gly Phe Gly Cys Ala Arg
                260                 265                 270

Pro Asn Phe Pro Gly Val Tyr Thr Arg Leu Ser Ser Tyr Gly Asn Trp
            275                 280                 285

Phe Gln Lys Val Thr Phe Gly Tyr Leu Leu Ala Thr Leu Phe Glu Val
            290                 295                 300

Val Pro Val Phe
305

<210> SEQ ID NO 27
<211> LENGTH: 927
<212> TYPE: DNA
<213> ORGANISM: Limulus polyphemus
<220> FEATURE:
<221> NAME/KEY: sig_peptide
<222> LOCATION: (1)..(72)

<400> SEQUENCE: 27
atgaaaacca ctctatggac ttttttcgca ctggccatgg ctctcttttc tataaatgtg     60
acagcttcag aaatgtctgt aacatcaagg gttcgacgtg aaatcaatga agaacattgt    120
gggatcagac caacagctcc aaggattatt aaggacgaa tatcaatacc tcattcttgg    180
ccgtggatgg tcggaatttt tcaagtagat cctctccttt tcatttgtgg tggaactatt    240
attaataaag tctccgttgt cactgccgcc cattgtcttg tgacacagtc tggaaacaga    300
cagaattatt ccattgtcgt aagagttgga gctcatgaca tagacaattc gggtatcgac    360
tatcatgtag ataagattat tgttcaccag gactacaaat accgttcaca atactacgat    420
attggtttga tttactctc gaaccaatc gaatacaact acaaagtacg gcctgtctgt    480
attcctgagt tgaacaagtt gaacgtgaac ttaaacaata aggaggtcgt tgttattggt    540
```

```
tggggtgtta ctgaaagagg tagtgagaaa tataatgttc tacgtgaact ggagttgccc    600
gtagttacaa acgaactgtg caacaagtct tatcaaacca tatcattctc cggcctcaac    660
cgaggaatca ctgatgatat gatttgtgct ggataccagg aaggaggaag agattcttgt    720
gagggcgact ctggtggtcc tctgatgtat catgatccaa caacaggaag agtcgaatta    780
gtgggagttg tatcatttgg gttcggatgt gctcgtccca acttcccggg agtttacacg    840
cgcctctcga gctacggtaa ctggttccag aaagtcacct ttggatattt actcgctact    900
ttattcgaag ttgtgccagt atttttaa                                       927
```

<210> SEQ ID NO 28
<211> LENGTH: 308
<212> TYPE: PRT
<213> ORGANISM: Limulus polyphemus
<220> FEATURE:
<221> NAME/KEY: SIGNAL
<222> LOCATION: (1)..(24)

<400> SEQUENCE: 28

```
Met Lys Thr Thr Leu Trp Thr Phe Phe Ala Leu Ala Met Ala Leu Phe
 1               5                  10                  15

Ser Ile Asn Val Thr Ala Ser Glu Met Ser Val Thr Ser Arg Val Arg
             20                  25                  30

Arg Glu Ile Asn Glu Glu His Cys Gly Ile Arg Pro Thr Ala Pro Arg
         35                  40                  45

Ile Ile Lys Gly Arg Ile Ser Ile Pro His Ser Trp Pro Trp Met Val
     50                  55                  60

Gly Ile Phe Gln Val Asp Pro Leu Leu Phe Ile Cys Gly Gly Thr Ile
 65                  70                  75                  80

Ile Asn Lys Val Ser Val Val Thr Ala Ala His Cys Leu Val Thr Gln
                 85                  90                  95

Ser Gly Asn Arg Gln Asn Tyr Ser Ile Val Val Arg Val Gly Ala His
            100                 105                 110

Asp Ile Asp Asn Ser Gly Ile Asp Tyr His Val Asp Lys Ile Ile Val
        115                 120                 125

His Gln Asp Tyr Lys Tyr Arg Ser Gln Tyr Tyr Asp Ile Gly Leu Ile
    130                 135                 140

Leu Leu Ser Lys Pro Ile Glu Tyr Asn Tyr Lys Val Arg Pro Val Cys
145                 150                 155                 160

Ile Pro Glu Leu Asn Lys Leu Asn Val Asn Leu Asn Asn Lys Glu Val
                165                 170                 175

Val Val Ile Gly Trp Gly Val Thr Glu Arg Gly Ser Glu Lys Tyr Asn
            180                 185                 190

Val Leu Arg Glu Leu Glu Leu Pro Val Val Thr Asn Glu Leu Cys Asn
        195                 200                 205

Lys Ser Tyr Gln Thr Ile Ser Phe Ser Gly Leu Asn Arg Gly Ile Thr
    210                 215                 220

Asp Asp Met Ile Cys Ala Gly Tyr Gln Glu Gly Gly Arg Asp Ser Cys
225                 230                 235                 240

Glu Gly Asp Ser Gly Gly Pro Leu Met Tyr His Asp Pro Thr Thr Gly
                245                 250                 255

Arg Val Glu Leu Val Gly Val Val Ser Phe Gly Phe Gly Cys Ala Arg
            260                 265                 270

Pro Asn Phe Pro Gly Val Tyr Thr Arg Leu Ser Ser Tyr Gly Asn Trp
        275                 280                 285
```

Phe Gln Lys Val Thr Phe Gly Tyr Leu Leu Ala Thr Leu Phe Glu Val
290                 295                 300

Val Pro Val Phe
305

<210> SEQ ID NO 29
<211> LENGTH: 927
<212> TYPE: DNA
<213> ORGANISM: Limulus polyphemus
<220> FEATURE:
<221> NAME/KEY: sig_peptide
<222> LOCATION: (1)..(72)

<400> SEQUENCE: 29

| | |
|---|---|
| atgaaaacca ctctatggac ttttttcgca ctggctatgg ctctcttttc tataaatgtg | 60 |
| acagcttcag aaatgtctgt aacatcaagg gttcgacgtg aaatcaatga agaacattgt | 120 |
| gggatcagac caacagctcc aaggattatt aagggacgaa tatcaatacc tcattcttgg | 180 |
| ccgtggatgg tcggaatttt tcaagtagat cctctccttt tcatttgtgg tggaactatt | 240 |
| attaataaag tctccgttgt cactgccgcc cattgtcttg tgacacagtc tggaaacaga | 300 |
| cagaattctt ccattgtcgt aagagttgga gctcatgaca tagacaattc gggcatcgac | 360 |
| tatcatgtag ataagattat tgttcaccag gactacaaat accgttcaca atactacgat | 420 |
| attggtttga ttttactctc gaaacgaatc gaatataact acaaagtacg gcctgtctgt | 480 |
| attcctgagt tgaacaagtt gaacgtgaac ttaaacaata aggaggtcgt tgttattggt | 540 |
| tggggtgtta ctgaaagagg tagtgagaaa tataatgttc tacgtgaact ggagttgccc | 600 |
| gtagttacaa acgaactgtg caacaagtct tatcaaacca tcattctc cggcctcaac | 660 |
| cgaggaatca ctgatgatat gatttgtgct ggataccagg aaggaggaag agattcttgt | 720 |
| gagggcgact ctggtggtcc tctgatgtat catgatccaa caacaggaag agtcgaatta | 780 |
| gtgggagttg tatcatttgg gttcggatgt gctcgtccca acttcccggg agtttacacg | 840 |
| cgcctctcga gctacggtaa ctggttccag aaagtcacct ttggatattt actcgctact | 900 |
| ttattcgaag ttgtgccagt attttaa | 927 |

<210> SEQ ID NO 30
<211> LENGTH: 308
<212> TYPE: PRT
<213> ORGANISM: Limulus polyphemus
<220> FEATURE:
<221> NAME/KEY: SIGNAL
<222> LOCATION: (1)..(24)

<400> SEQUENCE: 30

Met Lys Thr Thr Leu Trp Thr Phe Phe Ala Leu Ala Met Ala Leu Phe
1               5                   10                  15

Ser Ile Asn Val Thr Ala Ser Glu Met Ser Val Thr Ser Arg Val Arg
                20                  25                  30

Arg Glu Ile Asn Glu Glu His Cys Gly Ile Arg Pro Thr Ala Pro Arg
            35                  40                  45

Ile Ile Lys Gly Arg Ile Ser Ile Pro His Ser Trp Pro Trp Met Val
        50                  55                  60

Gly Ile Phe Gln Val Asp Pro Leu Leu Phe Ile Cys Gly Gly Thr Ile
65                  70                  75                  80

Ile Asn Lys Val Ser Val Val Thr Ala Ala His Cys Leu Val Thr Gln
                85                  90                  95

Ser Gly Asn Arg Gln Asn Ser Ser Ile Val Val Arg Val Gly Ala His

```
              100                 105                 110
Asp Ile Asp Asn Ser Gly Ile Asp Tyr His Val Asp Lys Ile Ile Val
        115                 120                 125

His Gln Asp Tyr Lys Tyr Arg Ser Gln Tyr Tyr Asp Ile Gly Leu Ile
        130                 135                 140

Leu Leu Ser Lys Arg Ile Glu Tyr Asn Tyr Lys Val Arg Pro Val Cys
145                 150                 155                 160

Ile Pro Glu Leu Asn Lys Leu Asn Val Asn Leu Asn Asn Lys Glu Val
                165                 170                 175

Val Val Ile Gly Trp Gly Val Thr Glu Arg Gly Ser Glu Lys Tyr Asn
            180                 185                 190

Val Leu Arg Glu Leu Glu Leu Pro Val Val Thr Asn Glu Leu Cys Asn
        195                 200                 205

Lys Ser Tyr Gln Thr Ile Ser Phe Ser Gly Leu Asn Arg Gly Ile Thr
    210                 215                 220

Asp Asp Met Ile Cys Ala Gly Tyr Gln Glu Gly Gly Arg Asp Ser Cys
225                 230                 235                 240

Glu Gly Asp Ser Gly Gly Pro Leu Met Tyr His Asp Pro Thr Thr Gly
                245                 250                 255

Arg Val Glu Leu Val Gly Val Val Ser Phe Gly Phe Gly Cys Ala Arg
            260                 265                 270

Pro Asn Phe Pro Gly Val Tyr Thr Arg Leu Ser Ser Tyr Gly Asn Trp
        275                 280                 285

Phe Gln Lys Val Thr Phe Gly Tyr Leu Leu Ala Thr Leu Phe Glu Val
    290                 295                 300

Val Pro Val Phe
305

<210> SEQ ID NO 31
<211> LENGTH: 927
<212> TYPE: DNA
<213> ORGANISM: Limulus polyphemus
<220> FEATURE:
<221> NAME/KEY: sig_peptide
<222> LOCATION: (1)..(72)

<400> SEQUENCE: 31
atgaaaacca ctctatggac ttttttcgca ctggctatgg ctctcttttc tataaatgtg      60
acagcttcag aaatgtctgt aacatcaagg gttcgacgtg aaatcaatga agaacattgt     120
gggatcagac caacagctcc aaggattatt aagggacgaa tatcaatacc tcattcttgg     180
ccgtggatgg tcggaatttt tcaagtagat cctctccttt tcatttgtgg tggaactatt     240
attaataaag tctccgttgt cactgccgcc cattgtcttg tgacacagtc tggaaacaga     300
cagaattatt ccattgtcgt aagagttgga gctcatgaca tagacaattc gggtatcgac     360
tatcatgtag ataagattat tgttcaccag gactacaaat accgttcaca atactacgat     420
attggtttga ttttactctc gaaaccaatc gaatacaact acaaagtacg gcctgtctgt     480
attcctgagt tgaacaagtt gaacgtgaac ttaaacaata aggaggtcgt tgttattggt     540
tggggtgtta ctgaaagagg tagtgagaaa cataatgttc tacgtgaact ggagttgccc     600
gtagttacaa acgaactgtg caacaagtct tatcaaacca tatcattctc cggcctcaac     660
cgaggaatca ctgatgatat gatttgtgct ggataccagg aaggaggaag agattcttgt     720
gagggcgact ctggtggtcc tctgatgtat catgatccaa caacaggaag agtcgaatta     780
gtgggagttg tatcatttgg gttcggatgt gctcgtccca acttcccggg agtttacacg     840
```

```
cgcctctcga gctacggtaa ctggttccag aaagtcacct ttggatattt actcgctact    900
ttattcgaag ttgtgccagt attttaa                                        927
```

<210> SEQ ID NO 32
<211> LENGTH: 308
<212> TYPE: PRT
<213> ORGANISM: Limulus polyphemus
<220> FEATURE:
<221> NAME/KEY: SIGNAL
<222> LOCATION: (1)..(24)

<400> SEQUENCE: 32

```
Met Lys Thr Thr Leu Trp Thr Phe Phe Ala Leu Ala Met Ala Leu Phe
1               5                   10                  15

Ser Ile Asn Val Thr Ala Ser Glu Met Ser Val Thr Ser Arg Val Arg
            20                  25                  30

Arg Glu Ile Asn Glu Glu His Cys Gly Ile Arg Pro Thr Ala Pro Arg
        35                  40                  45

Ile Ile Lys Gly Arg Ile Ser Ile Pro His Ser Trp Pro Trp Met Val
    50                  55                  60

Gly Ile Phe Gln Val Asp Pro Leu Leu Phe Ile Cys Gly Gly Thr Ile
65                  70                  75                  80

Ile Asn Lys Val Ser Val Val Thr Ala Ala His Cys Leu Val Thr Gln
                85                  90                  95

Ser Gly Asn Arg Gln Asn Tyr Ser Ile Val Val Arg Val Gly Ala His
            100                 105                 110

Asp Ile Asp Asn Ser Gly Ile Asp Tyr His Val Asp Lys Ile Ile Val
        115                 120                 125

His Gln Asp Tyr Lys Tyr Arg Ser Gln Tyr Tyr Asp Ile Gly Leu Ile
    130                 135                 140

Leu Leu Ser Lys Pro Ile Glu Tyr Asn Tyr Lys Val Arg Pro Val Cys
145                 150                 155                 160

Ile Pro Glu Leu Asn Lys Leu Asn Val Asn Leu Asn Asn Lys Glu Val
                165                 170                 175

Val Val Ile Gly Trp Gly Val Thr Glu Arg Gly Ser Glu Lys His Asn
            180                 185                 190

Val Leu Arg Glu Leu Glu Leu Pro Val Val Thr Asn Glu Leu Cys Asn
        195                 200                 205

Lys Ser Tyr Gln Thr Ile Ser Phe Ser Gly Leu Asn Arg Gly Ile Thr
    210                 215                 220

Asp Asp Met Ile Cys Ala Gly Tyr Gln Glu Gly Arg Asp Ser Cys
225                 230                 235                 240

Glu Gly Asp Ser Gly Gly Pro Leu Met Tyr His Asp Pro Thr Thr Gly
                245                 250                 255

Arg Val Glu Leu Val Gly Val Val Ser Phe Gly Phe Gly Cys Ala Arg
            260                 265                 270

Pro Asn Phe Pro Gly Val Tyr Thr Arg Leu Ser Ser Tyr Gly Asn Trp
        275                 280                 285

Phe Gln Lys Val Thr Phe Gly Tyr Leu Leu Ala Thr Leu Phe Glu Val
    290                 295                 300

Val Pro Val Phe
305
```

<210> SEQ ID NO 33
<211> LENGTH: 1944

<212> TYPE: DNA
<213> ORGANISM: Artificial Sequence
<220> FEATURE:
<223> OTHER INFORMATION: Synthetic polypeptide

<400> SEQUENCE: 33

| | | | | | |
|---|---|---|---|---|---|
| gagcccaagt | ggaagctggt | gtggtccgac | gagttcacca | acggcatctc | ctccgactgg | 60 |
| gagttcgaga | ccggtaacgg | tcccaacggc | tggggcaaca | acgagctgca | gtactaccgc | 120 |
| cgcgagaaca | cccgcgtgga | gggcggcaag | ctgatcatca | ccgctaagga | ggaggactac | 180 |
| gagggcttcc | gctacacctc | cgctaagctg | aagacccagt | tcaacaagcc | ctggaaggac | 240 |
| ggcaagatcg | aggctcgcat | gtccatcccc | tccttccgcg | tgtgtgggt | ggctttctgg | 300 |
| atgctgggcg | acatcaccga | caccgactcc | tggccttcct | ccggtgagat | cgacttcgag | 360 |
| gagcacatca | acaccaacaa | cgaggtgcgc | ggcaccatcc | actggtccac | ctccgacgac | 420 |
| gctgacaccc | tgcacggccg | cggcaccaac | accgactacc | acatctactc | cgtggagtgg | 480 |
| aactcctccg | tgatccgctg | gttcgtggac | ggcaaccagt | acttcgaggt | gaacatccag | 540 |
| cgcggcgcta | ccggtaccaa | cgctttccac | aacaacgtgt | tcgtgatcct | gaacatggct | 600 |
| atcggcggta | actggcccgg | cttcaacgtg | gctgacgagg | cttttcccgc | taacatgtac | 660 |
| gtggactacg | tgcgcgtgta | ccaggacgct | aacacccct | ccccgtgga | cgtcacccac | 720 |
| ctcagcggct | actacttcct | ccagaaccgc | acagcgagc | tgtacctcga | cgtgtccggc | 780 |
| agctccaacg | aggacggtgc | tttcctgcag | cagtggccct | actccggtaa | tgccaatcag | 840 |
| cagttcgact | tcgtgcacct | gggcaacaag | gtgtacaaga | tcatcaacaa | gaactccggt | 900 |
| aagagcctgg | acgtgtacga | actgggcacc | gacaacggcg | tgcgcatcca | gcaatggtcc | 960 |
| tacggtggcg | gctacaacca | acagttcatt | gtccaggacg | tgggtgacgg | ctactacaag | 1020 |
| atcttcgctc | gcagcactgg | caagctggtg | gaggtggccg | acctcaacaa | ggaccccggt | 1080 |
| ggcaagatcc | agcagtggag | cgacgacggc | caactctccg | gccagtggaa | actgatccgc | 1140 |
| aacaaggcca | acagcaagct | gatccaggcc | gagagctact | tcgcctcctc | caaagtgcag | 1200 |
| ctggaggaca | cttccgacgt | gggcggtggc | aagaatgtga | agtgcgacaa | cgagggcgcc | 1260 |
| tggatggcct | acaaggacat | caacttcccc | tccagcggta | cctaccaggt | ggagtaccgc | 1320 |
| gtggctagcg | agcgcgctgg | tggtatgctg | tccctggacc | tgaacgctgg | ctccatcgtg | 1380 |
| ctgggtatgc | tcaacgtgcc | ctccaccggt | ggtctgcaga | gtggaccac | catctcccac | 1440 |
| accgtcaacg | tgtcctccgg | cacctacaat | ctgggtatca | gcgtgcagcg | ccccggctgg | 1500 |
| aacatcaact | ggatcaacat | cactaaagtc | agctcccagc | tgaagtccat | tccttccacc | 1560 |
| aactcccgcg | tgatccaagc | tgagtcctac | ttcgactcct | ccaaggtgca | actggaggat | 1620 |
| acctccgatg | tgggtggcgg | caagaacgtc | aagtgcgaca | ctaagggcgc | ctggatggct | 1680 |
| tacaaggaca | tcaacttccc | ctcctccggt | tcctaccaga | tcgagtaccg | cgtggcttcc | 1740 |
| gagcgtgctg | gtggcaagct | gtccctggac | ctgaacgctg | gctccatcgt | gctgggtatg | 1800 |
| ctggacgtgc | cttccaccgg | cggttggcag | aagtggacca | ccatctccca | caccgtgaag | 1860 |
| gtggactccg | gcacctacaa | cctgggcatc | tacgtgcagc | agcccggctg | gaacatcaac | 1920 |
| tggatcaaga | tcaccaaggt | gtaa | | | | 1944 |

<210> SEQ ID NO 34
<211> LENGTH: 1953
<212> TYPE: DNA
<213> ORGANISM: Artificial Sequence
<220> FEATURE:

<223> OTHER INFORMATION: Synthetic polypeptide

<400> SEQUENCE: 34

```
accaactgga agctggtgtg gtccgacgag ttcaccaacg gcatctcctc cgactgggag      60
ttcgagaccg gtaacggtcc caacggctgg ggcaacaacg agctgcagta ctaccgccgc     120
gagaacgctc gcgtggaggg cggcaagctg atcatcaccg ctaagaagga ggactacgag     180
ggcttccgct acacctccgc taagctgaag acccagttca acaagccctg gaaggacggc     240
aagatcgagg ctcgcatgtc catcccctcc ttccgcggtg tgtgggtggc tttctggatg     300
ctgggcgaca tcaccgacac cgactcctgg ccttcctccg gtgagatcga cttcaaggag     360
cacatcaaca ccaacaacga ggtgcgcggc accatccact ggtccacctc cgacggcgct     420
cacacccacc acggccgcgg caccaacacc gactaccaca tctactccgt gggagtggaac    480
tcctccgtga tccgctggtt cgtggacggc aaccagtact tcgaggtgaa catccagcgc     540
ggcgctaccg gtaccaacgc tttccacaac aaggtgttcg tgatcctgaa catggctatc     600
ggcggtaact ggcccggctt caacgtggct gacgaggctt tccccgctaa catgtacgtg     660
gactacgtgc gcgtgtacca ggacgctaac acccctccc ccgtggacgt cgatgtgact     720
gacctgagcg gctactactt cctccagaac cgccactccg agctgtacct ggacgtctcc     780
ttctcctcca acaaagacgg cgcttttcctg caacagtggc cctacaacgg caacgctaat     840
caacagttcg acttcgtcca tctgggtaac aacatctaca aaatcaccaa caagaactcc     900
ggcaagtccc tggacgtgta caacgtgggt accgagaatg gtgtgcgcat ccaacagatg     960
ccctatcgcg gcagctacaa ccaacaattc atcgtgcagg acgtcggtga cggctactac    1020
aagatcttcg cccgtaacag ccgcaaactg gtggaggtcg ccgatttcaa caaggacccc    1080
ggcggcaaga tccagcagtg gagcgatgac ggtcagatta gcggtcagtg gaagctgatc    1140
cgcaacaaag tcaactccaa agtgatccag gctgaaagct acttcgcttc cctcggcgtc    1200
cagctggaag ataccagcga tgtgggcggc ggcaagaacg tgaagtgcga taccgagggc    1260
gcttggatgg cctacaagga catcaacttc ccttcctccg gttcctacca ggtggagtac    1320
cgtgtcgctt ccgaacgcgc tggcggtaag ctgtccctgg acctgaacgc tggctccatc    1380
gtgctgggca tgctgaacgt gccttccact ggcggctggc agaagtggac caccatcagc    1440
cacaccgtca aggtggatag cggcacctac aacctgggta tctacgtcca gcgtcctcgt    1500
tggaacatca actggatcaa gatcaccgag gccccccggtc agagcaagcc catccagcgt    1560
agcgacaccg acagcaaggt gatccaggcc gagagctatt tcgcctcctc caaggtgcaa    1620
ctcgaagaca cctccgacgt gggcggcggt aagaacgtca agtgcgataa cgagggcgcc    1680
tggatggctt acaaggacat caacttcccc tcctccggtt cctaccagat cgagtaccgc    1740
gtggcttccg agcgtgctgg tggcaagctg tccctggacc tgaacgctgg ctccatcgtg    1800
ctgggtatgc tggacgtgcc ttccaccggc ggttggcaga agtggaccac catctcccac    1860
accgtgaacg tgtcctccgg cacctacaac ctgggtatct acgtgcagcg cgccgcctgg    1920
aacatcaact ggatcaagat caccaaggtg taa                                 1953
```

<210> SEQ ID NO 35
<211> LENGTH: 855
<212> TYPE: DNA
<213> ORGANISM: Artificial Sequence
<220> FEATURE:
<223> OTHER INFORMATION: Synthetic polypeptide

<400> SEQUENCE: 35

```
atgtccgtga ctagccgcgt gcgccgcgag atcaacgagg agcactgcgg tatccgcccc    60
actgctcctc gcatcatcaa gggccgcatc tccatccctc actcctggcc ttggatggtg   120
ggcatcttcc aggtggaccc cctgctgttc atctgcggcg gcaccatcat caacaaggtg   180
tccgtcgtga ccgctgctca ctgcctggtg actcagtccg gtaaccgcca gaactcctcc   240
attgtcgtcc gcgtgggtgc ccacgacatc gataacagcg gtatcgacta ccacgtggac   300
aagatcatcg tccaccagga ttacaagtac cgctcccaat actacgacat cggtctgatc   360
ctgctctcca gcgcatcga atacaactac aaggtgcgcc ccgtctgcat ccccgagctg   420
aacaagctga acgtcaacct gaacaacaag gaggtggtgg tgatcggctg gggtgtgacc   480
gaacgtggta gcgagaagca acgtgctg cgcgagctgg agctccctgt ggtgaccaac    540
gagctctgca acaagtccta ccagaccatc agcttcagcg gcctcaaccg cggcatcacc   600
gatgacatga tctgcgctgg ctaccaggag ggcggtcgcg atagctgcga gggtgactcc   660
ggtggtcccc tgatgtacca cgaccctacc accggtcgtg tcgagctggt cggtgtggtg   720
tccttcggct cggctgtgc tcgccccaac ttccctggcg tgtacactcg tctgtcctcc    780
tacggcaact ggttccaaaa ggtgaccttc ggctacctgc tggctactct gttcgaggtc   840
gtgcccgtgt tctaa                                                     855
```

<210> SEQ ID NO 36
<211> LENGTH: 855
<212> TYPE: DNA
<213> ORGANISM: Artificial Sequence
<220> FEATURE:
<223> OTHER INFORMATION: Synthetic polypeptide

<400> SEQUENCE: 36

```
atgtccgtga ccagccgcgt gcgtcgtgag atcaacgagg agcattgtgg catccgcccc    60 actgccccc gtatcatcaa gggtcgcatc tccatccccc acagctggcc ctggatggtg   120
ggtattttcc aggtcgaccc tctgctgttc atctgcggcg gtaccatcat caacaaagtg   180
tccgtggtga ccgccgctca ctgtctggtg actcagtccg gcaaccgcca gaactcctcc   240
atcgtggtgc gtgtgggtgc tcacgacatc gacaacagcg gcatcgacta ccacgtcgac   300
aagatcatcg tgcaccagga ctacaaatac cgcagccagt actacgacat cggtctcatc   360
ctgctgagca agcccatcga atacaactac aaggtccgcc ccgtctgtat ccctgagctg   420
aacaagctga acgtgaacct caacaacaag gaggtggtgg tgatcggctg gggtgtgact   480
gagcgcggtt ccgagaagta caacgtgctg cgcgaactgg agctgcctgt ggtgaccaac   540
gagctctgca acaagtccta ccagaccatc tccttctccg gcctgaaccg cggcatcact   600
gatgacatga tctgcgctgg ctatcaggaa ggcggtcgtg actcctgtga gggtgacagc   660
ggtggtcctc tgatgtacca cgaccccact accggccgtg tcgaactggt cggcgtggtc   720
tccttcggtt cggctgcgc tcgtcccaac ttccctggcg tgtacactcg cctcagctcc    780
tacggtaact ggttccagaa ggtgactttc ggctacctcc tggctaccct gttcgaggtg   840
gtgcccgtgt tctaa                                                     855
```

<210> SEQ ID NO 37
<211> LENGTH: 909
<212> TYPE: DNA
<213> ORGANISM: Artificial Sequence
<220> FEATURE:
<223> OTHER INFORMATION: Synthetic polypeptide

<400> SEQUENCE: 37

```
atgtccgtga cctcccgtgt gcgccgcgag atcaacgagg agcactgcgg tatccgtcct    60
accgctcccc gcatcatcaa gggtcgcatc tccatccccc actcctggcc ctggatggtg   120
ggcatcttcc aggtggaccc cctgctgttc atctgcggcg gcaccatcat caacaaggtg   180
tccgtggtga ccgctgctca ctgcctggtg acccagtccg gcaaccgcca gaactactcc   240
atcgtggtgc gcgtgggcgc tcacgacatc gacaactccg gcatcgacta ccacgtggac   300
aagatcatcg tgcaccagga ctacaagtac cgctcccagt actacgacat cggcctgatc   360
ctgctgtcca agcctatcga gtacaactac aaggtgcgcc ccgtgtgcat ccccgagctg   420
aacaagctga acgtgaacct gaacaacaag gaggtggtgg tgatcggttg gggcgtgacc   480
gagcgtggtt ccgagaagca acgtgctg cgcgaactgg agctgcccgt ggtgaccaac   540
gagctgtgca acaagtccta ccagaccatc tccttctccg gcctgaaccg cggcatcacc   600
gacgacatga tctgcgctgg ctaccaggag ggtggtcgcg actcctgcga aggtgactcc   660
ggtggccccc tgatgtacca cgaccccacc accggcggtg tggagctggt gggcgtggtg   720
tccttcggct cggttgcgc tcgccccaac ttccccggtg tgtacacccg cctgtcctcc   780
tacggcaact ggttccagaa ggtgaccttc ggctacctgc tggctaccct gttcgaggtg   840
gtgcccgtgt tcggcgtggc tatgcccggt gctgaggacg acgtggtgca tcaccaccat   900
caccactaa                                                           909
```

<210> SEQ ID NO 38
<211> LENGTH: 909
<212> TYPE: DNA
<213> ORGANISM: Artificial Sequence
<220> FEATURE:
<223> OTHER INFORMATION: Synthetic polypeptide

<400> SEQUENCE: 38

```
atgtccgtga cctcccgtgt gcgccgcgag atcaacgagg agcactgcgg tatccgtcct    60
accgctcccc gcatcatcaa gggtcgcatc tccatccccc actcctggcc ctggatggtg   120
ggcatcttcc aggtggaccc cctgctgttc atctgcggcg gcaccatcat caacaaggtg   180
tccgtggtga ccgctgctca ctgcctggtg acccagtccg gcaaccgcca gaactactcc   240
atcgtggtgc gcgtgggcgc tcacgacatc gacaactccg gcatcgacta ccacgtggac   300
aagatcatcg tgcaccagga ctacaagtac cgctcccagt actacgacat cggcctgatc   360
ctgctgtcca agcctatcga gtacaactac aaggtgcgcc ccgtgtgcat ccccgagctg   420
aacaagctga acgtgaacct gaacaacaag gaggtggtgg tgatcggttg gggcgtgacc   480
gagcgtggtt ccgagaagta acgtgctgcg cgaactgg agctgcccgt ggtgaccaac   540
gagctgtgca acaagtccta ccagaccatc tccttctccg gcctgaaccg cggcatcacc   600
gacgacatga tctgcgctgg ctaccaggag ggtggtcgcg actcctgcga aggtgactcc   660
ggtggccccc tgatgtacca cgaccccacc accggccgtg tggagctggt gggcgtggtg   720
tccttcggct cggttgcgc tcgccccaac ttccccggtg tgtacacccg cctgtcctcc   780
tacggcaact ggttccagaa ggtgaccttc ggctacctgc tggctaccct gttcgaggtg   840
gtgcccgtgt tcggcgtggc tatgcccggt gctgaggacg acgtggtgca tcaccaccat   900
caccactaa                                                           909
```

<210> SEQ ID NO 39
<211> LENGTH: 909

<212> TYPE: DNA
<213> ORGANISM: Artificial Sequence
<220> FEATURE:
<223> OTHER INFORMATION: Synthetic polypeptide

<400> SEQUENCE: 39

```
atgtccgtga cctcccgtgt gcgccgcgag atcaacgagg agcactgcgg tatccgtcct    60
accgctcccc gcatcatcaa gggtcgcatc tccatccccc actcctggcc ctggatggtg   120
ggcatcttcc aggtggaccc cctgctgttc atctgcggcg gcaccatcat caacaaggtg   180
tccgtggtga ccgctgctca ctgcctggtg acccagtccg gcaaccgcca gaactcctcc   240
atcgtggtgc cgtgggcgc tcacgacatc gacaactccg gcatcgacta ccacgtggac   300
aagatcatcg tgcaccagga ctacaagtac cgctcccagt actacgacat cggcctgatc   360
ctgctgtcca gcgtatcga gtacaactac aaggtgcgcc ccgtgtgcat ccccgagctg   420
aacaagctga cgtgaacct gaacaacaag gaggtggtgg tgatcggttg ggcgtgacc    480
gagcgtggtt ccgagaagta caacgtgctg cgcgaactgg agctgcccgt ggtgaccaac   540
gagctgtgca acaagtccta ccagaccatc tccttctccg gcctgaaccg cggcatcacc   600
gacgacatga tctgcgctgg ctaccaggag ggtggtcgcg actcctgcga aggtgactcc   660
ggtggccccc tgatgtacca cgaccccacc accggccgtg tggagctggt gggcgtggtg   720
tccttcggct tcggttgcgc tcgccccaac ttccccggtg tgtacacccg cctgtcctcc   780
tacggcaact ggttccagaa ggtgaccttc ggctacctgc tggctaccct gttcgaggtg   840
gtgcccgtgt tcggcgtggc tatgcccggt gctgaggacg acgtggtgca tcaccaccat   900
caccactaa                                                          909
```

<210> SEQ ID NO 40
<211> LENGTH: 909
<212> TYPE: DNA
<213> ORGANISM: Artificial Sequence
<220> FEATURE:
<223> OTHER INFORMATION: Synthetic polypeptide

<400> SEQUENCE: 40

```
atgtccgtga cctcccgtgt gcgccgcgag atcaacgagg agcactgcgg tatccgtcct    60
accgctcccc gcatcatcaa gggtcgcatc tccatccccc actcctggcc ctggatggtg   120
ggcatcttcc aggtggatcc cctgctgttc atctgcggcg gcaccatcat caacaaggtg   180
tccgtggtga ccgctgctca ctgcctggtg acccagtccg gcaaccgcca gaactactcc   240
atcgtggtgc cgtgggcgc tcacgacatc gacaactccg gcatcgacta ccacgtggac   300
aagatcatcg tgcaccagga ctacaagtac cgctcccagt actacgacat cggcctgatc   360
ctgctgtcca gcctatcga gtacaactac aaggtgcgcc ccgtgtgcat ccccgagctg   420
aacaagctga cgtgaacct gaacaacaag gaggtggtgg tgatcggctg ggcgtgacc    480
gaacgtggtt ccgagaagca caacgtgctg cgcgaactgg agctgcccgt ggtgaccaac   540
gagctgtgca acaagtccta ccagaccatc tccttctccg gcctgaaccg cggcatcacc   600
gacgacatga tctgcgctgg ttaccaggag ggtggccgcg actcctgtga gggtgactcc   660
ggtggccccc tgatgtacca cgaccccacc accggtcgtg tggagctggt gggtgtggtg   720
tccttcggct tcggttgcgc tcgccccaac ttccctggcg tgtacacccg cctgtcctcc   780
tacggcaact ggttccagaa ggtgaccttc ggctacctgc tggctaccct gttcgaggtg   840
gtgcccgtgt tcggcgtggc tatgcccggt gctgaggacg acgtggtgca tcaccaccat   900
```

| caccactaa | 909 |

<210> SEQ ID NO 41
<211> LENGTH: 2007
<212> TYPE: DNA
<213> ORGANISM: Artificial Sequence
<220> FEATURE:
<223> OTHER INFORMATION: Synthetic polypeptide
<220> FEATURE:
<221> NAME/KEY: sig_peptide
<222> LOCATION: (1)..(63)

<400> SEQUENCE: 41

| atggcaatgt tcctgtgcta cgtggtgctg tacgtgggcg tggctggcat ctactgctcc | 60 |
| caggagccca gtggaagct ggtgtggtcc gacgagttca ccaacggcat ctcctccgac | 120 |
| tgggagttcg agaccggtaa cggtcccaac ggctggggca caacgagct gcagtactac | 180 |
| cgccgcgaga cacccgcgt ggagggcggc aagctgatca tcaccgctaa ggaggaggac | 240 |
| tacgagggct cccgctacac ctccgctaag ctgaagaccc agttcaacaa gccctggaag | 300 |
| gacggcaaga tcgaggctcg catgtccatc ccctccttcc gcggtgtgtg ggtggctttc | 360 |
| tggatgctgg cgacatcac cgacaccgac tcctggcctt cctccggtga gatcgacttc | 420 |
| gaggagcaca tcaacaccaa caacgaggtg cgcggcacca tccactggtc cacctccgac | 480 |
| gacgctgaca ccctgcacgg ccgcggcacc aacaccgact accacatcta ctccgtggag | 540 |
| tggaactcct ccgtgatccg ctggttcgtg gacggcaacc agtacttcga ggtgaacatc | 600 |
| cagcgcggcg ctaccggtac caacgctttc cacaacaacg tgttcgtgat cctgaacatg | 660 |
| gctatcggcg gtaactggcc cggcttcaac gtggctgacg aggctttccc cgctaacatg | 720 |
| tacgtggact acgtgcgcgt gtaccaggac gctaacaccc cctcccccgt ggacgtcacc | 780 |
| cacctcagcg gctactactt cctccagaac cgccacagcg agctgtacct cgacgtgtcc | 840 |
| ggcagctcca cgaggacgg tgctttcctg cagcagtggc cctactccgg taatgccaat | 900 |
| cagcagttcg acttcgtgca cctgggcaac aaggtgtaca agatcatcaa caagaactcc | 960 |
| ggtaagagcc tggacgtgta cgaactgggc accgacaacg gcgtgcgcat ccagcaatgg | 1020 |
| tcctacggtg gcggctacaa ccaacagttc attgtccagg acgtgggtga cggctactac | 1080 |
| aagatcttcg ctcgcagcac tggcaagctg gtggaggtgg ccgacctcaa caaggacccc | 1140 |
| ggtggcaaga tccagcagtg gagcgacgac ggccaactct ccggccagtg gaaactgatc | 1200 |
| cgcaacaagg ccaacagcaa gctgatccag gccgagagct acttcgcctc ctccaaagtg | 1260 |
| cagctggagg acacttccga cgtgggcggt ggcaagaatg tgaagtgcga caacgagggc | 1320 |
| gcctggatgg cctacaagga catcaacttc ccctccagcg gtacctacca ggtggagtac | 1380 |
| cgcgtggcta cgagcgcgc tgtggtatg ctgtccctgg acctgaacgc tggctccatc | 1440 |
| gtgctgggta tgctcaacgt gccctccacc ggtggtctgc agaagtggac caccatctcc | 1500 |
| cacaccgtca acgtgtcctc cggcacctac aatctgggta tcagcgtgca cgcccccggc | 1560 |
| tggaacatca actggatcaa catcactaaa gtcagctccc agctgaagtc cattccttcc | 1620 |
| accaactccc gcgtgatcca agctgagtcc tacttcgact cctccaaggt gcaactggag | 1680 |
| gatacctccg atgtgggtgg cggcaagaac gtcaagtgcg cactaagggg cgcctggatg | 1740 |
| gcttacaagg acatcaactt cccctcctcc ggttcctacc agatcgagta ccgcgtggct | 1800 |
| tccgagcgtg ctggtggcaa gctgtccctg acctgaacg ctggctccat cgtgctgggt | 1860 |
| atgctggacg tgccttccac cggcggttgg cagaagtgga ccaccatctc ccacaccgtg | 1920 |

-continued

| aaggtggact ccggcaccta caacctgggc atctacgtgc agcagcccgg ctggaacatc | 1980 |
| aactggatca agatcaccaa ggtgtaa | 2007 |

<210> SEQ ID NO 42
<211> LENGTH: 2019
<212> TYPE: DNA
<213> ORGANISM: Artificial Sequence
<220> FEATURE:
<223> OTHER INFORMATION: Synthetic polypeptide
<220> FEATURE:
<221> NAME/KEY: sig_peptide
<222> LOCATION: (1)..(66)

<400> SEQUENCE: 42

| atggcaatgt tcctgtgcta cgtggtgctg gtggtgggcg tgaccggcat ctgctgctcc | 60 |
| caggagacca actggaagct ggtgtggtcc gacgagttca ccaacggcat ctcctccgac | 120 |
| tgggagttcg agaccggtaa cgtcccaac ggctgggca caacgagct gcagtactac | 180 |
| cgccgcgaga acgctcgcgt ggagggcggc aagctgatca tcaccgctaa gaaggaggac | 240 |
| tacgagggct tccgctacac ctccgctaag ctgaagaccc agttcaacaa gccctggaag | 300 |
| gacggcaaga tcgaggctcg catgtccatc ccctccttcc gcggtgtgtg ggtggctttc | 360 |
| tggatgctgg gcgacatcac cgacaccgac tcctggcctt cctccggtga gatcgacttc | 420 |
| aaggagcaca tcaacaccaa caacgaggtg cgcggcacca tccactggtc cacctccgac | 480 |
| ggcgctcaca cccaccacgg ccgcggcacc aacaccgact accacatcta ctccgtggag | 540 |
| tggaactcct ccgtgatccg ctggttcgtg gacggcaacc agtacttcga ggtgaacatc | 600 |
| cagcgcggcg ctaccggtac caacgctttc cacaacaagg tgttcgtgat cctgaacatg | 660 |
| gctatcggcg gtaactggcc cggcttcaac gtggctgacg aggctttccc cgctaacatg | 720 |
| tacgtggact acgtgcgcgt gtaccaggac gctaacaccc cctcccccgt ggacgtcgat | 780 |
| gtgactgacc tgagcggcta ctacttcctc cagaaccgcc actccgagct gtacctggac | 840 |
| gtctccttct cctccaacaa agacggcgct ttcctgcaac agtggcccta caacggcaac | 900 |
| gctaatcaac agttcgactt cgtccatctg ggtaacaaca tctacaaaat caccaacaag | 960 |
| aactccggca agtccctgga cgtgtacaac gtgggtaccg agaatggtgt gcgcatccaa | 1020 |
| cagatgccct atcgcggcag ctacaaccaa caattcatcg tgcaggacgt cggtgacggc | 1080 |
| tactacaaga tcttcgcccg taacagccgc aaactggtgg aggtcgccga tttcaacaag | 1140 |
| gaccccggcg gcaagatcca gcagtggagc gatgacggtc agattagcgg tcagtggaag | 1200 |
| ctgatccgca caaagtcaa ctccaaagtg atccaggctg aaagctactt cgcttccctc | 1260 |
| ggcgtccagc tggaagatac cagcgatgtg ggcggcggca agaacgtgaa gtgcgatacc | 1320 |
| gagggcgctt ggatggccta caggacatc aacttcccctt cctccggttc ctaccaggtg | 1380 |
| gagtaccgtg tcgcttccga acgcgctggc ggtaagctgt ccctggacct gaacgctggc | 1440 |
| tccatcgtgc tgggcatgct gaacgtgcct ccactggcg gctggcagaa gtggaccacc | 1500 |
| atcagccaca ccgtcaaggt ggatagcggc acctacaacc tgggtatcta cgtccagcgt | 1560 |
| cctcgttgga acatcaactg gatcaagatc accgaggccc ccggtcagag caagcccatc | 1620 |
| cagcgtagcg acaccgacag caaggtgatc caggccgaga ctatttcgc ctcctccaag | 1680 |
| gtgcaactcg aagacacctc cgacgtgggc ggcggtaaga acgtcaagtg cgataacgag | 1740 |
| ggcgcctgga tggcttacaa ggacatcaac ttcccctcct ccggttccta ccagatcgag | 1800 |
| taccgcgtgg cttccgagcg tgctggtggc aagctgtccc tggacctgaa cgctggctcc | 1860 |

| | |
|---|---|
| atcgtgctgg gtatgctgga cgtgccttcc accggcggtt ggcagaagtg gaccaccatc | 1920 |
| tcccacaccg tgaacgtgtc ctccggcacc tacaacctgg gtatctacgt gcagcgcgcc | 1980 |
| gcctggaaca tcaactggat caagatcacc aaggtgtaa | 2019 |

<210> SEQ ID NO 43
<211> LENGTH: 933
<212> TYPE: DNA
<213> ORGANISM: Artificial Sequence
<220> FEATURE:
<223> OTHER INFORMATION: Synthetic polypeptide
<220> FEATURE:
<221> NAME/KEY: sig_peptide
<222> LOCATION: (1)..(78)

<400> SEQUENCE: 43

| | |
|---|---|
| atggcaatga agaccaccct gtggaccttc ttcgccctgg ctatggccct gttctccatt | 60 |
| aacgtgaccg ccagcgagat gtccgtgact agccgcgtgc gccgcgagat caacgaggag | 120 |
| cactgcggta tccgcccac tgctcctcgc atcatcaagg gccgcatctc catccctcac | 180 |
| tcctggcctt ggatggtggg catcttccag gtggaccccc tgctgttcat ctgcggcggc | 240 |
| accatcatca acaaggtgtc cgtcgtgacc gctgctcact gcctggtgac tcagtccggt | 300 |
| aaccgccaga actcctccat tgtcgtccgc gtgggtgccc acgacatcga taacagcggt | 360 |
| atcgactacc acgtggacaa gatcatcgtc caccaggatt acaagtaccg ctcccaatac | 420 |
| tacgacatcg gtctgatcct gctctccaag cgcatcgaat acaactacaa ggtgcgcccc | 480 |
| gtctgcatcc ccgagctgaa caagctgaac gtcaacctga acaacaagga ggtggtggtg | 540 |
| atcggctggg gtgtgaccga acgtggtagc gagaagcaca acgtgctgcg cgagctggag | 600 |
| ctccctgtgg tgaccaacga gctctgcaac aagtcctacc agaccatcag cttcagcggc | 660 |
| ctcaaccgcg gcatcaccga tgacatgatc tgcgctggct accaggaggg cggtcgcgat | 720 |
| agctgcgagg gtgactccgg tggtccctg atgtaccacg accctaccac cggtcgtgtc | 780 |
| gagctggtcg gtgtggtgtc cttcggcttc ggctgtgctc gccccaactt ccctggcgtg | 840 |
| tacactcgtc tgtcctccta cggcaactgg ttccaaaagg tgaccttcgg ctacctgctg | 900 |
| gctactctgt cgaggtcgt gcccgtgttc taa | 933 |

<210> SEQ ID NO 44
<211> LENGTH: 933
<212> TYPE: DNA
<213> ORGANISM: Artificial Sequence
<220> FEATURE:
<223> OTHER INFORMATION: Synthetic polypeptide
<220> FEATURE:
<221> NAME/KEY: sig_peptide
<222> LOCATION: (1)..(78)

<400> SEQUENCE: 44

| | |
|---|---|
| atggcaatga agactaccct gtggaccttc ttcgctctgg ctatggctct gttctccatt | 60 |
| aacgtgaccg ctagcgagat gtccgtgacc agccgcgtgc gtcgtgagat caacgaggag | 120 |
| cattgtggca tccgcccac tgccccccgt atcatcaagg gtcgcatctc catccccac | 180 |
| agctggcct ggatggtggg tattttccag gtcgaccctc tgctgttcat ctgcggcggt | 240 |
| accatcatca acaaagtgtc cgtggtgacc gccgctcact gtctggtgac tcagtccggc | 300 |
| aaccgccaga actcctccat cgtggtgcgt gtgggtgctc acgacatcga caacagcggc | 360 |
| atcgactacc acgtcgacaa gatcatcgtg caccaggact acaaataccg cagccagtac | 420 |
| tacgacatcg gtctcatcct gctgagcaag cccatcgaat acaactacaa ggtccgcccc | 480 |

```
gtctgtatcc ctgagctgaa caagctgaac gtgaacctca acaacaagga ggtggtggtg      540
atcggctggg gtgtgactga gcgcggttcc gagaagtaca acgtgctgcg cgaactggag      600
ctgcctgtgg tgaccaacga gctctgcaac aagtcctacc agaccatctc cttctccggc      660
ctgaaccgcg gcatcactga tgacatgatc tgcgctggct atcaggaagg cggtcgtgac      720
tcctgtgagg gtgacagcgg tggtcctctg atgtaccacg accccactac cggccgtgtc      780
gaactggtcg gcgtggtctc cttcggtttc ggctgcgctc gtcccaactt ccctggcgtg      840
tacactcgcc tcagctccta cggtaactgg ttccagaagg tgactttcgg ctacctcctg      900
gctaccctgt cgaggtggt gcccgtgttc taa                                    933
```

```
<210> SEQ ID NO 45
<211> LENGTH: 933
<212> TYPE: DNA
<213> ORGANISM: Artificial Sequence
<220> FEATURE:
<223> OTHER INFORMATION: Synthetic polypeptide
<220> FEATURE:
<221> NAME/KEY: sig_peptide
<222> LOCATION: (1)..(78)

<400> SEQUENCE: 45
atggcaatga agaccaccct gtggaccttc ttcgctctgg ctatggctct gttctccatc      60
aacgtgaccg cttccgagat gtccgtgacc tcccgtgtgc gccgcgagat caacgaggag      120
cactgcggta tccgtcctac cgctccccgc atcatcaagg tcgcatctc catccccac       180 tcctggccct ggatggtggg catcttccag gtggaccccc tgctgttcat ctgcggcggc      240
accatcatca acaaggtgtc cgtggtgacc gctgctcact gcctggtgac ccagtccggc      300
aaccgccaga actactccat cgtggtgcgc gtgggcgctc acgacatcga caactccggc      360
atcgactacc acgtggacaa gatcatcgtg caccaggact acaagtaccg ctcccagtac      420
tacgacatcg gcctgatcct gctgtccaag cctatcgagt acaactacaa ggtgcgcccc      480
gtgtgcatcc ccgagctgaa caagctgaac gtgaacctga acaacaagga ggtggtggtg      540
atcggttggg gcgtgaccga gcgtggttcc gagaagcaca acgtgctgcg cgaactggag      600
ctgcccgtgg tgaccaacga gctgtgcaac aagtcctacc agaccatctc cttctccggc      660
ctgaaccgcg gcatcaccga cgacatgatc tgcgctggct accaggaggg tggtcgcgac      720
tcctgcgaag gtgactccgg tggccccctg atgtaccacg accccaccac cggcggtgtg      780
gagctggtgg gcgtggtgtc cttcggcttc ggttgcgctc gccccaactt ccccggtgtg      840
tacacccgcc tgtcctccta cggcaactgg ttccagaagg tgaccttcgg ctacctgctg      900
gctaccctgt cgaggtggt gcccgtgttc taa                                    933
```

```
<210> SEQ ID NO 46
<211> LENGTH: 933
<212> TYPE: DNA
<213> ORGANISM: Artificial Sequence
<220> FEATURE:
<223> OTHER INFORMATION: Synthetic polypeptide
<220> FEATURE:
<221> NAME/KEY: sig_peptide
<222> LOCATION: (1)..(78)

<400> SEQUENCE: 46
atggcaatga agaccaccct gtggaccttc ttcgctctgg ctatggctct gttctccatc      60
aacgtgaccg cttccgagat gtccgtgacc tcccgtgtgc gccgcgagat caacgaggag      120
```

```
cactgcggta tccgtcctac cgctccccgc atcatcaagg gtcgcatctc catcccccac    180
tcctggccct ggatggtggg catcttccag gtggaccccc tgctgttcat ctgcggcggc    240
accatcatca acaaggtgtc cgtggtgacc gctgctcact gcctggtgac ccagtccggc    300
aaccgccaga actactccat cgtggtgcgc gtgggcgctc acgacatcga caactccggc    360
atcgactacc acgtggacaa gatcatcgtg caccaggact acaagtaccg ctcccagtac    420
tacgacatcg gcctgatcct gctgtccaag cctatcgagt acaactacaa ggtgcgcccc    480
gtgtgcatcc ccgagctgaa caagctgaac gtgaacctga caacaagga ggtggtggtg    540 atcggttggg gcgtgaccga gcgtggttcc gagaagtaca acgtgctgcg cgaactggag    600
ctgcccgtgg tgaccaacga gctgtgcaac aagtcctacc agaccatctc cttctccggc    660
ctgaaccgcg gcatcaccga cgacatgatc tgcgctggct accaggaggg tggtcgcgac    720
tcctgcgaag gtgactccgg tggccccctg atgtaccacg accccaccac cggccgtgtg    780
gagctggtgg gcgtggtgtc cttcggcttc ggttgcgctc gccccaactt ccccggtgtg    840
tacacccgcc tgtcctccta cggcaactgg ttccagaagg tgaccttcgg ctacctgctg    900
gctaccctgt cgaggtggt gcccgtgttc taa                                  933
```

<210> SEQ ID NO 47  
<211> LENGTH: 933  
<212> TYPE: DNA  
<213> ORGANISM: Artificial Sequence  
<220> FEATURE:  
<223> OTHER INFORMATION: Synthetic polypeptide  
<220> FEATURE:  
<221> NAME/KEY: sig_peptide  
<222> LOCATION: (1)..(78)

<400> SEQUENCE: 47

```
atggcaatga agaccaccct gtggaccttc ttcgctctgg ctatggctct gttctccatc     60
aacgtgaccg cttccgagat gtccgtgacc tcccgtgtgc gccgcgagat caacgaggag    120
cactgcggta tccgtcctac cgctccccgc atcatcaagg gtcgcatctc catcccccac    180
tcctggccct ggatggtggg catcttccag gtggaccccc tgctgttcat ctgcggcggc    240
accatcatca acaaggtgtc cgtggtgacc gctgctcact gcctggtgac ccagtccggc    300
aaccgccaga actcctccat cgtggtgcgc gtgggcgctc acgacatcga caactccggc    360
atcgactacc acgtggacaa gatcatcgtg caccaggact acaagtaccg ctcccagtac    420
tacgacatcg gcctgatcct gctgtccaag cgtatcgagt acaactacaa ggtgcgcccc    480
gtgtgcatcc ccgagctgaa caagctgaac gtgaacctga caacaagga ggtggtggtg    540 atcggttggg gcgtgaccga gcgtggttcc gagaagtaca acgtgctgcg cgaactggag    600
ctgcccgtgg tgaccaacga gctgtgcaac aagtcctacc agaccatctc cttctccggc    660
ctgaaccgcg gcatcaccga cgacatgatc tgcgctggct accaggaggg tggtcgcgac    720
tcctgcgaag gtgactccgg tggccccctg atgtaccacg accccaccac cggccgtgtg    780
gagctggtgg gcgtggtgtc cttcggcttc ggttgcgctc gccccaactt ccccggtgtg    840
tacacccgcc tgtcctccta cggcaactgg ttccagaagg tgaccttcgg ctacctgctg    900
gctaccctgt cgaggtggt gcccgtgttc taa                                  933
```

<210> SEQ ID NO 48  
<211> LENGTH: 933  
<212> TYPE: DNA  
<213> ORGANISM: Artificial Sequence  
<220> FEATURE:

<223> OTHER INFORMATION: Synthetic polypeptide
<220> FEATURE:
<221> NAME/KEY: sig_peptide
<222> LOCATION: (1)..(78)

<400> SEQUENCE: 48

```
atggcaatga agaccaccct gtggaccttc ttcgctctgg ctatggctct gttctccatc    60
aacgtgaccg cttccgagat gtccgtgacc tcccgtgtgc gccgcgagat caacgaggag   120
cactgcggta tccgtcctac cgctccccgc atcatcaagg tcgcatctc catccccac    180
tcctggccct ggatggtggg catcttccag gtggatcccc tgctgttcat ctgcggcggc   240
accatcatca acaaggtgtc cgtggtgacc gctgctcact gctggtgac ccagtccggc    300
aaccgccaga actactccat cgtggtgcgc gtgggcgctc acgacatcga caactccggc   360
atcgactacc acgtggacaa gatcatcgtg caccaggact acaagtaccg ctcccagtac   420
tacgacatcg gcctgatcct gctgtccaag cctatcgagt acaactacaa ggtgcgcccc   480
gtgtgcatcc ccgagctgaa caagctgaac gtgaacctga acaacaagga ggtggtggtg   540
atcggctggg gcgtgaccga acgtggttcc gagaagcaca acgtgctgcg cgaactggag   600
ctgcccgtgg tgaccaacga gctgtgcaac aagtcctacc agaccatctc cttctccggc   660
ctgaaccgcg gcatcaccga cgacatgatc tgcgctggtt accaggaggg tggccgcgac   720
tcctgtgagg gtgactccgg tggcccctg atgtaccacg accccaccac cggtcgtgtg    780
gagctggtgg gtgtggtgtc cttcggcttc ggttgcgctc gccccaactt ccctggcgtg   840
tacacccgcc tgtcctccta cggcaactgg ttccagaagg tgaccttcgg ctacctgctg   900
gctaccctgt cgaggtggt gcccgtgttc taa                                 933
```

<210> SEQ ID NO 49
<211> LENGTH: 2007
<212> TYPE: DNA
<213> ORGANISM: Limulus polyphemus

<400> SEQUENCE: 49

```
atgttggtgt tgctgtgttg tgttgttttg catgttggtg ttgcaagaat ttgctgtagc    60
caggaaccaa aatggaagct cgtctggtcg gatgaattta ccaatggaat cagttcagat   120
tgggaattcg aaacgggcaa tggccccaac ggttggggca ataacgaact gcaatattat   180
cgtcgtgaaa atacccgagt tgagggcggg aaattaataa ttacagctaa agaagaagat   240
tatgagggtt tcaggtacac ttctgccaag ctgaaaaccc agttcaataa accttggaaa   300
gatggtaaaa ttgaagccag aatgtcgatt ccatcatttc ggggggtctg ggtggcgttc   360
tggatgttag agacatcac cgatactgat agctggccct cttccggtga aattgacttt    420
gaggaacata taaataccaa caatgaagtt agaggaacta ttcactggtc tacttctgat   480
gacgctgata cacttcatgg cagaggaacc aatactgact atcacattta ttctgtagag   540
tggaattctt ccgttattag atggtttgtt gatggaaatc agtactttga tgtgaatatt   600
cagagaggag caactggaac aaacgcattt cataataacg ttttcgttat tttaaacatg   660
gctattggtg gaaactggcc aggattcaat gttgctgatg aggctttccc tgctaacatg   720
tatgtagatt atgtccgtgt atatcaggat gccaatacac cttctcctgt tgacgttact   780
catttatctg gttactattt tcttcaaaat aggcacagtg aactgtatct tgatgtcagt   840
ggttccagta acgaagatgg agcatttcta caacaatggc cttatagcgg taatgctaac   900
caacagtttg attttgtaca tctcggaaat aaggtttata aaattatcaa taaaaatagt   960
```

-continued

```
ggaaaatctc tggatgttta cgagttaggg actgataatg gtgtcagaat ccaacagtgg    1020
tcgtatggag ggggctacaa tcagcagttt attgtacaag atgttggaga tggttattat    1080
aagatatttg cacgcagcac tggaaagtta gtggaagtag cagatttgaa taaagaccca    1140
ggaggaaaga tacaacaatg gtctgatgat ggccaattat ccggacagtg gaaacttatt    1200
cgaaataaag ctaattctaa attgattcag gcagaaagtt attttgctag ttcaaaagta    1260
caattggaag atacctcgga tgtaggaggc gggaagaatg tcaagtgtga taatgaagga    1320
gcctggatgg cttacaagga tatcaatttc ccaagttcag gtacttatca agtagagtac    1380
agagtggcaa gtgaacgtgc aggaggaatg ttgtctctgg atttgaatgc aggttctata    1440
gtgcttggca tgctgaatgt tccttcaact ggaggattgc agaagtggac caccatttcc    1500
cacacagtga atgtaagttc aggtacgtac aacttgggga tcagtgttca acgacccggg    1560
tggaatatca actggattaa tattacaaaa gtatccagtc agttgaaatc tattccaagt    1620
actaattcta gagtaattca ggcagaaagt tatttcgata gttcaaaagt acaattggaa    1680
gacacctcgg atgttggagg cgggaagaat gttaagtgtg atactaaagg agcctggatg    1740
gcctacaagg atatcaattt tcccagttca ggtagttatc aaatagagta cagagtggca    1800
agtgaacgtg caggaggaaa gttgtctctc gatttgaatg caggttctat agtgcttgga    1860
atgctggatg ttccttcaac tgggggatgg cagaagtgga ccaccatttc ccatacagta    1920 aaggtgggatt caggtactta aacttggggg atctacgttc aacaacccgg gtggaatatc    1980
aactggatta agattacaaa ggtttag                                        2007
```

<210> SEQ ID NO 50
<211> LENGTH: 668
<212> TYPE: PRT
<213> ORGANISM: Limulus polyphemus

<400> SEQUENCE: 50

```
Met Leu Val Leu Leu Cys Cys Val Val Leu His Val Gly Val Ala Arg
1               5                   10                  15

Ile Cys Cys Ser Gln Glu Pro Lys Trp Lys Leu Val Trp Ser Asp Glu
            20                  25                  30

Phe Thr Asn Gly Ile Ser Ser Asp Trp Glu Phe Glu Thr Gly Asn Gly
        35                  40                  45

Pro Asn Gly Trp Gly Asn Asn Glu Leu Gln Tyr Tyr Arg Arg Glu Asn
    50                  55                  60

Thr Arg Val Glu Gly Gly Lys Leu Ile Ile Thr Ala Lys Glu Glu Asp
65                  70                  75                  80

Tyr Glu Gly Phe Arg Tyr Thr Ser Ala Lys Leu Lys Thr Gln Phe Asn
                85                  90                  95

Lys Pro Trp Lys Asp Gly Lys Ile Glu Ala Arg Met Ser Ile Pro Ser
            100                 105                 110

Phe Arg Gly Val Trp Val Ala Phe Trp Met Leu Gly Asp Ile Thr Asp
        115                 120                 125

Thr Asp Ser Trp Pro Ser Ser Gly Glu Ile Asp Phe Glu Glu His Ile
    130                 135                 140

Asn Thr Asn Asn Glu Val Arg Gly Thr Ile His Trp Ser Thr Ser Asp
145                 150                 155                 160

Asp Ala Asp Thr Leu His Gly Arg Gly Thr Asn Thr Asp Tyr His Ile
                165                 170                 175

Tyr Ser Val Glu Trp Asn Ser Ser Val Ile Arg Trp Phe Val Asp Gly
            180                 185                 190
```

```
Asn Gln Tyr Phe Asp Val Asn Ile Gln Arg Gly Ala Thr Gly Thr Asn
            195                 200                 205

Ala Phe His Asn Asn Val Phe Val Ile Leu Asn Met Ala Ile Gly Gly
        210                 215                 220

Asn Trp Pro Gly Phe Asn Val Ala Asp Glu Ala Phe Pro Ala Asn Met
225                 230                 235                 240

Tyr Val Asp Tyr Val Arg Val Tyr Gln Asp Ala Asn Thr Pro Ser Pro
                245                 250                 255

Val Asp Val Thr His Leu Ser Gly Tyr Tyr Phe Leu Gln Asn Arg His
                260                 265                 270

Ser Glu Leu Tyr Leu Asp Val Ser Gly Ser Asn Glu Asp Gly Ala
            275                 280                 285

Phe Leu Gln Gln Trp Pro Tyr Ser Gly Asn Ala Asn Gln Gln Phe Asp
        290                 295                 300

Phe Val His Leu Gly Asn Lys Val Tyr Lys Ile Ile Asn Lys Asn Ser
305                 310                 315                 320

Gly Lys Ser Leu Asp Val Tyr Glu Leu Gly Thr Asp Asn Gly Val Arg
                325                 330                 335

Ile Gln Gln Trp Ser Tyr Gly Gly Tyr Asn Gln Gln Phe Ile Val
            340                 345                 350

Gln Asp Val Gly Asp Gly Tyr Tyr Lys Ile Phe Ala Arg Ser Thr Gly
        355                 360                 365

Lys Leu Val Glu Val Ala Asp Leu Asn Lys Asp Pro Gly Gly Lys Ile
370                 375                 380

Gln Gln Trp Ser Asp Gly Gln Leu Ser Gln Trp Lys Leu Ile
385                 390                 395                 400

Arg Asn Lys Ala Asn Ser Lys Leu Ile Gln Ala Glu Ser Tyr Phe Ala
                405                 410                 415

Ser Ser Lys Val Gln Leu Glu Asp Thr Ser Asp Val Gly Gly Lys
        420                 425                 430

Asn Val Lys Cys Asp Asn Glu Gly Ala Trp Met Ala Tyr Lys Asp Ile
            435                 440                 445

Asn Phe Pro Ser Ser Gly Thr Tyr Gln Val Glu Tyr Arg Val Ala Ser
        450                 455                 460

Glu Arg Ala Gly Gly Met Leu Ser Leu Asp Leu Asn Ala Gly Ser Ile
465                 470                 475                 480

Val Leu Gly Met Leu Asn Val Pro Ser Thr Gly Gly Leu Gln Lys Trp
                485                 490                 495

Thr Thr Ile Ser His Thr Val Asn Val Ser Ser Gly Thr Tyr Asn Leu
                500                 505                 510

Gly Ile Ser Val Gln Arg Pro Gly Trp Asn Ile Asn Trp Ile Asn Ile
            515                 520                 525

Thr Lys Val Ser Ser Gln Leu Lys Ser Ile Pro Ser Thr Asn Ser Arg
530                 535                 540

Val Ile Gln Ala Glu Ser Tyr Phe Asp Ser Ser Lys Val Gln Leu Glu
545                 550                 555                 560

Asp Thr Ser Asp Val Gly Gly Lys Asn Val Lys Cys Asp Thr Lys
                565                 570                 575

Gly Ala Trp Met Ala Tyr Lys Asp Ile Asn Phe Pro Ser Ser Gly Ser
            580                 585                 590

Tyr Gln Ile Glu Tyr Arg Val Ala Ser Glu Arg Ala Gly Gly Lys Leu
        595                 600                 605
```

```
Ser Leu Asp Leu Asn Ala Gly Ser Ile Val Leu Gly Met Leu Asp Val
    610                 615                 620

Pro Ser Thr Gly Gly Trp Gln Lys Trp Thr Thr Ile Ser His Thr Val
625                 630                 635                 640

Lys Val Asp Ser Gly Thr Tyr Asn Leu Gly Ile Tyr Val Gln Gln Pro
                645                 650                 655

Gly Trp Asn Ile Asn Trp Ile Lys Ile Thr Lys Val
                660                 665

<210> SEQ ID NO 51
<211> LENGTH: 2022
<212> TYPE: DNA
<213> ORGANISM: Tachypleus tridentatus

<400> SEQUENCE: 51
atgttggtgt tgctgtgttg tgttgttttg catgttggtg ttgcaagaat ttgctgtagc      60
cacgaaccaa agtggcagct cgtctggtcg gatgaattta ccaatggaat aagttctgat     120
tgggaatttg aaatgggcaa tggcctcaat ggttggggta taacgaact gcaatattat     180 cgtcgtgaaa atgcccaagt tgagggaggg aaactggtaa ttactgctaa aagagaagac     240
tatgatggct tcaaatacac ttctgctagg ctgaaaaccc agtttgataa atcttggaag     300
tatggtaaaa ttgaagccaa atggcgatt ccatcatttc ggggagtctg ggtgatgttc     360
tggatgtcag agacaacac taattatgtt agatggccat cttctggtga aattgacttt     420
attgaacata gaaacactaa caatgaaaaa gtcagaggaa ctattcactg gtccactcct     480
gacggtgctc atgcgcatca taacagaaa agtaatacaa atgggattga ttatcacatt     540
tattctgtag agtggaattc ttccattgtt aaatggtttg ttaatggaaa tcaatacttt     600
gaagtgaaaa ttcagggagg agtaaatggg aaaagtgcat tcgtaacaa agttttcgtt     660 attttaaaca tggcgattgg tggaaactgg ccaggattcg atgttgctga cgaggctttc     720
cctgctaaaa tgtacattga ttatgtccgt gtataccagg atgccagtac atcttctcct     780
gttggggata cctctttaga tggttactat tttgtccaaa acaggcacag tgaattgtat     840
cttgatgtca ctgatgccag taacgaagat ggagcatttc tgcaacaatg gtcttatagt     900
ggtaatgaga accaacagtt tgattttgag catctcgaaa ataatgttta taaaattact     960
aataaaaaaa gtgaaaaatc tttggatgtt tataattttg ggactgagaa tggtgttaga    1020
atccaacagt ggtcatatgg aggggctcgc aatcagcagt ttactgtaca aagtgttggt    1080
gatggttatt ataagattat tccacgcggc agtggaaagt tagtggaagt agcagatttt    1140
agtaaagatg caggagggaa gatacaacaa tggtctgata caaccaatt atctggacag    1200 tggaaactta ttaaaagtaa aagttattct aaattaattc aggcagaaag ttatttttgat    1260 tcctcaaaag tacaattgga agatacctca gatgtaggag gtgggaagaa tgttaaatgt    1320
gataatgaag gagcctggat ggcttataag gatattgatt tccccagttc aggtaattat    1380
cgaatagaat acagagtagc aagtgaacgt gcaggaggaa agctgtctct ggatttgaat    1440
gcaggctcta tagttcttgg catgctggat gttccttcaa caggaggatg gcagaagtgg    1500
accaccattt cccatacagt gaatgtggat tcaggtacat ataacttggg gatctatgtt    1560
caacgagcca gctggaatat caactggata aagattacaa aaatacctga acagtcaaat    1620
ttgaatcaag gcgtcgtaa ttctaaatta attcaggcag aaagttattt tagttactca    1680
gaagtacaac tggaagatac cttagatgta ggaggtggaa agaatgttaa atgtgataaa    1740
gaaggggcct ggatggctta caaggatatt gatttcccca gttcaggaag ttatcgagta    1800
```

```
gaatacagag tggcaagtga acgtgcagga ggaaagctgt ccctagattt gaatgcaggc   1860
tctatagtgc ttggcatgct ggatattcct tcaacaggag gattgcagaa gtggaccacc   1920
atttctcata tagtgaatgt ggatttaggt acatataact tgggaattta tgttcaaaaa   1980
gccagttgga atatcaattg gattagaatt acaaaagtgt ag                      2022

<210> SEQ ID NO 52
<211> LENGTH: 673
<212> TYPE: PRT
<213> ORGANISM: Tachypleus tridentatus

<400> SEQUENCE: 52

Met Leu Val Leu Leu Cys Cys Val Leu His Val Gly Val Ala Arg
1               5                   10                  15

Ile Cys Cys Ser His Glu Pro Lys Trp Gln Leu Val Trp Ser Asp Glu
            20                  25                  30

Phe Thr Asn Gly Ile Ser Ser Asp Trp Glu Phe Glu Met Gly Asn Gly
        35                  40                  45

Leu Asn Gly Trp Gly Asn Asn Glu Leu Gln Tyr Tyr Arg Arg Glu Asn
    50                  55                  60

Ala Gln Val Glu Gly Gly Lys Leu Val Ile Thr Ala Lys Arg Glu Asp
65                  70                  75                  80

Tyr Asp Gly Phe Lys Tyr Thr Ser Ala Arg Leu Lys Thr Gln Phe Asp
                85                  90                  95

Lys Ser Trp Lys Tyr Gly Lys Ile Glu Ala Lys Met Ala Ile Pro Ser
            100                 105                 110

Phe Arg Gly Val Trp Val Met Phe Trp Met Ser Gly Asp Asn Thr Asn
        115                 120                 125

Tyr Val Arg Trp Pro Ser Ser Gly Glu Ile Asp Phe Ile Glu His Arg
    130                 135                 140

Asn Thr Asn Asn Glu Lys Val Arg Gly Thr Ile His Trp Ser Thr Pro
145                 150                 155                 160

Asp Gly Ala His Ala His His Asn Arg Glu Ser Asn Thr Asn Gly Ile
                165                 170                 175

Asp Tyr His Ile Tyr Ser Val Glu Trp Asn Ser Ile Val Lys Trp
            180                 185                 190

Phe Val Asn Gly Asn Gln Tyr Phe Glu Val Lys Ile Gln Gly Gly Val
        195                 200                 205

Asn Gly Lys Ser Ala Phe Arg Asn Lys Val Phe Val Ile Leu Asn Met
    210                 215                 220

Ala Ile Gly Gly Asn Trp Pro Gly Phe Asp Val Ala Asp Glu Ala Phe
225                 230                 235                 240

Pro Ala Lys Met Tyr Ile Asp Tyr Val Arg Val Tyr Gln Asp Ala Ser
                245                 250                 255

Thr Ser Ser Pro Val Gly Asp Thr Ser Leu Asp Gly Tyr Tyr Phe Val
            260                 265                 270

Gln Asn Arg His Ser Glu Leu Tyr Leu Asp Val Thr Asp Ala Ser Asn
        275                 280                 285

Glu Asp Gly Ala Phe Leu Gln Gln Trp Ser Tyr Ser Gly Asn Glu Asn
    290                 295                 300

Gln Gln Phe Asp Phe Glu His Leu Glu Asn Asn Val Tyr Lys Ile Thr
305                 310                 315                 320

Asn Lys Lys Ser Gly Lys Ser Leu Asp Val Tyr Asn Phe Gly Thr Glu
                325                 330                 335
```

```
Asn Gly Val Arg Ile Gln Gln Trp Ser Tyr Gly Gly Ala Arg Asn Gln
            340                 345                 350

Gln Phe Thr Val Gln Ser Val Gly Asp Gly Tyr Tyr Lys Ile Ile Pro
            355                 360                 365

Arg Gly Ser Gly Lys Leu Val Glu Val Ala Asp Phe Ser Lys Asp Ala
        370                 375                 380

Gly Gly Lys Ile Gln Gln Trp Ser Asp Asn Gln Leu Ser Gly Gln
385                 390                 395                 400

Trp Lys Leu Ile Lys Ser Lys Ser Tyr Ser Lys Leu Ile Gln Ala Glu
                405                 410                 415

Ser Tyr Phe Asp Ser Ser Lys Val Gln Leu Glu Asp Thr Ser Asp Val
            420                 425                 430

Gly Gly Gly Lys Asn Val Lys Cys Asp Asn Glu Gly Ala Trp Met Ala
            435                 440                 445

Tyr Lys Asp Ile Asp Phe Pro Ser Ser Gly Asn Tyr Arg Ile Glu Tyr
            450                 455                 460

Arg Val Ala Ser Glu Arg Ala Gly Gly Lys Leu Ser Leu Asp Leu Asn
465                 470                 475                 480

Ala Gly Ser Ile Val Leu Gly Met Leu Asp Val Pro Ser Thr Gly Gly
                485                 490                 495

Trp Gln Lys Trp Thr Thr Ile Ser His Thr Val Asn Val Asp Ser Gly
            500                 505                 510

Thr Tyr Asn Leu Gly Ile Tyr Val Gln Arg Ala Ser Trp Asn Ile Asn
            515                 520                 525

Trp Ile Lys Ile Thr Lys Ile Pro Glu Gln Ser Leu Asn Gln Gly
            530                 535                 540

Arg Arg Asn Ser Lys Leu Ile Gln Ala Glu Ser Tyr Phe Ser Tyr Ser
545                 550                 555                 560

Glu Val Gln Leu Glu Asp Thr Leu Asp Val Gly Gly Lys Asn Val
                565                 570                 575

Lys Cys Asp Lys Glu Gly Ala Trp Met Ala Tyr Lys Asp Ile Asp Phe
            580                 585                 590

Pro Ser Ser Gly Ser Tyr Arg Val Glu Tyr Arg Val Ala Ser Glu Arg
            595                 600                 605

Ala Gly Gly Lys Leu Ser Leu Asp Leu Asn Ala Gly Ser Ile Val Leu
        610                 615                 620

Gly Met Leu Asp Ile Pro Ser Thr Gly Gly Leu Gln Lys Trp Thr Thr
625                 630                 635                 640

Ile Ser His Ile Val Asn Val Asp Leu Gly Thr Tyr Asn Leu Gly Ile
                645                 650                 655

Tyr Val Gln Lys Ala Ser Trp Asn Ile Asn Trp Ile Arg Ile Thr Lys
            660                 665                 670

Val

<210> SEQ ID NO 53
<211> LENGTH: 1465
<212> TYPE: DNA
<213> ORGANISM: Limulus polyphemus

<400> SEQUENCE: 53
ctggaatgag gctatacata tagaatttgc acggctgtct cgccaacgtc acacgcatgc      60
ctactacccg gatgaaattt ggacaggaat gagatttcat agcacagcgg catggtacag     120
agttcggtga agaaggcaaa taaattcact gtataatctc ctaaattgaa atgtttctgt     180
```

```
gttatgttgt tttgtatgtt ggtgtcgcag aatctactg tagccaggaa ccaaaatgga        240
agctcgtctg gtcggatgaa tttaccaatg gaatcagttc agattgggaa ttcgaaacgg        300
gcaatggccc caacggttgg ggcaataacg aactgcaata ttatcgtcgt gaaaataccc        360
gagttgaggg cgggaaatta ataattacag ctaaaaaaga agattatgag ggtttcaggt        420
acacttctgc caagctgaaa acccagttca ataaaccttg gaaagatggt aaaattgaag        480
ccagaatgtc gattccatca tttcgggggg tctgggtggc gttctggatg ttaggagaca        540
tcaccgatac tgatagctgg ccctcttccg gtgaaattga ctttaaggaa catataaata        600
ccaacaatga agttagagga actattcact ggtctacttc tgatgacgct gatacacttc        660
atggcagagg aaccaatact gactatcaca tttattctgt agagtggaat tcttccgtta        720
ttagatggtt tgttgatgga aatcagtact ttgaggtgaa tattcagaga ggagcaactg        780
gaacaaacgc atttcataac aaagttttcg ttattttaaa catggctatt ggtggaaact        840
ggccaggatt caatgttgct gatgaggctt tccctgctaa catgtatgta gattatgtcc        900
gtgtatatca ggatgccaat acaccttctc ctgttgacgt tgacgttact gatttatctg        960
gttactattt tcttcaaaat aggcacagtg aactgtatct tgatgtcagt ttctccagta       1020
acaaagatgg agcatttcta caacaatggc cttataacgg taatgctaac caacagtttg       1080
attttgtaca tctcggaaat aatatatata aaattaccaa taaaaatagt ggaaaatctc       1140
tggatgtcta caatgtaggg actgaaaatg gtgtcagaat tcaacagatg ccgtatagag       1200
ggagctacaa tcagcagttt attgtacaag atgttggaga tggttattat aagatatttg       1260
cacgcaacag cagaaagtta gtggaagtag cagatttcaa taaagaccca ggaggaaaaa       1320
tacaacaatg gtctgatgat ggccaattat ccggacagtg gaaacttatt cgaaataaag       1380
ctaattctaa agtaattcag gcagaaagtt attttgctag ttcaaaagta caattggaag       1440
atacctcgga tgtaggaggc gggaa                                              1465
```

<210> SEQ ID NO 54
<211> LENGTH: 1459
<212> TYPE: DNA
<213> ORGANISM: Limulus polyphemus

<400> SEQUENCE: 54

```
ctggaatgag gctatacata tagaatttgc acggctgtct cgccaacgtc acacgcatgc         60
ctactacccg gatgaaattt ggacaggaat gagatttcat agcacagcgg catggtacag        120
agttcggtga agaaggcaaa taattcact gtataatctc ctaaattgaa atgtttctgt        180
gttatgttgt tttgtatgtt ggtgtcgcag aatctactg tagccaggaa ccaaaatgga        240
agctcgtctg gtcggatgaa tttaccaatg gaatcagttc agattgggaa ttcgaaacgg        300
gcaatggccc caacggttgg ggcaataacg aactgcaata ttatcgtcgt gaaaataccc        360
gagttgaggg cgggaaatta ataattacag ctaaaaaaga agattatgag ggtttcaggt        420
acacttctgc caagctgaaa acccagttca ataaaccttg gaaagatggt aaaattgaag        480
ccagaatgtc gattccatca tttcgggggg tctgggtggc gttctggatg ttaggagaca        540
tcaccgatac tgatagctgg ccctcttccg gtgaaattga ctttaaggaa catataaata        600
ccaacaatga agttagagga actattcact ggtctacttc tgatgacgct gatacacttc        660
atggcagagg aaccaatact gactatcaca tttattctgt agagtggaat tcttccgtta        720
ttagatggtt tgttgatgga aatcagtact ttgaggtgaa tattcagaga ggagcaactg        780
```

```
gaacaaacgc atttcataat aacgttttcg ttatttttaaa catggctatt ggtggaaact    840
ggccaggatt caatgttgct gatgaggctt ccctgctaa catgtatgta gattatgtcc      900
gtgtatatca ggatgccaat acaccttctc ctgttgacgt tactcattta tctggttact    960
attttcttca aaataggcac agtgaactgt atcttgatgt cagtggttcc agtaacgaag   1020
atggagcatt tctacaacaa tggccttata acggtaatgc taaccaacag tttgattttg   1080
tacatctcgg aaataaggtt tataaaatta tcaataaaaa tagtgaaaaa tctctggatg   1140
tttacgagtt agggactgat aatggtgtca gaatccaaca gtggtcgtat ggaggggct     1200 acaatcagca gtttattgta caagatgttg gagatggtta ttataagata tttgcacgca   1260
gcactggaaa gttagtggaa gtagcagatt tgaataaaga cccaggagga aagatacaac   1320
aatggtctga tgatggccaa ttatccggac agtggaaact tattcgaaat aaagctaatt   1380
ctaaattgat tcaggcagaa agttatttttg ctagttcaaa agtacaattg gaagatacct   1440
cggatgtagg aggcgggaa                                                 1459
```

<210> SEQ ID NO 55
<211> LENGTH: 35
<212> TYPE: DNA
<213> ORGANISM: Artificial Sequence
<220> FEATURE:
<223> OTHER INFORMATION: Oligonucleotide primer

<400> SEQUENCE: 55

```
gattacgcca agcttgccag aatgtcgatt ccatc                                 35
```

<210> SEQ ID NO 56
<211> LENGTH: 17
<212> TYPE: DNA
<213> ORGANISM: Artificial Sequence
<220> FEATURE:
<223> OTHER INFORMATION: Oligonucleotide primer

<400> SEQUENCE: 56

```
gtaaaacgac ggccagt                                                     17
```

<210> SEQ ID NO 57
<211> LENGTH: 17
<212> TYPE: DNA
<213> ORGANISM: Artificial Sequence
<220> FEATURE:
<223> OTHER INFORMATION: Oligonucleotide primer

<400> SEQUENCE: 57

```
caggaaacag ctatgac                                                     17
```

<210> SEQ ID NO 58
<211> LENGTH: 2013
<212> TYPE: DNA
<213> ORGANISM: Limulus polyphemus

<400> SEQUENCE: 58

```
gggggggttc tgggtggcgt tctggatgtt aggagacatc accgatactg atagctggcc      60
ctcttccggt gaaattgact ttaaggaaca tataaatacc aacaatgaag ttagaggaac     120
tattcactgg tctacttctg atggtgctca tacgcatcat ggcagaggaa ccaatactga    180
ctatcacatt tattctgtag agtggaattc ttccgttatt agatggtttg ttgatggaaa   240
tcagtacttt gaggtgaata ttcagagagg agcaactgga acaaacgcat tcataacaa     300 agttttcgtt attttaaaca tggctattgg tggaaactgg ccaggattca atgttgctga    360
```

```
tgaggctttc cctgctaaca tgtatgtaga ttatgtccgt gtatatcagg atgccaatac    420
accttctcct gttgacgttg acgttactga tttatctggt tactattttc ttcaaaatag    480
gcacagtgaa ctgtatcttg atgtcagttt ctccagtaac aaagatggag catttctaca    540
acaatggcct tataacggta atgctaacca acagtttgat tttgtacatc tcggaaataa    600
tatatataaa attaccaata aaaatagtgg aaatctctg  gatgtctaca atgtagggac    660
tgaaaatggt gtcagaattc aacagatgcc gtatagaggg agctacaatc agcagtttat    720
tgtacaagat gttggagatg gttattataa gatatttgca cgcaacagca gaaagttagt    780
ggaagtagca gatttcaata aagacccagg aggaaagata caacaatggt ctgatgatgg    840
ccaaatatcc ggacagtgga aacttattcg aaataaagtt aattctaaag taattcaggc    900
agaaagttat tttgctagtt taggagtaca attggaagac cctcggatg  taggaggcgg    960 gaagaatgtt aagtgtgata ctgaaggagc ctggatggct acaaggata  tcaatttccc   1020 cagttcaggt agtatcaag  tagagtacag agtggcaagc gaacgtgcag gaggaaagtt   1080
gtctctggat ttgaatgcag gttctatagt gcttggaatg ctgaatgttc cttcaacagg   1140
aggatggcag aagtggacca ccatttccca tacagtaaag gtggattcag gtacttataa   1200
cttggggatc tacgttcaac gacccaggtg gaatatcaac tggattaaga ttacagaagc   1260
acccggacag tcaaaaccta ttcaaagaag tgataccgat tctaaagtaa ttcaggcaga   1320
aagttatttt gctagttcaa aagtacaatt ggaagatacc tcggatgttg gaggcgggaa   1380
gaatgttaag tgtgataatg aaggagcctg gatggcctac aaggatatta attttcccag   1440
ttcaggtagt tatcaaatag agtacagagt ggcaagtgaa cgtgcaggag gaaagttgtc   1500
tctcgatttg aatgcaggtt ctatagtgct tggaatgctg atgttccttt caactggggg   1560
atggcagaag tggaccccca tttcccacac agtgaatgtg agttcgggta catataactt   1620
ggggatctac gttcaacgag ctgcgtggaa tatcaactgg attaagatta caaggtttta   1680
gaatacaaga gtaaattaat tttattttt  tgaagaaaca acagatcttt gatcatctgg   1740
agtttatcta actactacag aatccactat cacctttcta gatgtattca ttgctgatga   1800
tagtgatgta taactaatga atgagaagat tatcaacaga accactgatg tattgttata   1860
tcttatggag ggtacataat cgttaaaaag ctacatttgt aataaatatg cctttaagaa   1920
gtgtggtttt ttttacaata aatatatttt aattttacaa aaaaaaaaa aaaaaaaaa    1980 aaaaaaagt  actctgcgtt gataccactg ctg                                2013
```

<210> SEQ ID NO 59
<211> LENGTH: 20
<212> TYPE: DNA
<213> ORGANISM: Artificial Sequence
<220> FEATURE:
<223> OTHER INFORMATION: Oligonucleotide primer

<400> SEQUENCE: 59
cgcgttggtt ttagagggca                                                 20

<210> SEQ ID NO 60
<211> LENGTH: 20
<212> TYPE: DNA
<213> ORGANISM: Artificial Sequence
<220> FEATURE:
<223> OTHER INFORMATION: Oligonucleotide primer

<400> SEQUENCE: 60

```
acgtcgccaa ctcccattgt                                              20

<210> SEQ ID NO 61
<211> LENGTH: 35
<212> TYPE: DNA
<213> ORGANISM: Artificial Sequence
<220> FEATURE:
<223> OTHER INFORMATION: Oligonucleotide primer

<400> SEQUENCE: 61
aaccaagtga ccatgaaaac cactctatgg acttt                             35

<210> SEQ ID NO 62
<211> LENGTH: 37
<212> TYPE: DNA
<213> ORGANISM: Artificial Sequence
<220> FEATURE:
<223> OTHER INFORMATION: Oligonucleotide primer

<400> SEQUENCE: 62
gatggtggtg ctcgagttaa aatactggca caacttc                           37

<210> SEQ ID NO 63
<211> LENGTH: 35
<212> TYPE: DNA
<213> ORGANISM: Artificial Sequence
<220> FEATURE:
<223> OTHER INFORMATION: Oligonucleotide primer

<400> SEQUENCE: 63
aaccaagtga ccatgaaaac cactctatgg acttt                             35

<210> SEQ ID NO 64
<211> LENGTH: 37
<212> TYPE: DNA
<213> ORGANISM: Artificial Sequence
<220> FEATURE:
<223> OTHER INFORMATION: Oligonucleotide primer

<400> SEQUENCE: 64
gatggtggtg ctcgagttaa aatactggca caacttc                           37

<210> SEQ ID NO 65
<211> LENGTH: 12
<212> TYPE: PRT
<213> ORGANISM: Artificial Sequence
<220> FEATURE:
<223> OTHER INFORMATION: PA tag peptide

<400> SEQUENCE: 65

Gly Val Ala Met Pro Gly Ala Glu Asp Asp Val Val
1               5                   10

<210> SEQ ID NO 66
<211> LENGTH: 2073
<212> TYPE: DNA
<213> ORGANISM: Artificial Sequence
<220> FEATURE:
<223> OTHER INFORMATION: Synthetic polypeptide
<220> FEATURE:
<221> NAME/KEY: sig_peptide
<222> LOCATION: (1)..(60)
<220> FEATURE:
<221> NAME/KEY: misc_feature
<222> LOCATION: (2017)..(2052)
<223> OTHER INFORMATION: PA Tag
<220> FEATURE:
<221> NAME/KEY: misc_feature
```

<222> LOCATION: (2053)..(2070)
<223> OTHER INFORMATION: 6 x His Tag

<400> SEQUENCE: 66

```
atggcaatgt tcctgtgcta cgtggtgctg gtggtgggcg tgaccggcat ctgctgctcc      60
caggagacca actggaagct ggtgtggtcc gacgagttca ccaacggcat ctcctccgac     120
tgggagttcg agaccggtaa cggtcccaac ggctggggca caacgagct gcagtactac      180
cgccgcgaga acgctcgcgt ggagggcggc aagctgatca tcaccgctaa gaaggaggac    240
tacgagggct cccgctacac ctccgctaag ctgaagaccc agttcaacaa gccctggaag    300
gacggcaaga tcgaggctcg catgtccatc ccctccttcc gcgtgtgtg ggtggctttc     360
tggatgctgg gcgacatcac cgacaccgac tcctggcctt cctccggtga gatcgacttc    420
aaggagcaca tcaacaccaa caacgaggtg cgcggcacca tccactggtc cacctccgac   480
ggcgctcaca cccaccacgg ccgcggcacc aacaccgact accacatcta ctccgtggag    540
tggaactcct ccgtgatccg ctggttcgtg gacggcaacc agtacttcga ggtgaacatc    600
cagcgcggcg ctaccggtac caacgctttc cacaacaagg tgttcgtgat cctgaacatg   660
gctatcggcg gtaactggcc cggcttcaac gtggctgacg aggctttccc cgctaacatg    720
tacgtggact acgtgcgcgt gtaccaggac gctaacaccc cctcccccgt ggacgtcgac   780
gtgaccgacc tgtccggtta ctacttcctg cagaaccgcc actccgagct gtatctcgac    840
gtcagcttca gctccaacaa ggatggcgct ttcctccagc agtggcctta caacggcaat    900
gccaaccagc aattcgactt cgtccatctc ggcaacaaca tctacaagat caccaataag   960
aactccggta agtccctgga cgtctacaac gtcggtaccg aaaacggcgt gcgcattcag    1020
cagatgccct accgcggctc ctacaaccaa cagttcatcg tccaggacgt cggcgacggc   1080
tactacaaga tcttcgcccg taattcccgc aagctcgtgg aagtggctga cttcaacaag   1140
gaccctggcg gcaagatcca acagtggagc gacgacggcc agatctccgg ccagtggaag   1200
ctcatccgca acaaggtcaa tagcaaggtc atccaggccg agagctattt cgctagcctg    1260
ggtgtccaac tggaggacac cagcgacgtg ggtggcggta aaaacgtgaa atgcgacacc    1320
gagggcgctt ggatggccta caaggacatc aatttcccct cctccggctc ctaccaggtg    1380
gagtaccgcg tcgcttccga acgtgctggc ggcaagctgt ccctggacct gaacgccggt    1440
agcatcgtgc tgggcatgct gaacgtcccc tccaccggtg gctggcagaa gtggaccacc    1500
atcagccaca ctgtgaaggt ggactccggc acctataacc tgggtatcta cgtgcagcgc   1560
ccccgctgga acatcaactg gatcaagatc accgaggccc ccggccaatc caaacccatc   1620
cagcgcagcg acaccgactc caaggtgatc caagccgagt cctactttgc tagcagcaag    1680
gtgcagctgc aggataccag cgacgtcggt ggtggcaaga acgtgaagtg cgacaacgag   1740
ggcgcctgga tggcttacaa ggacatcaac ttccctcct ccggttccta ccagatcgag   1800
taccgcgtgc cttccgagcg tgctggtggc aagctgtccc tggacctgaa cgctggctcc    1860
atcgtgctgg gtatgctgga cgtgccttcc accggcggtt ggcagaagtg gaccaccatc    1920
tcccacaccg tgaacgtgtc ctccggcacc tacaacctgg gcatctacgt gcagcgtgcc    1980
gcctggaaca tcaactggat caagatcacc aaggtgggcg tggctatgcc cggtgctgag    2040
gacgacgtgg tgcatcacca ccatcaccac taa                                2073
```

<210> SEQ ID NO 67
<211> LENGTH: 421
<212> TYPE: PRT

```
<213> ORGANISM: Synthetic polypeptide
<220> FEATURE:
<221> NAME/KEY: SIGNAL
<222> LOCATION: (1)..(24)
<220> FEATURE:
<221> NAME/KEY: MUTAGEN
<222> LOCATION: (25)..(41)
<223> OTHER INFORMATION: HAT tag
<220> FEATURE:
<221> NAME/KEY: MUTAGEN
<222> LOCATION: (42)..(137)
<223> OTHER INFORMATION: SUMO tag

<400> SEQUENCE: 67
```

Met Lys Thr Thr Leu Trp Thr Phe Phe Ala Leu Ala Met Ala Leu Phe
1               5                   10                  15

Ser Ile Asn Val Thr Ala Ser Glu Lys Asp His Leu Ile His Asn Val
            20                  25                  30

His Lys Glu Glu His Ala His Asn Lys Asp Ser Glu Val Asn Gln Glu
        35                  40                  45

Ala Lys Pro Glu Val Lys Pro Glu Val Lys Pro Glu Thr His Ile Asn
    50                  55                  60

Leu Lys Val Ser Asp Gly Ser Ser Glu Ile Phe Phe Lys Ile Lys Lys
65                  70                  75                  80

Thr Thr Pro Leu Arg Arg Leu Met Glu Ala Phe Ala Lys Arg Gln Gly
                85                  90                  95

Lys Glu Met Asp Ser Leu Thr Phe Leu Tyr Asp Gly Ile Glu Ile Gln
            100                 105                 110

Ala Asp Gln Thr Pro Glu Asp Leu Asp Met Glu Asp Asn Asp Ile Ile
        115                 120                 125

Glu Ala His Arg Glu Gln Ile Gly Gly Met Ser Val Thr Ser Arg Val
    130                 135                 140

Arg Arg Glu Ile Asn Glu Glu His Cys Gly Ile Arg Pro Thr Ala Pro
145                 150                 155                 160

Arg Ile Ile Lys Gly Arg Ile Ser Ile Pro His Ser Trp Pro Trp Met
                165                 170                 175

Val Gly Ile Phe Gln Val Asp Pro Leu Leu Phe Ile Cys Gly Gly Thr
            180                 185                 190

Ile Ile Asn Lys Val Ser Val Val Thr Ala Ala His Cys Leu Val Thr
        195                 200                 205

Gln Ser Gly Asn Arg Gln Asn Ser Ser Ile Val Val Arg Val Gly Ala
    210                 215                 220

His Asp Ile Asp Asn Ser Gly Ile Asp Tyr His Val Asp Lys Ile Ile
225                 230                 235                 240

Val His Gln Asp Tyr Lys Tyr Arg Ser Gln Tyr Tyr Asp Ile Gly Leu
                245                 250                 255

Ile Leu Leu Ser Lys Arg Ile Glu Tyr Asn Tyr Lys Val Arg Pro Val
            260                 265                 270

Cys Ile Pro Glu Leu Asn Lys Leu Asn Val Asn Leu Asn Asn Lys Glu
        275                 280                 285

Val Val Val Ile Gly Trp Gly Val Thr Glu Arg Gly Ser Glu Lys His
    290                 295                 300

Asn Val Leu Arg Glu Leu Glu Leu Pro Val Val Thr Asn Glu Leu Cys
305                 310                 315                 320

Asn Lys Ser Tyr Gln Thr Ile Ser Phe Ser Gly Leu Asn Arg Gly Ile
                325                 330                 335

Thr Asp Asp Met Ile Cys Ala Gly Tyr Gln Glu Gly Gly Arg Asp Ser

```
                340             345             350
Cys Glu Gly Asp Ser Gly Pro Leu Met Tyr His Asp Pro Thr Thr
        355                 360                 365

Gly Arg Val Glu Leu Val Gly Val Ser Phe Gly Phe Gly Cys Ala
370                 375                 380

Arg Pro Asn Phe Pro Gly Val Tyr Thr Arg Leu Ser Ser Tyr Gly Asn
385                 390                 395                 400

Trp Phe Gln Lys Val Thr Phe Gly Tyr Leu Leu Ala Thr Leu Phe Glu
            405                 410                 415

Val Val Pro Val Phe
            420

<210> SEQ ID NO 68
<211> LENGTH: 1266
<212> TYPE: DNA
<213> ORGANISM: Synthetic polypeptide
<220> FEATURE:
<221> NAME/KEY: sig_peptide
<222> LOCATION: (1)..(72)
<220> FEATURE:
<221> NAME/KEY: misc_feature
<222> LOCATION: (73)..(123)
<220> FEATURE:
<221> NAME/KEY: misc_feature
<222> LOCATION: (124)..(411)
<223> OTHER INFORMATION: SUMO tag

<400> SEQUENCE: 68
atgaaaacca ctctgtggac tttcttcgct ctggctatgg ccctcttttc catcaacgtg      60
accgcctccg agaaggacca tctcatccac aacgtccaca aggaggagca cgcccacaac     120
aaggactccg aggtgaacca agaggctaag cccgaggtga agcccgaggt gaagcccgag     180
acccacatca atctgaaggt gagcgacggc tcctccgaga tcttcttcaa gatcaagaag     240 actaccccc tccgccgcct catggaagcc tttgctaagc gccaaggtaa ggagatggac     300
tctctgactt ttctgtacga cggcatcgaa atccaagctg accaaacccc cgaggatctg     360
gacatggagg acaacgacat catcgaggcc accgtgaaca gatcggcgg tatgtccgtg     420 accagccgtg tgcgtcgtga atcaacgag gaacactgcg catccgtcc taccgcccct     480 cgcatcatta agggccgtat cagcatcccc cacagctggc cttggatggt gggcatcttc     540
caagtggacc ctctgctgtt catctgcggc ggcaccatca tcaacaaagt gagcgtcgtg     600
accgccgctc attgtctggt cactcaatcc ggtaaccgcc agaactcctc catcgtggtc     660
cgtgtgggtg cccacgacat cgacaacagc ggcatcgact accacgtcga caaaatcatc     720
gtgcaccaag actacaagta ccgcagccag tactacgaca tcggtctgat tctgctcagc     780
aaacgtatcg agtataacta caaggtgcgc cccgtgtgca tccccgagct aacaagctc     840 aacgtgaatc tcaacaacaa agaggtggtg gtgatcggtt ggggtgtgac cgaacgtggc     900
agcgaaaagc ataacgtgct gcgcgagctg agctgcccg tggtgaccaa cgagctctgc     960
aacaagtcct accagaccat cagcttcagc ggcctcaacc gcggcatcac cgatgacatg    1020
atctgcgctg gctatcaaga gggtggccgt gatagctgcg agggtgactc cggtggtcct    1080
ctgatgtacc acgaccccac taccggccgt gtggaactcg tgggcgtggt gtccttcggt    1140
ttcggctgcg cccgtcccaa cttcccggt gtgtacaccc gtctgtcctc ctacggcaac    1200
tggttccaga aggtgacctt cggttatctg ctggctactc tgttcgaggt ggtgcccgtg    1260
ttctaa                                                              1266
```

```
<210> SEQ ID NO 69
<211> LENGTH: 855
<212> TYPE: DNA
<213> ORGANISM: Artificial Sequence
<220> FEATURE:
<223> OTHER INFORMATION: Synthetic polypeptide

<400> SEQUENCE: 69
atgtccgtga ccagccgtgt gcgtcgtgaa atcaacgagg aacactgcgg catccgtcct      60
accgcccctc gcatcattaa gggccgtatc agcatccccc acagctggcc ttggatggtg     120
ggcatcttcc aagtggaccc tctgctgttc atctgcggcg gcaccatcat caacaaagtg     180
agcgtcgtga ccgccgctca ttgtctggtc actcaatccg gtaaccgcca gaactcctcc     240
atcgtggtcc gtgtgggtgc ccacgacatc gacaacagcg gcatcgacta ccacgtcgac     300
aaaatcatcg tgcaccaaga ctacaagtac cgcagccagt actacgacat cggtctgatt     360
ctgctcagca aacgtatcga gtataactac aaggtgcgcc ccgtgtgcat ccccgagctc     420
aacaagctca acgtgaatct caacaacaaa gaggtggtgg tgatcggttg gggtgtgacc     480
gaacgtggca gcgaaaagca taacgtgctg cgcgagctgg agctgcccgt ggtgaccaac     540
gagctctgca acaagtccta ccagaccatc agcttcagcg gcctcaaccg cggcatcacc     600
gatgacatga tctgcgctgg ctatcaagag ggtggccgtg atagctgcga gggtgactcc     660
ggtggtcctc tgatgtacca cgaccccact accggccgtg tggaactcgt gggcgtggtg     720
tccttcggtt tcggctgcgc ccgtcccaac ttccccggtg tgtacacccg tctgtcctcc     780
tacggcaact ggttccagaa ggtgaccttc ggttatctgc tggctactct gttcgaggtg     840
gtgcccgtgt tctaa                                                     855
```